US012632883B2

(12) United States Patent
Li et al.

(10) Patent No.: US 12,632,883 B2
(45) Date of Patent: May 19, 2026

(54) RECOMMENDATION MODEL TRAINING METHOD, RECOMMENDATION METHOD, APPARATUS, AND COMPUTER-READABLE MEDIUM

(71) Applicant: HUAWEI TECHNOLOGIES CO., LTD., Shenzhen (CN)

(72) Inventors: Jingjie Li, Beijing (CN); Hong Zhu, Shenzhen (CN); Zhenhua Dong, Shenzhen (CN); Xiaolian Zhang, Shenzhen (CN); Shi Yin, Shenzhen (CN); Xinhua Feng, Shenzhen (CN); Xiuqiang He, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 135 days.

(21) Appl. No.: 18/156,512

(22) Filed: Jan. 19, 2023

(65) Prior Publication Data

US 2023/0153857 A1     May 18, 2023

Related U.S. Application Data

(63) Continuation of application No. PCT/CN2020/104487, filed on Jul. 24, 2020.

(51) Int. Cl.
| | | |
|---|---|---|
| *G06Q 30/00* | (2023.01) | |
| *G06Q 30/0202* | (2023.01) | |
| *G06Q 30/0251* | (2023.01) | |

(52) U.S. Cl.
CPC ..... *G06Q 30/0251* (2013.01); *G06Q 30/0202* (2013.01)

(58) Field of Classification Search
CPC ........................................... G06Q 30/02–0277
See application file for complete search history.

(56) References Cited

U.S. PATENT DOCUMENTS

| | | | |
|---|---|---|---|
| 7,689,432 B2 | 3/2010 | Gross | |
| 2020/0142935 A1 | 5/2020 | Venkatesan et al. | |
| 2021/0256410 A1* | 8/2021 | Bravyi | ..................... G06N 7/08 |

FOREIGN PATENT DOCUMENTS

| | | |
|---|---|---|
| CN | 106951547 A | 7/2017 |
| CN | 108665002 A | 10/2018 |

(Continued)

OTHER PUBLICATIONS

Schnabel et al., "Recommendations as Treatments: Debiasing Learning and Evaluation," CoRR, submitted on Feb. 17, 2016, arXiv:1602.05332v1, 10 pages.

(Continued)

*Primary Examiner* — Raquel Alvarez
(74) *Attorney, Agent, or Firm* — Fish & Richardson P.C.

(57) ABSTRACT

A training method includes: obtaining a first recommendation model, where a model parameter of the first recommendation model is obtained through training based on n first training samples; determining an impact function value of each first training sample with respect to a verification loss of m second training samples in the first recommendation model; determining, based on the impact function value of each first training sample with respect to the verification loss, a weight corresponding to each first training sample; and training the first recommendation model based on the n first training samples and the weights corresponding to the n first training samples, to obtain a target recommendation model.

20 Claims, 20 Drawing Sheets

(56)              References Cited

FOREIGN PATENT DOCUMENTS

| CN | 109345302 | A | | 2/2019 |
|----|-----------|---|---|--------|
| CN | 110533459 | A | * | 12/2019 |
| CN | 111027714 | A | | 4/2020 |
| KR | 101997222 | B1 | | 7/2019 |

OTHER PUBLICATIONS

Bekker et al., "Beyond the Selected Completely At Random Assumption for Learning from Positive and Unlabeled Data," Proceeding of Joint European Conference on Machine Learning and Knowledge Discovery in Databases, Jun. 28, 2019, 16 pages.

Saito et al., "Unbiased Recommender Learning from Missing-Not-At-Random Implicit Feedback," CoRR, submitted on Feb. 9, 2020, arXiv:1909.03601v3, 9 pages.

Ren et al., "Learning to Reweight Examples for Robust Deep Learning," CoRR, submitted on May 5, 2019, arXiv:1803.09050v3, 13 pages.

Joachims et al., "Unbiased Learning-to-Rank with Biased Feedback," CoRR, submitted on Aug. 6, 2016, arXiv:1608.04468v1, 10 pages.

International Search Report and Written Opinion in International Appln. No. PCT/CN2020/104487, mailed on Apr. 22, 2021, 18 pages (with English translation).

Schnabel et al., "Recommendations as Treatments: Debiasing Learning and Evaluation," CoRR, submitted on Feb. 17, 2016, arXiv: 1602.05352v1, 10 pages.

Extended European Search Report in European Appln No. 20946442. 9, dated Jun. 30, 2023, 12 pages.

* cited by examiner

600

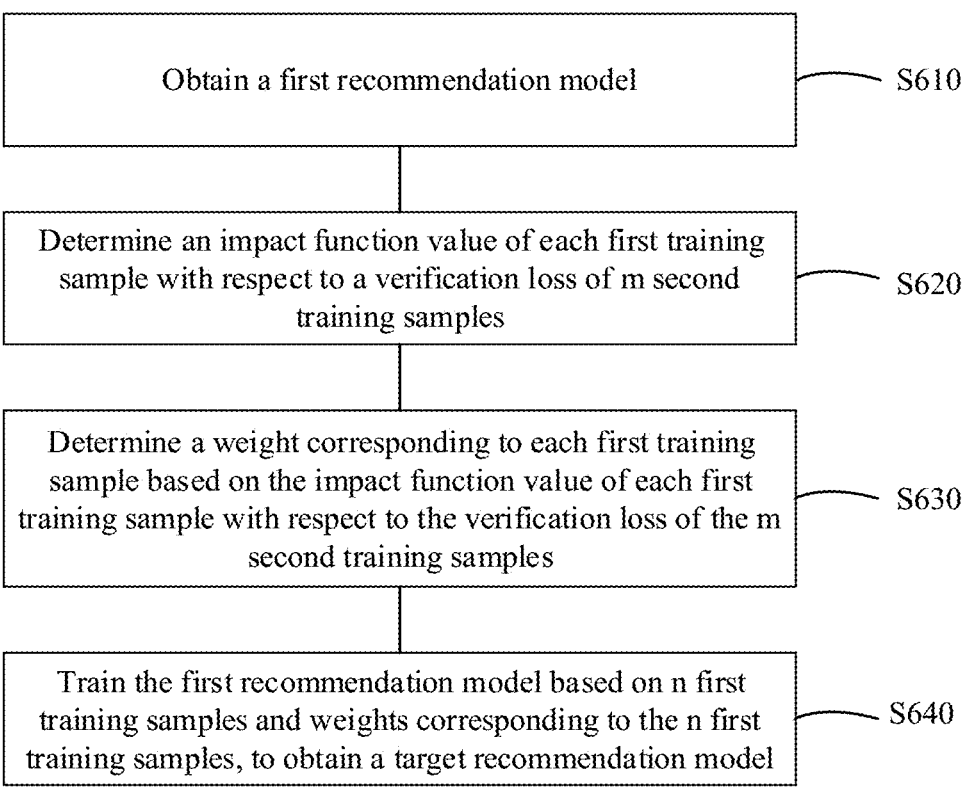

Obtain a first recommendation model — S610

Determine an impact function value of each first training sample with respect to a verification loss of m second training samples — S620

Determine a weight corresponding to each first training sample based on the impact function value of each first training sample with respect to the verification loss of the m second training samples — S630

Train the first recommendation model based on n first training samples and weights corresponding to the n first training samples, to obtain a target recommendation model — S640

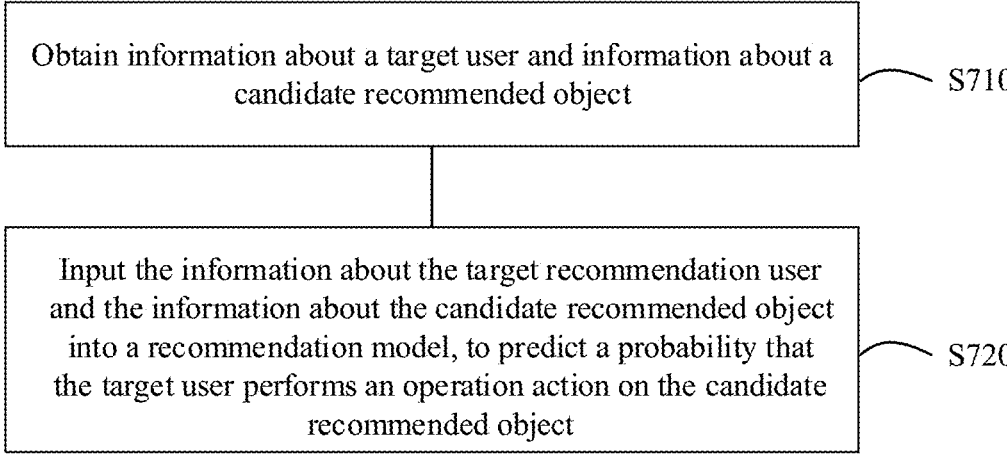

Obtain information about a target user and information about a candidate recommended object — S710

Input the information about the target recommendation user and the information about the candidate recommended object into a recommendation model, to predict a probability that the target user performs an operation action on the candidate recommended object — S720

FIG. 7

Entire database → Recall → Rank → Recommendation result

User profile

Selection bias

Location bias

1200

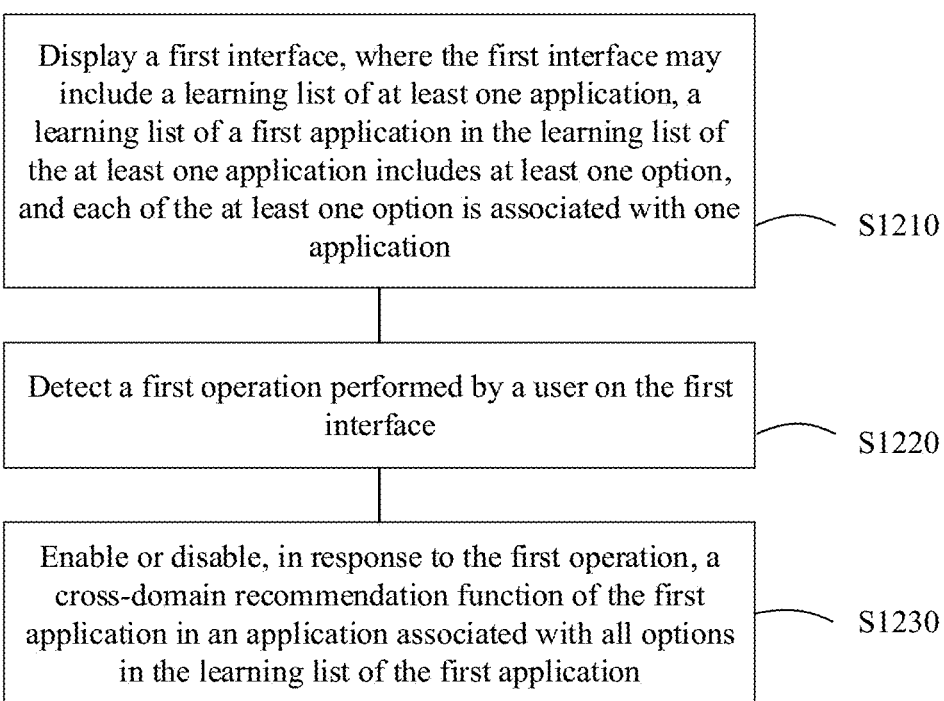

Display a first interface, where the first interface may include a learning list of at least one application, a learning list of a first application in the learning list of the at least one application includes at least one option, and each of the at least one option is associated with one application ⟍ S1210

Detect a first operation performed by a user on the first interface ⟍ S1220

Enable or disable, in response to the first operation, a cross-domain recommendation function of the first application in an application associated with all options in the learning list of the first application ⟍ S1230

FIG. 16

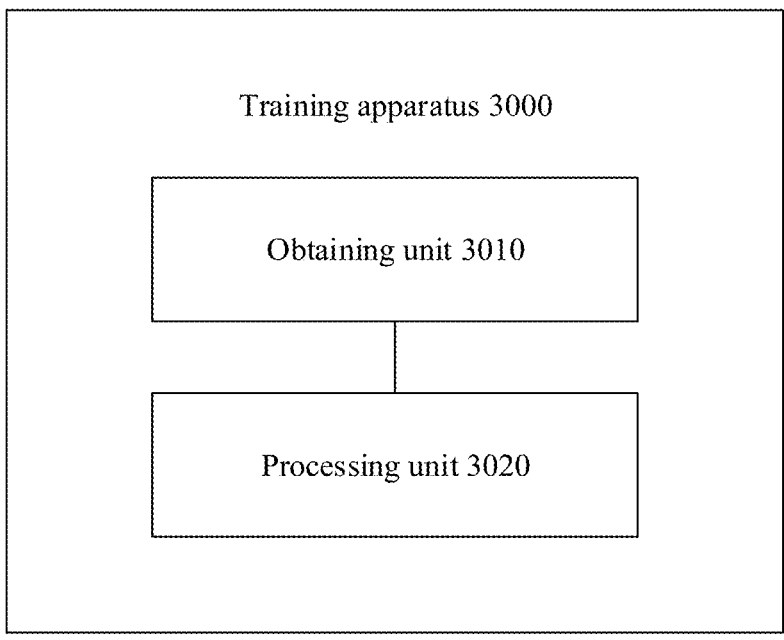

Training apparatus 3000

Obtaining unit 3010

Processing unit 3020

FIG. 17

RECOMMENDATION MODEL TRAINING METHOD, RECOMMENDATION METHOD, APPARATUS, AND COMPUTER-READABLE MEDIUM

CROSS-REFERENCE TO RELATED APPLICATION

This application is a continuation of International Application No. PCT/CN2020/104487, filed on Jul. 24, 2020, the disclosure of which is hereby incorporated by reference in its entirety.

TECHNICAL FIELD

Embodiments of this application relate to the artificial intelligence field, and in particular, to a recommendation model training method, a recommendation method, an apparatus, and a computer-readable medium.

BACKGROUND

A recommendation system recommends an item to a user by comprehensively considering various factors. Specifically, the recommendation system predicts, by comprehensively considering the various factors, a probability that the user selects the item, ranks items based on probabilities, and presents a part or all of a ranking result as a recommendation result.

Usually, the recommendation system learns of a preference of the user from historical data of the user, for example, learns of the preference of the user from a user behavior log, to improve prediction accuracy and provide the user with a more proper recommendation result.

However, because a recommendation model is usually obtained through training based on the historical data of the user, the historical data of the user has large impact on a prediction effect of the recommendation model. If the historical data of users is inaccurate, a prediction effect of the recommendation system is also affected. For example, when the historical data of the user is data with a bias, a recommendation model obtained through training based on the data is also a model with a bias. Consequently, a Matthew effect is caused, and user experience is affected.

Therefore, how to improve accuracy of the recommendation model becomes an urgent problem to be resolved.

SUMMARY

This application provides a recommendation model training method, a recommendation method, an apparatus, and a computer-readable medium, to improve accuracy of a recommendation model.

According to a first aspect, a recommendation model training method is provided. The training method includes: obtaining a first recommendation model, where a model parameter of the first recommendation model is obtained through training based on n first training samples, the first training sample includes information about a first user, information about a first recommended object, and a sample label of the first training sample, the sample label of the first training sample is used to indicate whether the first user performs an operation action on the first recommended object, and n is an integer greater than 1; determining an impact function value of each first training sample with respect to a verification loss of m second training samples in the first recommendation model, where the second training sample includes information about a second user, information about a second recommended object, and a sample label of the second training sample, the sample label of the second training sample is used to indicate whether the second user performs an operation action on the second recommended object, and m is an integer greater than 1; determining, based on the impact function value of each first training sample with respect to the verification loss of the m second training samples in the first recommendation model, a weight corresponding to each first training sample; and training the first recommendation model based on the n first training samples and the weights corresponding to the n first training samples, to obtain a target recommendation model.

According to the solution in this embodiment of this application, importance of a first training sample to a verification loss is evaluated based on an impact function value. In other words, the importance of the first training sample is determined by measuring impact of data disturbance on a verification loss of a second training sample in the first recommendation model. A weight corresponding to the first training sample is determined based on the importance. A recommendation model obtained through retraining based on a first training sample with a weight can better fit data distribution of the second training sample, to reduce impact of data distribution inconsistency between the first training sample and the second training sample in the recommendation model, and improve accuracy of predicting the second training sample by the recommendation model. In this way, user experience can be improved, user stickiness can be enhanced, more suppliers can be attracted to join, and a profit from a recommendation system can be increased.

A recommended object is an object recommended by the recommendation system to a user. For example, the recommended object may be a recommended application in an application market of a terminal device. Alternatively, the recommended object may be a search term recommended by a search system. It should be understood that specific content of the recommended object may be different in different recommendation scenarios, and the specific content of the recommended object is not limited in this embodiment of this application.

For example, information about the user may include an identifier of the user, for example, a user ID. The information about the user may include some personalized attribute information of a user, for example, a gender of the user, an age of the user, an occupation of the user, an income of the user, a hobby of the user, and an educational level of the user. The information about the first user may include one or more items in the foregoing information about the user. The information about the second user may include one or more items in the foregoing information about the user.

For example, information about the recommended object may include an identifier of the recommended object, for example, a recommended object ID. The information about the recommended object further includes some attributes of the recommended object, for example, a name of the recommended object and a type of the recommended object. The information about the first recommended object may include one or more items in the foregoing information about the recommended object. The information about the second recommended object may include one or more items in the foregoing information about the recommended object.

For example, the first training sample may further include first context information. The second training sample may further include second context information.

Context information may include status information related to operation behavior, for example, a time point at which the user interacts with the recommended object, a location on which the user interacts with the recommended object, or a network used when the user interacts with the recommended object, for example, 4G or Wi-Fi.

The first context information may include one or more items of the foregoing context information. The second context information may include one or more items of the foregoing context information. Operation actions performed by the user on the recommended object may include a clicking action of the user, a downloading action of the user, a purchasing action of the user, a browsing action of the user, and a negative comment action of the user.

It should be noted that n first users in the n first training samples may be the same or may be different, n first recommended objects in the n first training samples may be the same or may be different, m second users in the m second training samples may be the same or may be different, and m second recommended objects in the m second training samples may be the same or may be different. The first user and the second user may be the same or may be different. The first recommended object and the second recommended object may be the same or may be different.

The verification loss of the m second training samples in the first recommendation model is used to represent a difference between prediction labels of the m second training samples obtained by processing the m second training samples by using the first recommendation model and sample labels of the m second training samples.

With reference to the first aspect, in some implementations of the first aspect, the method further includes: the determining, based on the impact function value of each first training sample with respect to the verification loss of the m second training samples in the first recommendation model, a weight corresponding to each first training sample includes: the weight corresponding to each first training sample has a negative correlation with the impact function value of each first training sample with respect to the verification loss of the m second training samples.

With reference to the first aspect, in some implementations of the first aspect, an impact function value of each first training sample with respect to a prediction loss of the m second training samples in the first recommendation model satisfies the following formula:

$$\phi(z_i) = \sum_j \phi(z_i, z_j) = -\left[\sum_j \nabla_\theta l(z_j, \hat{\theta})\right]^T H_{\hat{\theta}}^{-1} \nabla_\theta l(z_i, \hat{\theta}),$$

where $z_i$ represents the $i^{th}$ first training sample, $\phi(z_i)$ represents an impact function value of the $i^{th}$ first training sample with respect to the prediction loss of the m second training samples in the first recommendation model, $z_j$ represents the $j^{th}$ second training sample, $\phi(z_i, z_j)$ represents an impact function value of the $i^{th}$ first training sample with respect to a verification loss of the $j^{th}$ second training sample in the first recommendation model, $\nabla_\theta l(z_j, \hat{\theta})$ represents a gradient of $z_j$ on the first recommendation model $\hat{\theta}$, $\Sigma_j \nabla_\theta l(z_j, \hat{\theta})$ represents a sum of gradients of the m second training samples in the first recommendation model $\hat{\theta}$, and $$H_{\hat{\theta}}^{-1}$$

represents an inverse matrix of a Hessian matrix of all first training samples.

The verification loss of the $j^{th}$ second training sample in the first recommendation model is used to represent a difference between a prediction label of the $j^{th}$ second training sample obtained by processing the $j^{th}$ second training sample by using the first recommendation model and a sample label of the $j^{th}$ second training sample.

With reference to the first aspect, in some implementations of the first aspect, the determining, based on the impact function value of each first training sample with respect to the verification loss of the m second training samples in the first recommendation model, a weight corresponding to each first training sample includes: the weight corresponding to each first training sample satisfies the following formula:

$$\pi_i = \frac{1}{1 + e^{\frac{\alpha\phi(z_i)}{max(\{\phi(z_i)\}) - min(\{\phi(z_i)\})}}},$$

where $\pi_i$ represents a weight corresponding to the $i^{th}$ first training sample, a represents a weight adjustment coefficient, and $\phi\{(z_i)\}$ represents a set of impact function values of the n first training samples with respect to the verification loss of the m second training samples in the first recommendation model.

According to the solution in this embodiment of this application, a weight value is calculated based on a sigmoid function, to satisfy both a convex optimization condition and monotonic mapping. In this way, an obtained weight can lead to higher accuracy of a recommendation model obtained through training.

With reference to the first aspect, in some implementations of the first aspect, the m second training samples are obtained when there is a same probability that candidate recommended objects in a candidate recommended object set are presented, and the second recommended object is a candidate recommended object in the candidate recommended object set.

According to the solution in this embodiment of this application, because the second training sample is a training sample without a bias, the weight of the first training sample is adjusted based on the second training sample, so that the recommendation model can more accurately fit data distribution without a bias, thereby reducing impact that is caused by avoiding a bias problem and that is exerted on training, lessening a Matthew effect, and improving accuracy of the recommendation model. In the solution in this embodiment of this application, data distribution of an observed sample is corrected in a counterfactual method, to enhance diversity of recommendation results, eliminate a cocooning effect, improve user experience, enhance user stickiness, enable the user to be immersed in the recommendation system for a longer period of time, promote a virtuous circle of the recommendation system, increase a profit of a supplier, attract more suppliers to join, and ensure long-term stable development of the recommendation system.

In addition, in a training process, only a small quantity of second training samples are required to alleviate impact caused by the bias problem, to improve accuracy of the recommendation model, avoid a case in which an overall profit of the system decreases when a large quantity of second training samples are collected and randomly presented to the recommended object, and further avoid a case in which training efficiency is reduced when a large quantity of features needs to be used for training.

The second training sample is a training sample without a bias.

For example, the m second training samples may be obtained when there is a same probability that the candidate recommended objects in the candidate recommended object set are presented, and the candidate recommended objects are presented on a same location.

With reference to the first aspect, in some implementations of the first aspect, that the m second training samples are obtained when there is a same probability that candidate recommended objects in a candidate recommended object set are presented includes: the m second training samples are obtained when the candidate recommended objects in the candidate recommended object set are randomly presented to the second user; or the m second training samples are obtained when the second user searches for the second recommended object.

The m second training samples may be training samples obtained based on a random delivery policy. When the candidate recommended objects are randomly presented, there is a same probability that the candidate recommended objects are recommended to the user. In this case, an obtained training sample is a training sample without a bias.

The M second training samples may be training samples obtained when the user actively searches for a candidate recommended object. When the user actively searches for a candidate recommended object, the user does not interact based on a presented recommended object, but actively interacts. For the user, there is a same probability that the candidate recommended objects in the candidate recommended object set are presented to the user, regardless of whether the candidate recommended objects are presented. In other words, it may be understood that there is a same probability that the candidate recommended objects in the candidate recommended object set are presented to the user. In this case, an obtained training sample is a training sample without a bias.

With reference to the first aspect, in some implementations of the first aspect, the m second training samples belong to data in a source domain, and the n first training samples belong to data in a target domain.

According to the solution in this embodiment of this application, the first training sample is data in the target domain, and the second training sample is data in the source domain. The weight of the first training sample is adjusted based on the second training sample, so that the recommendation model can more accurately fit data distribution in the source domain, learn of a more accurate preference of the user, and improve accuracy of the recommendation model in the target domain.

According to a second aspect, a recommendation method is provided, including: obtaining information about a target user and information about a candidate recommended object; and inputting the information about the target user and the information about the candidate recommended object into a recommendation model, to predict a probability that the target user performs an operation action on the candidate recommended object, where a model parameter of the recommendation model is obtained by training a first recommendation model based on n first training samples and weights corresponding to the n first training samples, the first recommendation model is obtained through training based on the n first training samples, a weight corresponding to each first training sample is determined based on an impact function value of each first training sample with respect to a verification loss of m second training samples in the first recommendation model, the first training sample includes information about a first user, information about a first recommended object, and a sample label of the first training sample, the sample label of the first training sample is used to indicate whether the first user performs an operation action on the first recommended object, n is an integer greater than 1, the second training sample includes information about a second user, information about a second recommended object, and a sample label of the second training sample, the sample label of the second training sample is used to indicate whether the second user performs an operation action on the second recommended object, and m is an integer greater than 1.

According to the solution in this embodiment of this application, importance of a first training sample to a verification loss is evaluated based on an impact function value. In other words, the importance of the first training sample is determined by measuring impact of data disturbance on a verification loss of the first recommendation model on a second training sample. A weight corresponding to the first training sample is determined based on the importance. A recommendation model obtained through retraining based on a first training sample with a weight can better fit data distribution of the second training sample. A recommendation model obtained through training in this manner has higher accuracy of predicting the second training sample. In this way, user experience can be improved, user stickiness can be enhanced, more suppliers can be attracted to join, and a profit from a recommendation system can be increased.

With reference to the second aspect, in some implementations of the second aspect, that a weight corresponding to each first training sample is determined based on an impact function value of each first training sample with respect to a verification loss of m second training samples in the first recommendation model includes: the weight corresponding to each first training sample has a negative correlation with the impact function value of each first training sample with respect to the verification loss of the m second training samples in the first recommendation model.

With reference to the second aspect, in some implementations of the second aspect, the impact function value of each first training sample with respect to the verification loss of the m second training samples in the first recommendation model satisfies the following formula:

$$\phi(z_i) = \sum_j \phi(z_i, z_j) = -\left[\sum_j \nabla_\theta l(z_j, \hat{\theta})\right]^T H_{\hat{\theta}}^{-1} \nabla_\theta l(z_i, \hat{\theta}),$$

where $z_i$ represents the $i^{th}$ first training sample, $\phi(z_i)$ represents an impact function value of the $i^{th}$ first training sample with respect to a prediction loss of the m second training samples in the first recommendation model, $z_j$ represents the $i^{th}$ second training sample, $\phi(z_i, z_j)$ represents an impact function value of the $i^{th}$ first training sample with respect to a verification loss of the $j^{th}$ second training sample in the first recommendation model, $\nabla_\theta l(z_j, \hat{\theta})$ represents a gradient of $z_i$ on the first recommendation model $\hat{\theta}$, $\sum_j \nabla_\theta l(z_j, \hat{\theta})$ represents a sum of gradients of the m second training samples in the first recommendation model $\hat{\theta}$, and $$H_{\hat{\theta}}^{-1}$$

represents an inverse matrix of a Hessian matrix of all first training samples.

With reference to the second aspect, in some implementations of the second aspect, that a weight corresponding to each first training sample is determined based on an impact function value of each first training sample with respect to a verification loss of m second training samples in the first recommendation model includes: the weight corresponding to each first training sample satisfies the following formula:

$$\pi_i = \frac{1}{1 + e^{\frac{\alpha \phi(z_i)}{max((\phi(z_i))) - min((\phi(z_i)))}}},$$

where $\pi_i$ represents a weight corresponding to the $i^{th}$ first training sample, a represents a weight adjustment coefficient, and $\phi\{(z_i)\}$ represents a set of impact function values of the n first training samples with respect to the verification loss of the m second training samples in the first recommendation model.

With reference to the second aspect, in some implementations of the second aspect, the m second training samples are obtained when there is a same probability that candidate recommended objects in a candidate recommended object set are presented, and the second recommended object is a candidate recommended object in the candidate recommended object set.

With reference to the second aspect, in some implementations of the second aspect, that the m second training samples are obtained when there is a same probability that candidate recommended objects in a candidate recommended object set are presented includes: the m second training samples are obtained when the candidate recommended objects in the candidate recommended object set are randomly presented to the second user; or the m second training samples are obtained when the second user searches for the second recommended object.

With reference to the second aspect, in some implementations of the second aspect, the m second training samples belong to data in a source domain, and the n first training samples belong to data in a target domain.

According to a third aspect, a recommendation method is provided. The method includes: displaying a first interface, where the first interface includes a learning list of at least one application, a learning list of a first application in the learning list of the at least one application includes at least one option, and each of the at least one option is associated with one application; sensing a first operation performed by a user on the first interface; and enabling or disabling, in response to the first operation, a cross-domain recommendation function of the first application in an application associated with some or all options in the learning list of the first application.

According to the solution in this embodiment of this application, knowledge (for example, an interest and a preference of a user) is migrated and shared between different domains, and all historical records of user interaction in both a source domain and a target domain are incorporated into learning, so that a recommendation model can better learn of a preference of a user. Therefore, the recommendation model can also fit the interest and preference of the user well in the target domain, and recommend, to the user, a recommendation result that matches the interest of the user, to realize a cross-domain recommendation and alleviate a cold start problem.

For example, each of the at least one option is associated with one application, and the option associated with the application is used to control the first application to obtain data in the application, to perform a cross-domain recommendation.

In other words, after the first operation is performed, the user may learn from the interface whether the cross-domain recommendation function of the first application is in an enabled state or a disabled state.

Optionally, the first operation may be a tap operation, a double-tap operation, a press-and-hold operation, a slide operation, or the like.

With reference to the third aspect, in some implementations of the third aspect, the first operation is performed on a first option, and the enabling or disabling, in response to the first operation, a cross-domain recommendation function of the first application in an application associated with some or all options in the learning list of the first application includes: enabling or disabling, in response to the first operation performed by the user on the first option, a cross-domain recommendation function of the first application in an application associated with the first option, where the first option is located in the learning list of the first application.

With reference to the third aspect, in some implementations of the third aspect, the first operation is performed on a switch control corresponding to the learning list of the first application, and the enabling or disabling, in response to the first operation, a cross-domain recommendation function of the first application in an application associated with some or all options in the learning list of the first application includes: enabling or disabling, in response to the first operation performed by the user on the switch control, a cross-domain recommendation function of the first application in an application associated with all options in the learning list of the first application.

With reference to the third aspect, in some implementations of the third aspect, the method further includes: displaying a second interface, where the second interface is configured to present one or more recommended objects and prompt information of the one or more recommended objects, and the prompt information of the one or more recommended objects is used to indicate that the one or more recommended objects are determined based on user behavior data in an application in the at least one application.

With reference to the third aspect, in some implementations of the third aspect, the one or more recommended objects are determined by inputting information about the user and information about a candidate recommended object into a recommendation model, to predict a probability that the user performs an operation action on the candidate recommended object.

With reference to the third aspect, in some implementations of the third aspect, a model parameter of the recommendation model is obtained by training a first recommendation model based on n first training samples and weights corresponding to the n first training samples, the first recommendation model is obtained through training based on the n first training samples, a weight corresponding to each first training sample is determined based on an impact function value of each first training sample with respect to a verification loss of m second training samples in the first recommendation model, the first training sample includes information about a first user, information about a first recommended object, and a sample label of the first training sample, the sample label of the first training sample is used to indicate whether the first user performs an operation action on the first recommended object, n is an integer greater than 1, the second training sample includes information about a second user, information about a second recommended object, and a sample label of the second training sample, the sample label of the second training sample is used to indicate whether the second user performs an operation action on the second recommended object, m is an integer greater than 1, the m second training samples are determined based on user behavior data in an application in an application associated with the at least one option, and the n first training samples are determined based on user behavior data in the first application.

It should be understood that an extension, a limitation, an explanation, and a description of related content in the first aspect are also applicable to same content in the second aspect and the third aspect.

According to a fourth aspect, a recommendation model training apparatus is provided. The apparatus includes modules/units configured to perform the method in any one of the first aspect or the implementations of the first aspect.

According to a fifth aspect, a recommendation apparatus is provided. The apparatus includes modules/units configured to perform the method in any one of the second aspect or the implementations of the second aspect.

According to a sixth aspect, an apparatus is provided. The apparatus is included in an electronic device, and the apparatus has a function of implementing behavior of the electronic device in any one of the third aspect and the possible implementations of the third aspect. The functions may be implemented by hardware, or may be implemented by hardware by executing corresponding software. The hardware or the software includes one or more modules or units corresponding to the foregoing functions.

According to a seventh aspect, a recommendation model training apparatus is provided, including an input/output interface, a processor, and a memory. The processor is configured to control the input/output interface to send and receive information. The memory is configured to store a computer program. The processor is configured to invoke the computer program from the memory and run the computer program, so that the training apparatus performs the method in any one of the first aspect or the implementations of the first aspect.

Optionally, the training apparatus may be a terminal device/server, or may be a chip in the terminal device/server.

Optionally, the memory may be located in the processor, and for example, may be a cache in the processor. The memory may alternatively be located outside the processor and independent of the processor, and for example, may be an internal memory of the training apparatus.

According to an eighth aspect, a recommendation apparatus is provided, including an input/output interface, a processor, and a memory. The processor is configured to control the input/output interface to send and receive information. The memory is configured to store a computer program. The processor is configured to invoke the computer program from the memory and run the computer program, so that the apparatus performs the method in any one of the second aspect or the implementations of the second aspect.

Optionally, the apparatus may be a terminal device/server, or may be a chip in the terminal device/server.

Optionally, the memory may be located in the processor, and for example, may be a cache in the processor. The memory may alternatively be located outside the processor and independent of the processor, and for example, may be an internal memory of the apparatus.

According to a ninth aspect, an electronic device is provided, including a processor and a memory. The memory is coupled to the processor, and the memory is configured to store computer program code. The computer program code includes computer instructions. When the processor executes the computer instructions, the electronic device performs the recommendation method in any one of the third aspect and the possible implementations of the third aspect.

According to a tenth aspect, a computer program product is provided. The computer program product includes computer program code; and when the computer program code is run on a computer, the computer is enabled to perform the methods in the foregoing aspects.

It should be noted that some or all of the computer program code may be stored in a first storage medium. The first storage medium may be encapsulated with a processor, or may be encapsulated separately from a processor. This is not specifically limited in the embodiments of this application.

According to an eleventh aspect, a computer-readable medium is provided. The computer-readable medium stores program code; and when the computer program code is run on a computer, the computer is enabled to perform the methods in the foregoing aspects.

BRIEF DESCRIPTION OF DRAWINGS

FIG. 6 is a schematic flowchart of a recommendation model training method according to an embodiment of this application;

FIG. 7 is a schematic flowchart of a recommendation method according to an embodiment of this application;

FIG. 16 is a schematic flowchart of a recommendation method according to an embodiment of this application;

FIG. 17 is a schematic block diagram of a recommendation model training apparatus according to an embodiment of this application;

DESCRIPTION OF EMBODIMENTS

The following describes technical solutions in this application with reference to accompanying drawings.

Figures 1, 2:
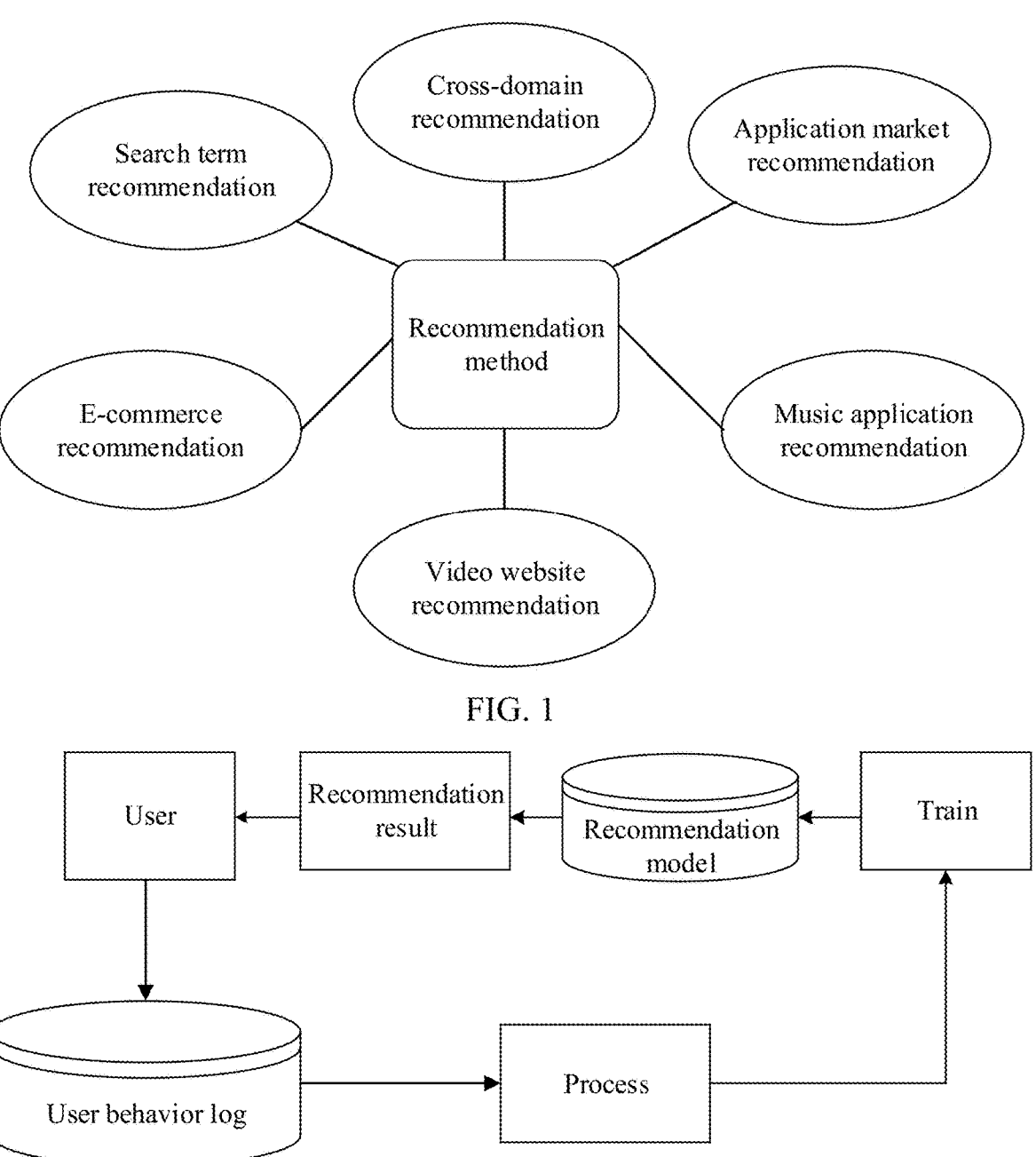
FIG. 1 is a schematic diagram of an application scenario according to an embodiment of this application.
FIG. 2 is a diagram of an architecture of a recommendation system according to an embodiment of this application.

FIG. 1 shows some application scenarios according to an embodiment of this application. A recommendation method provided in embodiments of this application is applicable to all scenarios in which recommendation is required. For example, as shown in FIG. 1, the recommendation method provided in embodiments of this application is applicable to scenarios such as an application market recommendation scenario, a music application recommendation scenario, a video website recommendation scenario, an e-commerce recommendation scenario, and a search term recommendation scenario in which recommendation is required. The following briefly describes three common application scenarios.

Application Scenario 1: Application Market Recommendation

Some applications may be displayed in an application market. A recommendation system may be configured to determine a to-be-displayed application and a corresponding display location of the application. When the user enters the application market, a recommendation request is triggered. Due to an application display location limitation, when receiving the recommendation request, the recommendation system may rank all to-be-displayed applications based on expected revenues, then select one or more most valuable applications, and display the applications at corresponding display locations. For example, in a cost per click (CPC) system, an advertiser needs to pay only when an application is clicked by a user. In the CPC system, a value of the application is usually determined based on an expected profit from the application. In the CPC system, expected revenues of each application are related to a predicted click-through rate (CTR) of the application. In this case, the CTR may be understood as a probability of tapping each application (app). To rank expected revenues, predicted CTRs need to be obtained.

Specifically, predicted CTRs of all the to-be-displayed applications are obtained, the expected revenues of all the applications are calculated and ranked based on the predicted CTRs of the applications, and a to-be-displayed application and a corresponding display location of the application are determined based on a ranking result.

The predicted CTRs of all the to-be-displayed applications may be obtained according to the recommendation method in embodiments of this application. All the to-be-displayed applications can be ranked based on the obtained predicted CTRs, and then the to-be-displayed application and the corresponding display location can be determined based on the ranking result.

Application Scenario 2: Search Term Recommendation

When a user performs search, search terms usually include: a search term actively entered by the user and a search term recommended by a system to the user. Behavior that the user actively enters the search term is user behavior that the system cannot intervene. The search term recommended by the system to the user means that a recommendation request is triggered when the user enters a search scenario. When receiving the recommendation request, a recommendation system may calculate scores of all to-be-presented search terms and rank the scores. For example, a score of a search term may be a probability of tapping the search term. A to-be-presented search term and a corresponding presentation location of the search term may be determined based on a ranking result.

The scores of all the search terms may be calculated according to the recommendation method in embodiments of this application. All the to-be-displayed search terms can be ranked based on the obtained scores, and then the to-be-displayed search term and the corresponding display location can be determined based on the ranking result.

Application Scenario 3: Cross-Domain Recommendation

A recommendation system usually makes a recommendation to a user in a single-domain recommendation manner. Specifically, the recommendation system learns of a preference of the user in a recommendation scenario or a domain based on historical data of the user in the recommendation scenario, and then makes a recommendation to the user based on the preference of the user. Only data in a single domain is considered in both a learning phase (training phase) and an implementation phase (application phase) of a recommendation model. However, in an initial launching phase of a new recommendation scenario, an interaction history of the user is lacked. If an interest and a preference of the user is learned of based on historical data in a local domain, accuracy of a model obtained through learning may be low. In other words, a cold start problem exists.

The cross-domain recommendation is to integrate historical data of the user in a source domain, learn of a preference of the user in this domain, and then guide a recommendation result in a target domain based on the learned preference of the user.

Figure 10:
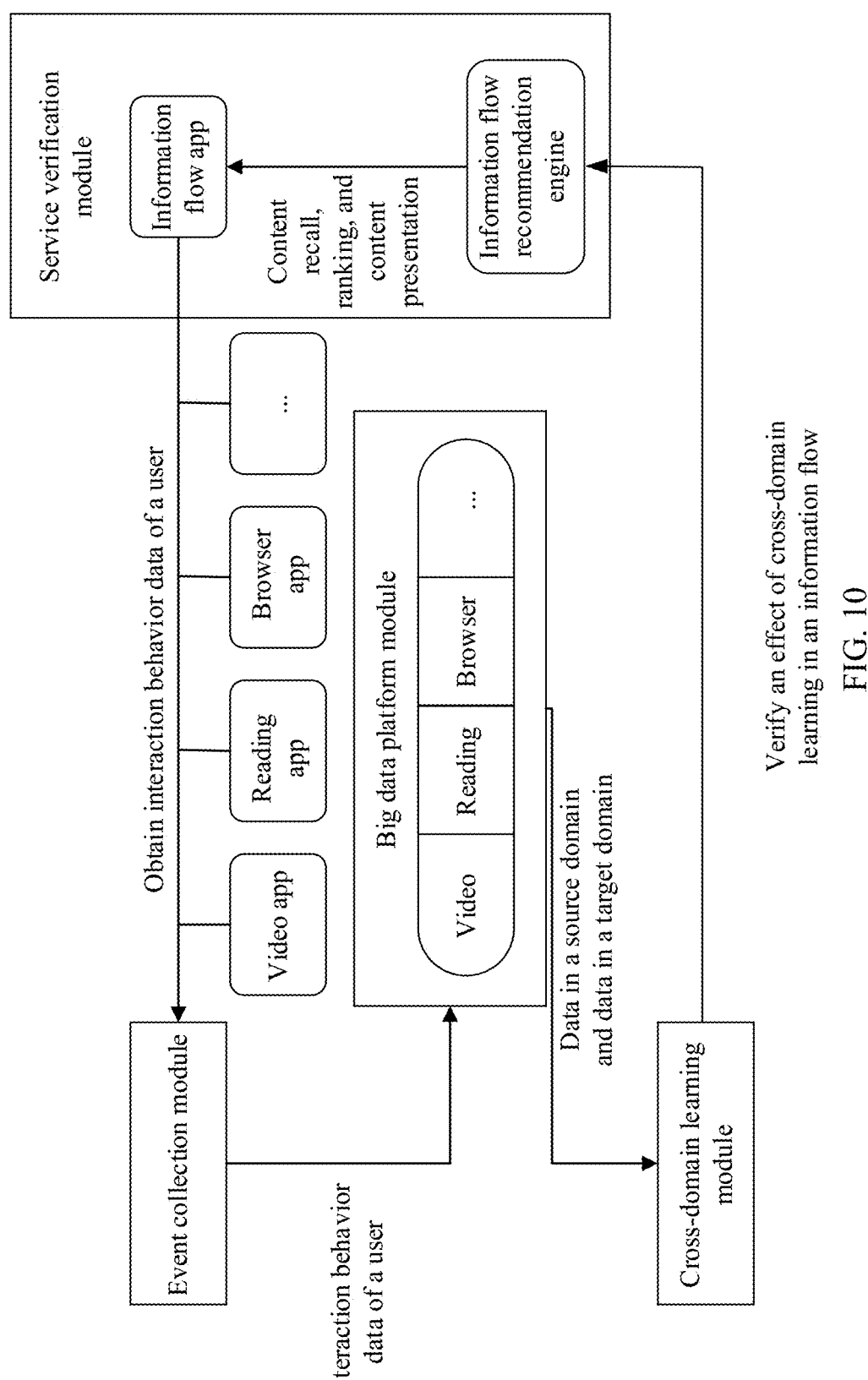
FIG. 10 is a schematic block diagram of lifelong learning according to an embodiment of this application.

The cross-domain recommendation may be applied to a lifelong learning project. FIG. 10 is a schematic diagram of a lifelong learning framework. The framework in FIG. 10 mainly includes an event collection module, a big data platform module, a cross-domain learning module, and a service verification module.

Interaction behavior data of the user is obtained in a plurality of scenarios such as a video app, a music app, and a browser app in FIG. 10, and then processed by the event collection module, to obtain an event log. The event log is stored in a big data platform module. For example, the event collection module processes the interaction behavior data of the user, including operations such as generating an event, collecting an event, concatenating a field, and cleaning a field. The cross-domain learning module may derive data in related domains (the source domain and the target domain) from the big data platform module for training, for example, generate a recommendation model after performing operations such as association analysis, causal inference, and knowledge transfer, and push the recommendation model into the service verification module, for example, an information flow recommendation engine, to be launched and take effect. The recommendation model is used to guide a platform to make a recommendation to the user. After the model is launched, the user initiates a recommendation request. The recommendation model performs processing such as recall and ranking on candidate content, and then the recommendation model recommends related content to the user in an information flow app, so that the user interacts, to implement a closed loop of the system.

The cross-domain recommendation may be applied to the cross-domain learning module.

It should be understood that the lifelong learning framework in FIG. 10 is merely an example, and the lifelong learning framework may further include more or fewer modules than those shown in FIG. 10, to perform a corresponding function.

The cross-domain recommendation may be performed in a method in the embodiments of this application. The preference of the user that is learned of from the source domain is used to guide a training process of a recommendation model in the target domain, to obtain a recommendation model that can be applied to the target domain, and then make a recommendation to the user in the target domain.

The following describes, from a model training side and a model application side, the method provided in this application.

The recommendation model training method provided in the embodiments of this application may be specifically applied to a data processing method such as data training, machine learning, or deep learning, to perform symbolic and formal intelligent information modeling, extraction, preprocessing, training, and the like on training data (for example, a first training sample in this application), so as to finally obtain a trained recommendation model. In addition, in the recommendation method provided in the embodiments of this application, the foregoing trained recommendation model may be used, and input data (for example, information about a target user and information about a candidate recommended object in this application) is input into the trained recommendation model, to obtain output data (for example, a predicted probability that the target user performs an operation action on the candidate recommended object in this application). It should be noted that the recommendation model training method and the recommendation method that are provided in embodiments of this application are inventions generated based on a same concept, and may also be understood as two parts of a system, or two phases of an entire process, for example, a model training phase and a model application phase.

To facilitate understanding of embodiments of this application, the following first describes related concepts of related terms in embodiments of this application.

(1) Recommendation System

The recommendation system is a system in which analysis is performed based on historical data of a user and a new recommendation request is predicted based on an analysis result, to obtain a recommendation result.

A task of the recommendation system is to recommend, to the user by comprehensively considering factors such as the user, items, and current context information, an item that the user is most interested in. In an actual modeling process, the items are ranked based on a probability that the user is most likely to perform tapping or a conversion probability, and a recommendation result is presented.

FIG. 2 is an architectural diagram of a recommendation system according to an embodiment of this application. When the user enters the system, a recommendation request is triggered. The recommendation system inputs the recommendation request and related information into a recommendation model to predict a selection rate of the user for an item in the system. Further, items are ranked based on predicted selection rates or functions of the selection rates. The recommendation system may determine, based on a ranking result, an item to be presented to the user and a location on which the item is to be presented, and feed back, to the user as a recommendation result the item to be presented to the user and the location on which the item is to be presented. The user browses the displayed item and may perform an operation action, such as a browsing action or downloading action. The operation action of the user may be stored in a user behavior log, and training data may be obtained by processing the user behavior log. The recommendation model may be trained based on the training data, or a model parameter of the recommendation model may be continuously updated, to improve a prediction effect of the recommendation model.

For example, when the user opens an application market in an intelligent terminal (for example, a mobile phone), a recommendation system in the application market may be triggered, that is, a recommendation request is triggered in the recommendation system. The recommendation system may predict, based on a historical behavior log of the user, for example, a historical download record of the user, and a feature of the application market, for example, environment feature information such as a time and a location, a probability that the user downloads each candidate application in the recommendation system. The recommendation system may display candidate applications in descending order of predicted download probabilities, to improve download probabilities of the candidate applications.

For example, when there are p display locations in the application market (where p is a positive integer), the recommendation system may select p candidate applications with highest predicted download probabilities for display, display an application with a higher predicted download probability in the p candidate applications at a higher-ranking location, and display an application with a lower predicted download probability in the p candidate applications at a lower-ranking location.

The foregoing recommendation model may be a neural network model. The following describes related terms and concepts of a neural network that may be used in the embodiments of this application.

(2) Neural Network

The neural network may include a neural unit. The neural unit may be an operation unit that uses $x_s$ and an intercept 1 as an input, and an output of the operation unit may be shown in formula (1):

$$h_{W,b}(x) = f(W^T x) = f\left(\sum_{s=1}^{n} W_s x_s + b\right) \tag{1}$$

Herein, s=1, 2, . . . , n, n is a natural number greater than 1, $W_s$ represents a weight of $x_s$, b represents a bias of the neuron, and f is an activation function of the neural unit, and the activation function is used to perform non-linear transformation on a feature in the neural network, to convert an input signal in the neural unit into an output signal. The output signal of the activation function may be used as an input of a next convolution layer. The activation function may be a sigmoid function. The neural network is a network formed by joining many single neurons together. To be specific, an output of a neuron may be an input of another neuron. An input of each neuron may be connected to a local receptive field of a previous layer to extract a feature of the local receptive field. The local receptive field may be a region including several neurons.

(3) Deep Neural Network

The deep neural network (DNN) is also referred to as a multi-layer neural network, and may be understood as a neural network having a plurality of hidden layers. The DNN is divided based on positions of different layers. Neural networks inside the DNN may be classified into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is necessarily connected to any neuron in an (i+1)th layer.

Although the DNN seems complex, work of each layer is not complex. For simplicity, a linear expression is as follows: $\vec{y}=\alpha(W^{\Box\vec{x}+\vec{b}})$. Herein, $\vec{x}$ is an input vector, $\vec{y}$ is an output vector, $\vec{b}$ is the offset vector, W is a weight matrix (also referred to as a coefficient), and $\alpha(\ )$ is an activation function. At each layer, only such a simple operation is performed on the input vector, to obtain the output vector. Because the DNN includes a plurality of layers, there is also a large quantity of coefficients W and a large quantity of offset vectors. Definitions of these parameters in the DNN are as follows: The coefficient W is used as an example. It is assumed that in a DNN having three layers, a linear coefficient from the fourth neuron at the second layer to the second neuron at the third layer is defined as $$W_{24}^3.$$

A superscript 3 represents a number of a layer in which the coefficient W is located, and a subscript corresponds to an index 2 of the third layer for output and an index 4 of the second layer for input.

In conclusion, a coefficient of connecting the $k^{th}$ neuron at the $(L-1)^{th}$ layer and the $j^{th}$ neuron at the $L^{th}$ layer is defined as $$W_{jk}^L.$$

It should be noted that there is no parameter W for the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix of all layers of the trained deep neural network (a weight matrix formed by vectors W at many layers).

(4) Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(5) Backpropagation Algorithm

A neural network may correct a value of a parameter of an initial neural network model in a training process based on an error backpropagation (BP) algorithm, so that a reconstruction error and loss of the neural network model becomes smaller. Specifically, an input signal is forward transferred until an error loss occurs during output, and the parameters in the initial neural network model are updated based on backpropagation error loss information, so that the error loss is reduced. The backpropagation algorithm is backpropagation motion dominated by the error loss, and aims to obtain a parameter of an optimal neural network model, for example, a weight matrix.

Figure 3:
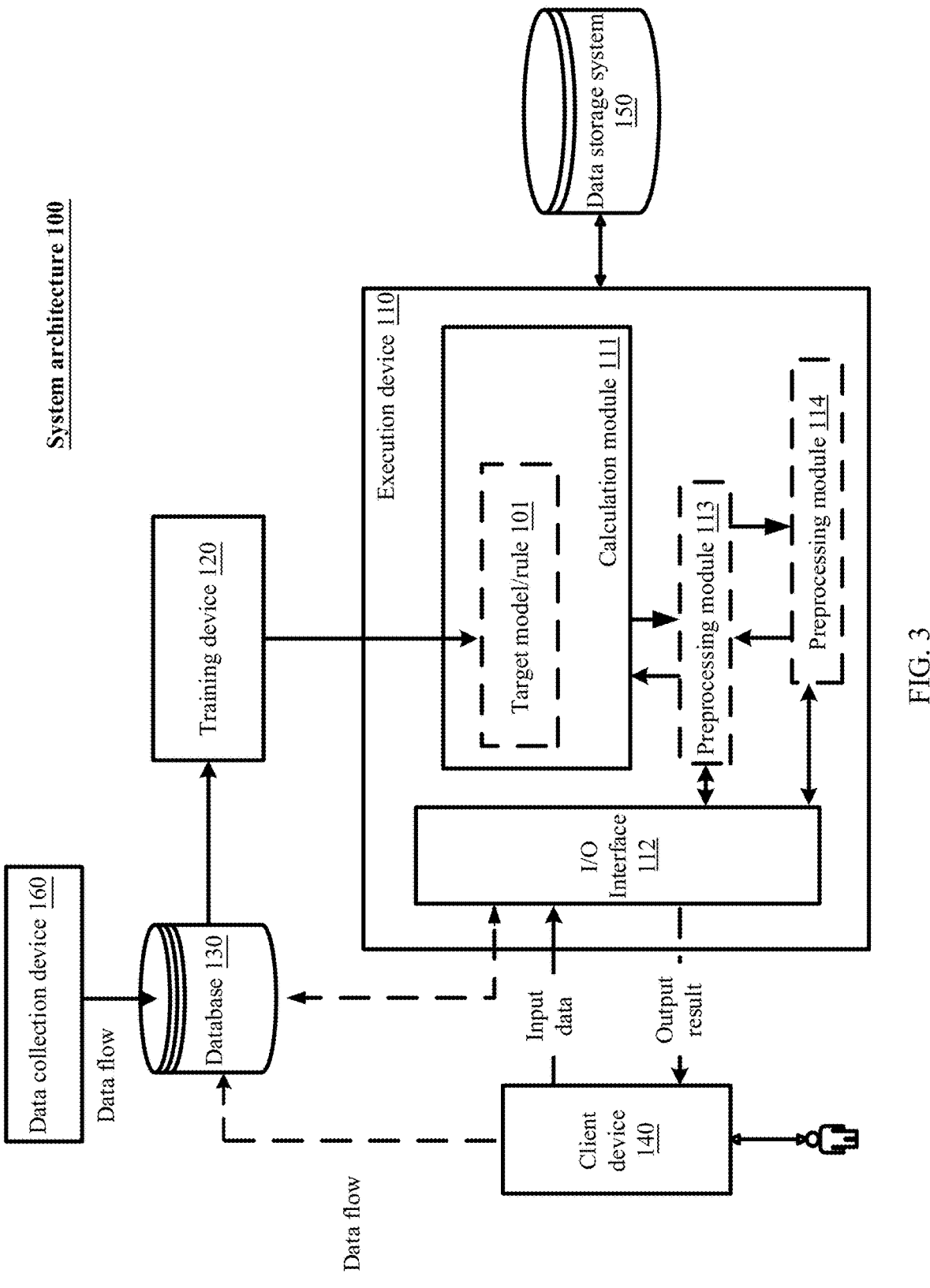
FIG. 3 is a schematic diagram of a structure of a system architecture according to an embodiment of this application.

The following describes in detail a system architecture in an embodiment of this application with reference to FIG. 3.

FIG. 3 is a schematic diagram of a system architecture according to an embodiment of this application. As shown in FIG. 3, the system architecture 100 includes an execution device 110, a training device 120, a database 130, a client device 140, a data storage system 150, and a data collection device 160.

In addition, the execution device 110 includes a calculation module 111, an I/O interface 112, a preprocessing module 113, and a preprocessing module 114. The calculation module 111 may include a target model/rule 101, and the preprocessing module 113 and the preprocessing module 114 are optional.

The data collection device 160 is configured to collect training data. In a recommendation model training method in embodiments of this application, a recommendation model may be further trained based on the training data.

For example, in this embodiment of this application, the training data may include a first training sample and a sample label of the first training sample. The first training sample may include attribute information of a first user and information about a first recommended object. The sample label of the first training sample indicates whether the first user performs an operation action on the first recommended object. Whether the first user performs an operation action on the first recommended object may be understood as whether the first user selects the first recommended object.

After collecting the training data, the data collection device 160 stores the training data in the database 130. The training device 120 performs training based on the training data maintained in the database 130, to obtain the target model/rule 101.

The following describes how the training device 120 obtains the target model/rule 101 based on the training data. The training device 120 processes an input training sample, and compares an output prediction label with the sample label, until a difference between the prediction label output by the training device 120 and the sample label is less than a specific threshold, to obtain a trained recommendation model. In other words, the trained recommendation model may be the target model/rule 101.

The target model/rule 101 can be used to predict whether the user selects the recommended object or predict a probability that the user selects the recommended object. The target model/rule 101 in this embodiment of this application may be specifically a neural network, a logistic regression model, or the like.

It should be noted that, in actual application, the training data maintained in the database 130 is not necessarily collected by the data collection device 160, but may be received from another device. It should be further noted that the training device 120 may not necessarily train the target model/rule 101 completely based on the training data maintained in the database 130, or may obtain training data from a cloud or another place to perform model training. The foregoing description should not be construed as a limitation on the embodiments of this application.

The target model/rule 101 obtained by the training device 120 through training may be applied to different systems or devices, for example, applied to the execution device 110 shown in FIG. 3. The execution device 110 may be a terminal, such as a mobile phone terminal, a tablet computer, a notebook computer, an augmented reality (AR) terminal, a virtual reality (VR) terminal, or a vehicle-mounted terminal, or may be a server, a cloud, or the like. In FIG. 3, the execution device 110 is provided with the input/output (I/O) interface 112, configured to exchange data with an external device. A user may input data to the I/O interface 112 through the client device 140. The input data in this embodiment of this application may include training data input through the client device, recommendation request triggered by the user, or the like. The client device 140 herein may be specifically a terminal device.

The preprocessing module 113 and the preprocessing module 114 are configured to perform preprocessing on the input data received by the I/O interface 112. For example, the preprocessing module 113 may be configured to perform data cleaning on the input data, for example, extract a key field. For example, the preprocessing module 114 may be configured to extract a feature of the input data.

In this embodiment of this application, there may be no preprocessing module 113 or the preprocessing module 114, or there may be only one preprocessing module. When the preprocessing module 113 and the preprocessing module 114 do not exist, the calculation module 111 may be directly used to process the input data.

In a process in which the execution device 110 performs preprocessing on the input data or the calculation module 111 of the execution device 110 performs related processing such as calculation, the execution device 110 may invoke data, code, and the like in a data storage system 150 for corresponding processing, and may also store data, instructions, and the like obtained through corresponding processing into the data storage system 150.

Finally, the I/O interface 112 provides a processing result for the user. For example, in a recommendation system, the target model/rule 101 may be used to predict whether the target user selects a candidate recommended object or a probability of selecting a candidate recommended object, and obtain a recommendation result based on whether the target user selects the candidate recommended object or the probability of selecting the candidate recommended object. The recommendation result is presented to the client device 140, so that the recommendation result is provided for the user.

For example, in this embodiment of this application, the recommendation result may be a recommendation sequence of candidate recommended objects that is obtained based on the probability that the target user selects the candidate recommended object, or the recommendation result may be a target recommended object obtained based on the probability that the target user selects the candidate recommended object. The target recommended object may be one or more candidate recommended objects with highest probabilities.

It should be noted that the training device 120 may generate, based on different training samples, corresponding target models/rules 101 for different targets or different tasks. The corresponding target models/rules 101 may be used to implement the foregoing targets or complete the foregoing tasks, to provide a desired result for the user.

In a case shown in FIG. 3, the user may manually provide the input data. The manual provision may be performed in a user interface provided by the I/O interface 112.

In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may also be used as a data collection end to collect, as new training data, input data that is input into the I/O interface 112 and an output result that is output from the I/O interface 112 that are shown in the figure, and store the new sample data into the database 130. Certainly, the client device 140 may alternatively not perform collection, but the I/O interface 112 directly stores, as new sample data into the database 130, input data that is input into the I/O interface 112 and an output result that is output from the I/O interface 112 that are shown in the figure.

It should be noted that FIG. 3 is merely a schematic diagram of a system architecture according to an embodiment of this application. A location relationship between the devices, the components, the modules, and the like shown in the figure does not constitute any limitation. For example, in FIG. 3, the data storage system 150 is an external memory relative to the execution device 110, but in another case, the data storage system 150 may alternatively be disposed in the execution device 110.

Figure 4:
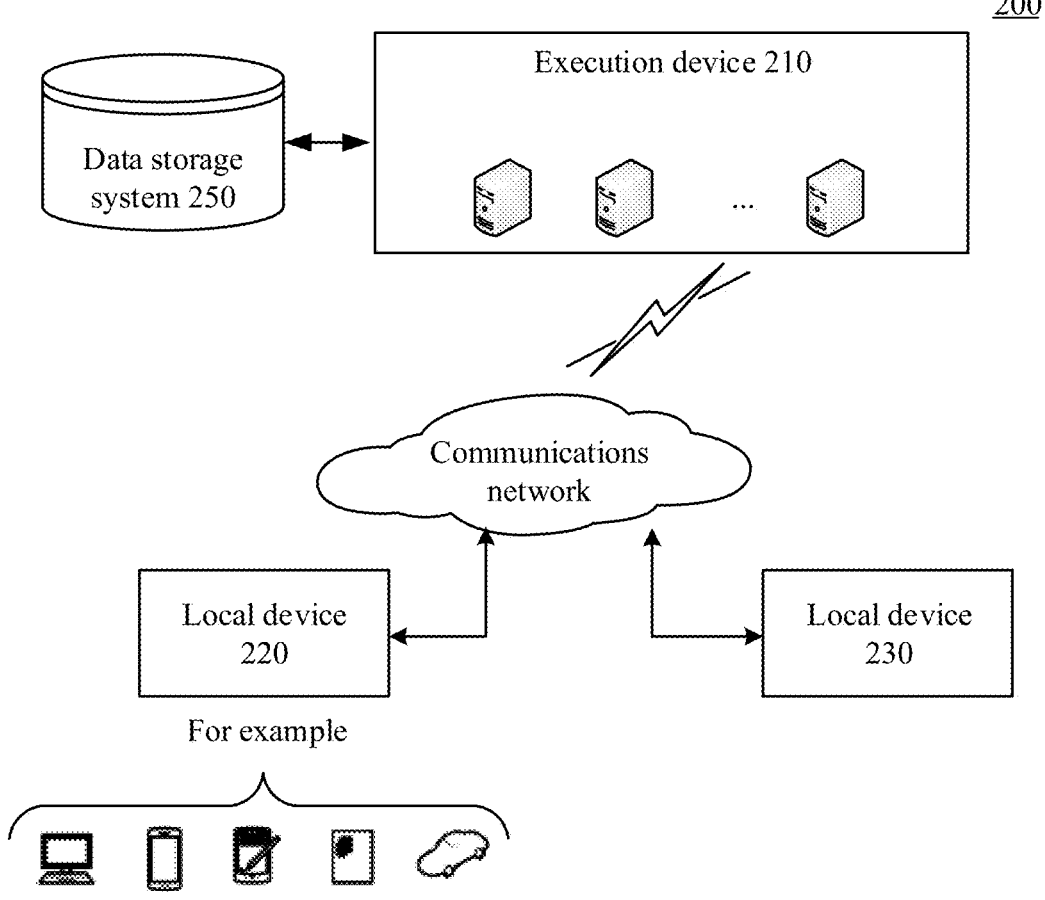
FIG. 4 is a schematic diagram of a system architecture according to an embodiment of this application.

FIG. 4 shows a system architecture 200 to which a recommendation model training method and a recommendation method in the embodiments of this application are applied according to an embodiment of this application. The system architecture 200 may include a local device 220, a local device 230, an execution device 210, and a data storage system 250. The local device 220 and the local device 230 are connected to the execution device 210 through a communications network.

The execution device 210 is implemented by one or more servers. Optionally, the execution device 210 cooperates with another computing device, for example, a device such as a data storage device, a router, or a load balancer. The execution device 210 may be disposed on one physical site, or distributed on a plurality of physical sites. The execution device 210 may implement the recommendation model training method and the recommendation method in the embodiments of this application by using data in the data storage system 250 or by invoking program code in the data storage system 250.

For example, the data storage system 250 may be deployed in the local device 220 or the local device 230. For example, the data storage system 250 may be configured to store training data.

It should be noted that the execution device 210 may also be referred to as a cloud device. In this case, the execution device 210 may be deployed on the cloud.

Specifically, the execution device 210 may perform the following process:

obtaining a first recommendation model, where a model parameter of the first recommendation model is obtained through training based on n first training samples, the first training sample includes information about a first user, information about a first recommended object, and a sample label of the first training sample, the sample label of the first training sample is used to indicate whether the first user performs an operation action on the first recommended object, and n is an integer greater than 1; determining an impact function value of each first training sample with respect to a verification loss of m second training samples in the first recommendation model, where the second training sample includes information about a second user, information about a second recommended object, and a sample label of the second training sample, the sample label of the second training sample is used to indicate whether the second user performs an operation action on the second recommended object, and m is an integer greater than 1; determining, based on the impact function value of each first training sample with respect to the verification loss of the m second training samples in the first recommendation model, a weight corresponding to each first training sample; and training the first recommendation model based on the n first training samples and the weights corresponding to the n first training samples, to obtain a target recommendation model.

The execution device 210 can perform the foregoing process, to obtain a recommendation model through training, and can more accurately predict, by using the recommendation model, a probability that the target user performs an operation action on a candidate recommended object.

In a possible implementation, the training method performed by the execution device 210 may be a training method performed on the cloud.

Users may operate respective user equipment (for example, the local device 220 and the local device 230) to interact with the execution device 210. Each local device may be any computing device, such as a personal computer, a computer workstation, a smartphone, a tablet computer, an intelligent camera, a smart automobile, another type of cellular phone, a media consumption device, a wearable device, a set-top box, or a game console.

A local device of each user may interact with the execution device 210 through a communications network of any communications mechanism/communications standard. The communications network may be a wide area network, a local area network, a point-to-point connection, or any combination thereof.

In an implementation, the local device 220 or the local device 230 may obtain a related parameter of the recommendation model from the execution device 210, and the local device 220 or the local device 230 predicts, by using the recommendation model, the probability that the target user performs an operation action on the candidate recommended object.

In another implementation, the recommendation model may be directly deployed on the execution device 210, and the execution device 210 obtains a recommendation request and related information such as information about the target user and information about the candidate recommended object from the local device 220 and the local device 230, and predicts, by using the recommendation model, the probability that the target user performs an operation action on the candidate recommended object.

For example, the data storage system 250 may be deployed in the local device 220 or the local device 230, and configured to store training data of the local device.

For example, the data storage system 250 may be independent of the local device 220 or the local device 230, and is independently deployed on a storage device. The storage device may interact with the local device, obtain a user behavior log in the local device, and store the user behavior log in the storage device.

Usually, the recommendation model may learn of a preference of the user from historical data of the user, predict, based on the preference of the user, the probability that the user selects the candidate recommended object, determine a recommendation result based on the predicted probability, and present the recommendation result to the user.

The recommendation model is obtained through training based on the historical data of the user. Therefore, the historical data of the user that is used for training has a large impact on a prediction result of the recommendation model. When distribution of data used for training is inconsistent with distribution of actual data, the data used for training has a bias relative to the actual data. A recommendation model obtained through training based on the data with a bias also has a bias, and affects accuracy of the prediction result.

Therefore, how to improve accuracy of the recommendation model becomes an urgent problem to be resolved.

The embodiments of this application provide a recommendation model training method and a recommendation method, to resolve a problem of data distribution inconsistency and improve accuracy of a recommendation result.

Figure 5:
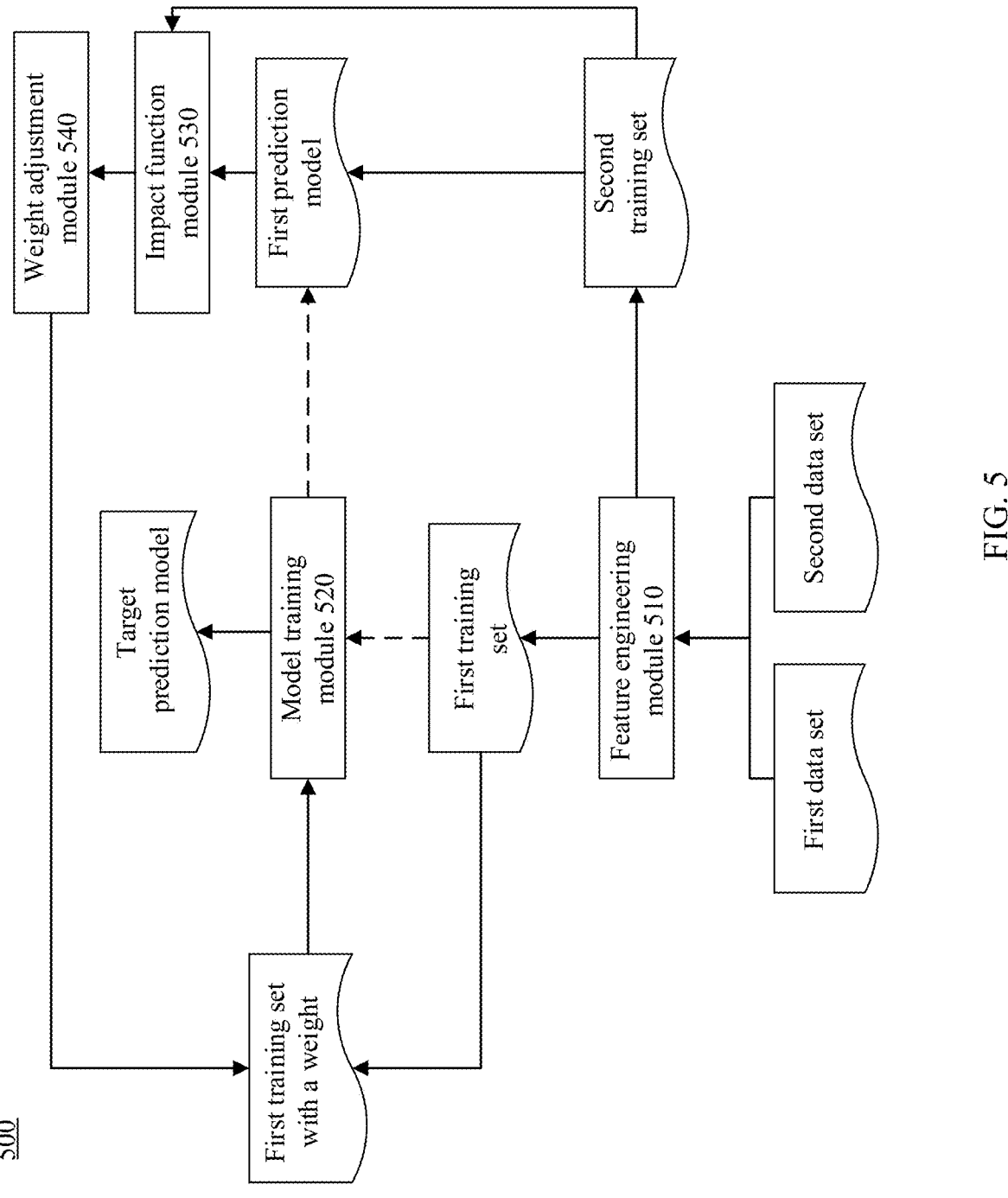
FIG. 5 is a schematic block diagram of a recommendation framework according to an embodiment of this application.

FIG. 5 is a schematic diagram of a recommendation framework 500 according to an embodiment of this application. To better understand the method in the embodiments of this application, the following briefly describes a function of each module in FIG. 5.

The recommendation framework 500 includes a feature engineering module 510, a model training module 520, an impact function module 530, and a weight adjustment module 540.

The feature engineering module 510 may be configured to extract a feature from original data of a data set, to obtain a training sample.

For example, the original data may be a user behavior log.

The feature extracted from the original data in the data set includes a feature such as information about a user and information about a recommended object.

As shown in FIG. 5, a first data set and a second data set are input into the feature engineering module 510, to obtain a first training set and a second training set. The first training set includes n first training samples. The second training set includes m second training samples. Herein, n is an integer greater than 1, and m is an integer greater than 1.

The first training sample includes information about a first user, information about a first recommended object, and a sample label of the first training sample. The sample label of the first training sample is used to indicate whether the first user performs an operation action on the first recommended object.

The second training sample includes information about a second user, information about a second recommended object, and a sample label of the second training sample. The sample label of the second training sample is used to indicate whether the second user performs an operation action on the second recommended object.

Further, the feature engineering module 510 may be configured to process data in the data set, to obtain a training sample in a uniform format, for example, a training sample in a format such as libSVM.

It should be noted that, the feature engineering module 510 is an optional module, and the training sample may be obtained in another manner. For example, a neural network is used to extract the feature from the original data in the data set, to obtain the training sample. Alternatively, the training sample is prestored. For example, the training sample may be stored in the database 130 shown in FIG. 3. Alternatively, the training sample may be received from another device.

The model training module 520 may be configured to train a recommendation model, to obtain a model parameter of the recommendation model.

The recommendation model may be configured to predict a probability that the user in the input data performs an operation action on a candidate recommended object.

Specifically, as shown in FIG. 5, the model training module 520 may be configured to train the recommendation model based on the first training set, to obtain a first recommendation model, or obtain a model parameter of the first recommendation model. The first recommendation model is a recommendation model obtained through training based on the first training set.

The model training module 520 may be further configured to train the first recommendation model based on a first training set with a weight, to obtain a target recommendation model, or to obtain a model parameter of the target recommendation model.

The first training set with a weight includes a first training sample with a weight.

The impact function module 530 may be configured to determine an impact function value of each first training sample with respect to a verification loss of the m second training samples in the first recommendation model.

The weight adjustment module 540 may be configured to determine, based on an impact function value of each first training sample with respect to a prediction loss of the m second training samples in the first recommendation model, a weight corresponding to each first training sample.

The first training sample with a weight may be obtained based on the first training sample and the weight corresponding to the first training sample.

For example, the recommendation framework 500 may be configured to perform a process including two phases, namely, a training phase and a recommendation phase. The following separately describes the training phase and the recommendation phase.

Training Phase:

S1: Obtain the first training set and the second training set.

The first training set includes the n first training samples. The second training set includes the m second training samples.

For example, as shown in FIG. 5, the first data set and the second data set are separately input into the feature engineering module 510, to separately obtain the first training set and the second training set.

It should be noted that step S1 is an optional step. For example, the first training set and the second training set may alternatively be prestored data. For example, the first training set and the second training set may be data stored in the database 130 in FIG. 3.

S2: Train the recommendation model based on the first training set, to obtain the model parameter of the first recommendation model.

For example, as shown in FIG. 5, the n first training samples in the first training set are input into the model training module 520 for training, to obtain the first recommendation model, or to obtain the model parameter of the first recommendation model.

It should be noted that step S2 is an optional step. For example, the first recommendation model may alternatively be a recommendation model received from another device. The model parameter of the first recommendation model is obtained through training based on the n first training samples.

S3: Determine the impact function value of each first training sample with respect to the verification loss of the m second training samples in the first recommendation model.

As shown in FIG. 5, step S3 may be performed by the impact function module 530.

S4: Determine, based on the impact function value of each first training sample with respect to a prediction loss of the second training set in the first recommendation model, the weight corresponding to each first training sample.

In other words, the weight corresponding to each first training sample is determined based on the impact function value of each first training sample with respect to the prediction loss of the m second training samples in the first recommendation model.

As shown in FIG. 5, step S4 may be performed by the weight adjustment module 540.

S5: Train the first recommendation model based on the first training set with a weight, to obtain the model parameter of the target recommendation model.

In other words, the first recommendation model is trained based on the n first training samples and the weights of the n first training samples, to obtain the target recommendation model, or to obtain the model parameter of the target recommendation model.

As shown in FIG. 5, step S5 may be performed by the model training module 520.

For example, the recommendation model may be a low-rank model. For example, the recommendation model may be a matrix factorization (MF) model, a factorization machine (FM), an FFM, or the like.

Recommendation Phase:

In the recommendation phase, only the target recommendation model needs to be deployed. After receiving a recommendation request, a recommendation system inputs information about a target user and information about the candidate recommended object into the target recommendation model, and predicts, by using the target recommendation model, the probability that the target user performs an operation action on the candidate recommended object or predicts whether the target user performs an operation action on the candidate recommended object.

For example, the target user may be a user that triggers the recommendation request.

For example, the recommendation system may construct an input vector based on feature information, and predict, by using the target recommendation model, the probability that the user performs an operation action on the recommended object. The feature information includes the information about the target user and the information about the candidate recommended object.

For specific descriptions of the training phase, refer to a method 600 in the following, and for specific descriptions of the recommendation phase, refer to a method 700 in the following.

According to the method in the embodiments of this application, importance of a first training sample to a verification loss is evaluated based on an impact function value. In other words, the importance of the first training sample is determined by measuring impact of data disturbance on a verification loss of the first recommendation model on a second training sample. A weight corresponding to the first training sample is determined based on the importance. A recommendation model obtained through retraining based on the first training sample with a weight can better fit data distribution of the second training sample, to improve accuracy of predicting the second training sample by the recommendation model. In this way, user experience can be improved, user stickiness can be enhanced, more suppliers can be attracted to join, and a profit from a recommendation system can be increased.

The following describes the recommendation model training method and the recommendation method in the embodiments of this application with reference to FIG. 6 to FIG. 12.

FIG. 6 shows a recommendation model training method 600 according to an embodiment of this application. The method shown in FIG. 6 may be performed by a recommendation model training apparatus. The training apparatus may be a cloud service device, may be a terminal device, for example, an apparatus such as a computer or a server whose computing capability is sufficient to perform the recommendation model training method, or may be a system including a cloud service device and a terminal device. For example, the method 600 may be performed by the training device 120 in FIG. 3, the execution device 210 in FIG. 4, or a local device.

For example, the method 600 may specifically be performed by the training device 120 shown in FIG. 3, and a first training sample and a second training sample in the method 600 may be training data maintained in the database 130 shown in FIG. 3.

The method 600 includes step S610 to step S640. The following describes step S610 to step S640 in detail.

S610: Obtain a first recommendation model.

A model parameter of the first recommendation model is obtained through training based on n first training samples. The first training sample includes information about a first user, information about a first recommended object, and a sample label of the first training sample. The sample label of the first training sample is used to indicate whether the first user performs an operation action on the first recommended object. n is an integer greater than 1.

It should be noted that n first users in the n first training samples may be the same or may be different, and n first recommended objects in the n first training samples may be the same or may be different.

For example, a first user in a training sample 1 # (an example of the first training sample) is a user A, the first recommended object is an item A, a first user in a training sample 2 # (an example of the first training sample) is a user B, and the first recommended object is the item A. For another example, a first user in a training sample 1 # (an example of the first training sample) is a user A, the first recommended object is an item A, a first user in a training sample 2 # (an example of the first training sample) is the user A, and the first recommended object is an item B.

Information about a user may include an identifier of the user, for example, a user ID. The information about the user may include some personalized attribute information of a user, for example, a gender of the user, an age of the user, an occupation of the user, an income of the user, a hobby of the user, and an educational level of the user.

The information about the first user may include one or more items in the foregoing information about the user.

A recommended object is an object recommended by a recommendation system to the user. For example, the recommended object may be a recommended application in an application market of a terminal device in the foregoing application scenario 1. Alternatively, the recommended object may be a search term recommended by a system in the foregoing application scenario 2. It should be understood that specific content of the recommended object may be different in different recommendation scenarios, and the specific content of the recommended object is not limited in this embodiment of this application.

The first recommended object may be one of the foregoing recommended objects.

Information about the recommended object may include an identifier of the recommended object, for example, a recommended object ID. The information about the recommended object may further include some attribute information of the recommended object, for example, a name of the recommended object and a type of the recommended object. The recommended object may have different attribute information in different recommendation scenarios.

For example, in the foregoing application scenario 1, the recommended object may be an application in the application market, and information about the recommended object may be information about the application. The information about the application may include an identifier of the application, for example, an application ID. The information about the application may further include some attribute information of the application, for example, a name of the application, a developer of the application, a type of the application, a package size of the application, a score of the application, or a comment on the application.

For another example, in a content recommendation scenario, the recommended object may be an article, and information about the recommended object may be a type of an article, a keyword of the article, a theme of the article, a comment on the article, or an expression form of the article.

For another example, in an advertisement recommendation scenario, the recommended object may be an advertisement, and information of the recommended object may be a type of the advertisement, an audience of the advertisement, or the like.

The information about the first recommended object may include one or more items in the foregoing information about the recommended object.

Information about the first user and information about the first recommended object may be used as first feature information of the first training sample.

Further, the first feature information further includes first context information. In other words, the first training sample may further include the first context information.

Context information may include status information related to operation behavior, for example, a time point at which the user interacts with the recommended object, a location on which the user interacts with the recommended object, or a network used when the user interacts with the recommended object, for example, 4G or Wi-Fi.

Interaction between the user and the recommended object indicates that the user performs an operation action on the recommended object or does not perform an operation action on the recommended object.

The first context information may include one or more items of the foregoing context information.

A sample label may be used to mark a training sample as a positive sample or a negative sample. For example, the label may be 0 or 1, a label of the positive sample may be 1, and a label of the negative sample may be 0. For another example, the label may alternatively be a specific value. To be specific, a probability that the training sample is the positive sample or the negative sample is marked by using the specific value.

The sample label may be obtained based on whether the user performs an operation action on the recommended object.

Operation actions performed by the user on the recommended object may include a clicking action of the user, a downloading action of the user, a purchasing action of the user, a browsing action of the user, or a negative comment action of the user.

The sample label indicates whether the user performs an operation action on the recommended object. For example, there may be the following several cases in which the sample label is determined based on whether the user performs an operation action on the recommended object.

Case 1: If the user performs an operation action on the recommended object, the sample label is 1. If the user performs no operation action on the recommended object, the sample label is 0.

For example, in an application market recommendation scenario, the operation action may be a downloading action. Specifically, when a user in the training sample 1 # (an example of the first training sample) performs a downloading action on a recommended object in the training sample 1 #, the training sample 1 # is a positive sample, and a sample label of the training sample 1 # is 1. When a user in training sample 1 # does not perform a downloading action on a recommended object in training sample 1 #, the training sample 1 # is a negative sample, and a sample label of the training sample 1 # is 0.

Case 2: If the user performs an operation action on the recommended object, the sample label is 0. If the user performs no operation action on the recommended object, the sample label is 1.

For example, in an application market recommendation scenario, the operation action may be a negative comment action. Specifically, when a user in the training sample 1 # (an example of the first training sample) performs a negative comment action on a recommended object in the training sample 1 #, the training sample 1 # is a negative sample, and a sample label of the training sample 1 # is 0. When a user in training sample 1 # does not perform a negative comment action on a recommended object in training sample 1 #, the training sample 1 # is a positive sample, and a sample label of the training sample 1 # is 1.

Case 3: If the user performs a first type of operation action on the recommended object, the sample label is 1. If the user performs a second type of operation action on the recommended object, the sample label is 0.

For example, in an application scenario of paid music recommendation, the first type of operation action may include a purchasing action or the like, and the second type of operation action may include a browsing action or the like. Specifically, when a user in the training sample 1 # (an example of the first training sample) performs a browsing action on a recommended object in the training sample 1 #, the training sample 1 # is a negative sample, and a sample label of the training sample 1 # is 0. When a user in training sample 1 # performs a purchase action on a recommended object in training sample 1 #, the training sample 1 # is a positive sample, and a sample label of the training sample 1 # is 1. It should be understood that in this embodiment of this application, only the purchasing action and the browsing action are used as examples to describe a process of determining the sample label, but this should not be considered as a limitation on this embodiment of this application. In an actual application, the sample label corresponding to the operation action may be determined based on a specific application scenario. For example, in some scenarios, the first type of operation action may include a browsing action or the like, and the second type of operation action may include a negative comment action or the like.

It should be further understood that, in this embodiment of this application, only one type of operation behavior (the case 1 and the case 2) and two types of operation behavior (the case 3) are used as examples to describe a process of determining the sample label, and should not be considered as a limitation to this embodiment of this application. In an actual application, more than two types of operation actions may be further included, and a sample label corresponding to the operation action may be determined based on a specific application scenario. For example, a first type of operation action is a downloading action, a second type of operation action is a browsing action, and a third type of operation action is a negative comment action. If the user performs only the downloading action on the recommended object, the sample label may be 1. If the user performs only the browsing action on the recommended object, the sample label may be 0. If the user performs only the negative comment action on the recommended object, the sample label may be 0. For example, when a user performs both the downloading action and the negative comment action on the recommended object, the sample label is 0.

The following describes a training sample by using an example.

For example, in the application market application scenario, the recommended object is an application. The training sample 1 # (an example of the first training sample) may include four types of attribute data, namely, a user ID in the training sample 1 #, a gender of the user, an occupation of the user, an ID of the application, and a type of the application. In other words, feature information of the training sample 1 # includes four features.

For example, the training sample 1 # is a positive sample. The training sample 1 # may be represented as z=[1, 28a85y62, male, teacher, 78ht1c9a, social contact], and 1 in the first place indicates that the sample label of the training sample 1 # is 1. The sample label may indicate whether the user performs a downloading action on the application, and the sample label 1 may indicate that the user has downloaded the application.

For another example, in the advertisement recommendation application scenario, the recommended object is an advertisement. The training sample 1 # (an example of the first training sample) may include six types of attribute data, namely, a user ID, an advertisement ID, an advertisement presentation type, an advertisement provider, an advertisement content category, and an advertisement click-through rate in the training sample 1 #. In other words, feature information of the training sample 1 # includes six features.

For example, the training sample 1 # is a positive sample. The sample label of the training sample 1 # is 1. The training sample 1 # may be represented as z=[1, 25c83c98, 68fd1e64, picture, provider 1, news, 0.032], and 1 in the first place indicates that the sample label of the training sample 1 # is 1. The sample label may indicate whether the user performs a tap action on the advertisement. The sample label 1 may indicate that the user clicks the advertisement.

It should be understood that the foregoing training sample representation manner is merely an example. In a specific application scenario, a training sample represented in another form may alternatively be used, or the training sample may be further processed and then input into a recommendation model. This is not limited in this application.

For example, the first training sample may be data stored in the data storage system 250 shown in FIG. 4 or data stored in the database 130 shown in FIG. 3.

For example, the first training sample may alternatively be obtained in another manner. For example, the first training sample is received from another device.

For another example, the first training sample may alternatively be obtained in the following manner.

Data preprocessing is performed on original data, and a feature is extracted, to obtain a training sample. The training sample may be the first training sample.

For example, this obtaining process may be performed by the feature engineering module 510 in FIG. 5. To be specific, a first data set is input into the feature engineering module 510 for processing, to obtain a first training set. The first training set includes n first training samples.

The first data set includes original data. For example, the original data may be a user behavior log. In this case, it may be understood that the first training set is determined based on the user behavior log. In other words, the first training sample may be determined based on the user behavior log.

Specifically, the training sample may be obtained by using the following steps.

Step (1): Perform data preprocessing on the original data.

For example, the data preprocessing may include data cleaning.

The original data (for example, the user behavior log) is filtered, to retain or select only required content, for example, a key field.

Step (2): Extract a feature.

For example, the feature may be extracted through feature engineering.

Specifically, processing such as manual crossing or feature selection may be performed on a feature in each dimension in the user behavior log or a preprocessed user behavior log, to obtain a required feature.

For another example, a neural network model may alternatively be used to extract a feature.

Specifically, a feature in each dimension in the user behavior log or a preprocessed user behavior log may be input into the neural network model, and the neural network model outputs a required feature.

Step (3): Process a missing value.

Some fields are missing due to data concatenation or no feedback from the user. Usually, the missing value may be supplemented by setting a default value.

Step (4): Discrete processing.

A continuous feature is converted into a discrete feature, or a plurality of categories are classified into one category.

Discretization is a process of converting or dividing continuous attributes, features or variables into discrete or nominal attributes/features/variables/intervals. After the features are discretized, the model is more stable, and a risk that the model is overfitted is reduced.

For example, the continuous feature is converted into the discrete feature through bucket discretization.

For example, in the advertisement recommendation scenario, the advertisement click-through rate is a continuous feature, and the continuous feature may be converted into a discrete feature through bucket discretization.

For example, in the advertisement recommendation scenario, the advertisement presentation category includes a picture, a video, an article, and the like. The picture and the video are classified into a visual category, and the article is classified into a text category.

Step (5): Allocate a feature ID.

The feature ID is allocated to each feature value.

For example, the feature ID may be allocated by generating a hash value (hash) or in an auto-increment manner. For specific descriptions, refer to the method 900 in the following.

It should be understood that the foregoing sequence of steps is merely a description sequence, and should not be considered as an actual execution sequence. In an execution process, the steps may be performed in a sequence of the foregoing steps, or may not be performed in a sequence of the foregoing steps. For example, step (3) is performed first and then step (2) is performed.

The first training sample may be obtained with reference to the foregoing manner.

For example, the first recommendation model may be a prestored or pretrained model. For example, the first recommendation model may be stored in the data storage system 250 shown in FIG. 4 or in the database 130 shown in FIG. 3.

For example, the first recommendation model may alternatively be obtained in another manner. For example, the first recommendation model is received from another device.

For another example, the first recommendation model may alternatively be obtained in the following manner. The obtaining process may alternatively be understood as a training process. For example, the training process may be performed by the model training module 520 in FIG. 5. That is, the first training set is input into the model training module 520, to obtain the first recommendation model.

The recommendation model is trained based on the n first training samples, to obtain the first recommendation model, or to obtain the model parameter of the first recommendation model.

Specifically, the first feature information is used as an input into the first recommendation model, and the sample label of the first training sample is used as a target output value of the first recommendation model for training, to obtain the first recommendation model.

The first feature information includes the information about the first user and the information about the first recommended object. Further, the first feature information may further include the first context information.

The recommendation model may be used to predict whether the user performs an operation action on the recommended object when the recommended object is recommended to the user. A value output by the recommendation model is a prediction label. The prediction label is used to indicate whether the user performs an operation action on the recommended object. For example, the prediction label may be 0 or 1. In other words, 0 or 1 is used to indicate whether the user performs an operation action on the recommended object. The prediction label may alternatively be a probability value. In other words, the probability value is used to represent a probability that the user performs an operation action on the recommended object. In other words, an output of the recommendation model may be 0 or 1, or may be a probability value. A specific form of an output value of the recommendation model is not limited in this embodiment of this application.

For example, the recommendation model in this embodiment of this application may be a plurality of types of models. For example, the recommendation model may be a simple model such as an average advertisement CTR model or a logistic regression (LR) model. For another example, the recommendation model may be a low-rank model such as a matrix factorization (MF) model, a factorization machine (FM), or a field-aware factorization machine (FFM). For another example, the recommendation model may be a deep model such as a deep FM model or a DNN model.

For example, the recommendation model may be constructed by using an automatic differentiation deep learning framework, for example, by using a framework such as TensorFlow or PyTorch.

The recommendation model includes a loss function, and the loss function is used to indicate a difference between a prediction label of the first training sample and the sample label of the first training sample.

For example, the training process may be to continuously reduce a value of the loss function until a convergence, to obtain the model parameters of the first recommendation model.

The first recommendation model may satisfy the following formula:

$$\min_{w} \lambda R(w) + \sum_{i=1}^{n} l(y_i, \hat{y}_i),$$

where w represents a model parameter, R(w) represents a regularization term, $\lambda$ represents a hyperparameter that determines the regularization term, $y_i$ represents a sample label of the $i^{th}$ first training sample, $\hat{y}_i$ represents a prediction label of the $i^{th}$ first training sample, n represents a quantity of first training samples, $l(y_i, \hat{y}_i)$ represents a difference between the sample label of the $i^{th}$ first training sample and the prediction label of the $i^{th}$ first training sample.

S620: Determine an impact function value of each first training sample with respect to a verification loss of m second training samples in the first recommendation model.

The second training sample includes second feature information and a sample label of the second training sample. The second feature information includes information about a second user and information about a second recommended object. The sample label of the second training sample is used to indicate whether the second user performs an operation action on the second recommended object. m is an integer greater than 1.

For example, step S620 may be performed by the impact function module 530 in FIG. 5.

It should be noted that m second users in the m second training samples may be the same or may be different, and m second recommended objects in the m second training samples may be the same or may be different.

For example, a second user in a training sample 1 # (an example of the second training sample) is a user A, a second recommended object is an item A, a second user in a training sample 2 # (an example of the second training sample) is a user B, and the second recommended object is the item A. For another example, a second user in a training sample 1 # (an example of the second training sample) is a user A, a second recommended object is an item A, a second user in a training sample 2 # (an example of the second training sample) is the user A, and the second recommended object is an item B.

It should be further understood that the first user and the second user may be the same or may be different. The first recommended object and the second recommended object may be the same or may be different.

The n first training samples may include some or all of the m second training samples, or may not include the second training sample.

The information about the second user may include one or more items in the attribute information of the user described in step S610.

The second recommended object may be one of the recommended objects described in step S610.

The information about the second recommended object may include one or more items of the information about the recommended object in step S610.

The information about the second user and the information about the second recommended object may be used as the second feature information of the second training sample.

Further, the second feature information further includes second context information. In other words, the second training sample may further include the second context information.

The second context information may include one or more items of the context information in step S610.

A description of the sample label of the second sample may be similar to that in step S610, and details are not described herein.

For example, the second training sample may be data stored in the data storage system 250 shown in FIG. 4 or data stored in the database 130 shown in FIG. 3.

For example, the second training sample may alternatively be obtained in another manner. For example, the second training sample is received from another device.

For another example, the second training sample may alternatively be obtained in the following manner.

Data preprocessing is performed on the original data, and a feature is extracted, to obtain a training sample. The training sample may be the second training sample.

For example, this obtaining process may be performed by the feature engineering module 510 in FIG. 5. To be specific, a second data set is input into the feature engineering module 510 for processing, to obtain a second training set. The second training set includes the m second training samples.

The second data set includes original data. For example, the original data may be a user behavior log. In this case, it may be understood that the second training set is determined based on the user behavior log. In other words, the second training sample may be determined based on the user behavior log.

For a specific manner of obtaining the second training sample based on the original data, refer to the descriptions in step S610. Details are not described herein again.

Optionally, the second training sample is a training sample without a bias. The first training sample may be a training sample with a bias. For a specific process, refer to a method 900 in the following.

A training sample with bias may be understood as a training sample obtained when a recommended object is displayed to a user according to a specific rule. For example, when a recommendation request is received, candidate recommended objects are ranked based on expected revenues of the candidate recommended objects, and a candidate recommended object to be displayed to the user is determined based on ranking of the expected revenues. To be specific, in this case, each recommended object has a different probability of being displayed to the user, and a probability of displaying a recommended object with higher expected revenues to the user is higher. In this case, an obtained training sample is a training sample with bias.

In the training sample without a bias, recommended subjects have an equal exposure probability and consistent distribution of presentation locations. In other words, the training sample without a bias is a training sample obtained when there is a same probability that candidate recommended objects in a candidate recommended object set are presented. When there is more than one representation location in the recommendation system, the training sample without a bias is obtained when there is a same probability that the candidate recommended objects in the candidate recommended object set are presented, and the candidate recommended objects are presented on a same location.

For example, the training sample without a bias is a training sample obtained based on a random delivery policy.

The random delivery policy is a delivery policy in which the candidate recommended objects in the candidate recommended object set are presented to the user in a random presentation manner. When the candidate recommended objects are randomly presented, there is a same probability that the candidate recommended objects are recommended to the user. In this case, an obtained training sample is a training sample without a bias.

For another example, the training sample without a bias is a training sample obtained when the user actively searches for a candidate recommended object. When the user actively searches for a candidate recommended object, the user does not interact based on a presented recommended object, but actively interacts. For the user, there is a same probability that the candidate recommended objects in the candidate recommended object set are presented to the user, regardless of whether the candidate recommended objects are presented. In other words, it may be understood that there is a same probability that the candidate recommended objects in the candidate recommended object set are presented to the user.

Optionally, the m second training samples are obtained when there is a same probability that the candidate recommended objects in the candidate recommended object set are presented, and the second recommended object is a candidate recommended object in the candidate recommended object set.

Optionally, the m second training samples are obtained when the candidate recommended objects in the candidate recommended object set are randomly presented to the second user; or the m second training samples are obtained when the second user searches for the second recommended object.

The following describes the training sample without bias and the training sample with bias by using an example in which a recommended object is a recommended application in an application market.

For a recommendation request, an application is displayed according to a random launch policy. To be specific, one or more applications in a plurality of candidate recommended applications are randomly displayed to a user corresponding to the recommendation request, and all candidate applications have a same probability of being displayed to the user corresponding to the recommendation request. In this case, an obtained training sample is a training sample without bias. For one recommendation request, the plurality of candidate applications are ranked based on an expected profit, and an application that is determined, based on ranking, to be presented to the user. In this case, an obtained training sample is a training sample with a bias.

When the user enters the application market to actively search for an application, the training sample obtained in this case is a training sample without a bias. For example, the user may be considered as the second user, and the application actively searched for by the user may be used as the second recommended object.

Optionally, an obtaining time point of the first training sample is earlier than an obtaining time point of the second training sample. For a specific process, refer to a method 1000 in the following.

Optionally, the first training sample may be determined based on data in a target domain, and the second training sample may be determined based on data in a source domain. For a specific process, refer to a method 1100 in the following.

The verification loss of the m second training samples in the first recommendation model is a difference between prediction labels of the m second training samples obtained by processing the m second training samples by using the first recommendation model and sample labels of them second training samples. For ease of description, the verification loss of the m second training samples in the first recommendation model is referred to as a verification loss for short. The impact function value of the first training sample with respect to the verification loss of the m second training samples in the first recommendation model is referred to as an impact function value of the first training sample with respect to the verification loss for short.

The impact function value is obtained by performing data disturbance on the first training sample and evaluating impact, on the verification loss, of a first recommendation model obtained after disturbance.

In this manner, importance of the first training sample to the verification loss can be determined. A higher degree of consistency between data distribution of the first training sample and data distribution of the second training sample indicates higher importance of the first training sample to the verification loss and a smaller impact function value of the first training sample.

Specifically, the impact function value satisfies the following formula:

$$\phi(z_i) = \Sigma_j \phi(z_i, z_j) = -\left[\sum_j \nabla_\theta l(z_j, \hat{\theta})\right]^T H_{\hat{\theta}}^{-1} \nabla_\theta l(z_i, \hat{\theta}),$$

where $z_i$ represents the $i^{th}$ first training sample, $\phi(z_i)$ represents an impact function value of the $i^{th}$ first training sample with respect to a prediction loss of the m second training samples in the first recommendation model, namely, an impact function value of the $i^{th}$ first training sample with respect to a verification loss of all second training samples in the first recommendation model, $z_j$ represents the $j^{th}$ second training sample, and $\phi(z_i, z_j)$ represents an impact function value of the $i^{th}$ first training sample with respect to a verification loss of the $j^{th}$ second training sample in the first recommendation model. The verification loss of the $j^{th}$ second training sample is a difference between a prediction label obtained by inputting the $j^{th}$ second training sample into the first recommendation model and a sample label of the $j^{th}$ second training sample. $\nabla_\theta l(z_j, \hat{\theta})$ represents a gradient of $z_i$ on the first recommendation model $\theta$, $\Sigma_j \nabla_\theta l(z_j, \hat{\theta})$ represents a sum of gradients of the m second training samples in the first recommendation model $\hat{\theta}$, a superscript T represents a transpose matrix of a matrix, and $$H_{\hat{\theta}}^{-1} \qquad 5$$

represents an inverse matrix of a Hessian matrix of all first training samples. The Hessian matrix of all the first training samples represents an average value of a second derivative of all the first training samples in the first recommendation model $\hat{\theta}$. Specifically, $$H_{\hat{\theta}} = \frac{1}{n}\sum_{i=1}^{n}\nabla_{\hat{\theta}}^{2}l(z_i,\hat{\theta}). \qquad 15$$

For example, the impact function value may be calculated by using the following steps.

Step (1): Calculate gradients of all the second training samples in the first recommendation model $\hat{\theta}$, to obtain a sum $\Sigma_j\nabla_{\hat{\theta}}l(z_j,\hat{\theta})$ of the gradients of all the second training samples in the first recommendation model $\hat{\theta}$.

Step (2): Calculate the Hessian matrix of all the first training samples.

The inverse matrix of the Hessian matrix is usually approximately solved by using the implicit Hessian-vector product (HVP), and the Hessian matrix does not need to be calculated explicitly. For example, the inverse matrix of the Hessian matrix is solved by using a conjugate gradient (CG) method or a stochastic estimation method.

Step (3): Multiply an inverse matrix of a matrix obtained in step (1) and the inverse matrix of the Hessian matrix obtained in step (2), to obtain a left half part $IF_L$ of the impact function. For impact function values of all first training samples, values of the left half part are the same, and therefore, this part needs to be calculated only once.

Step (4): Calculate an impact function value of each first training sample. Specifically, $IF_L$ in step (3) is separately multiplied by each first training sample in the first recommendation model $\hat{\theta}$, to obtain the impact function value of each first training sample.

It should be understood that the foregoing calculation process is merely an example, and the impact function value of the first training sample may be obtained through calculation in another manner. This is not limited in this embodiment of this application.

S630: Adjust a weight corresponding to each first training sample based on the impact function value of each first training sample with respect to the verification loss of the m second training samples in a first prediction model.

For example, step S630 may be performed by the weight adjustment module 540 in FIG. 5.

As described above, a higher consistency between distribution of the first training sample and distribution of the second training sample indicates a smaller value of the impact function value of the first training sample. In addition, a higher consistency between the distribution of the first training sample and the distribution of the second training sample indicates higher importance of the first training sample to a prediction loss. Therefore, a larger weight is set for a first training sample of higher importance, so that distribution of all the first training samples can develop in a direction of the distribution of the second training sample.

For example, the weight may satisfy the following formula:

$$\arg\min_{\pi}\sum_{i=1}^{n}\frac{\pi_i-1}{n}\phi(z_i),$$

where $\pi_i$ represents a weight corresponding to the $i^{th}$ first training sample, $\pi=1+n\varepsilon_i$, $\pi_i\in[0,B]$, B represents a maximum value of the weight, $\varepsilon_i$ represents a disturbance value of the $i^{th}$ first training sample, and $\overrightarrow{\pi}=(\pi_1,\pi_2,\dots,\pi_n)$ is a set of weights corresponding to the n first training samples Theoretically, this method is an optimal weight calculation method. However, based on a convex optimization theory, the method does not meet a convex optimization condition of Lipschitz continuity, and training overfitting easily occurs when the weight is determined by using the method.

Optionally, the weight corresponding to the first training sample has a negative correlation with the impact function value of the first training sample with respect to the verification loss. In other words, a larger impact function value of the first training sample with respect to the prediction loss indicates a smaller weight corresponding to the first training sample.

Optionally, the weight satisfies the following formula:

$$\pi_i = \frac{1}{1+e^{\frac{\alpha\phi(z_i)}{max(\{\phi(z_i)\})-min(\{\phi(z_i)\})}}},$$

where $\alpha$ indicates a weight adjustment coefficient, max( ) indicates to obtain a maximum value of an operation object, min( ) indicates to obtain a minimum value of the operation object, the operation object $\{\phi(z_i)\}$ represents a set of impact function values of the n first training samples with respect to the verification loss of the m second training samples in the first recommendation model, and this part can be used to unify a scale.

In this weight calculation method, the weight value is calculated based on a sigmoid function, to satisfy both a convex optimization condition and monotonic mapping. The weight obtained in this method can lead to higher accuracy of a recommendation model obtained through training.

It should be noted that, the foregoing method for calculating the weight value based on the sigmoid function is merely an example, and another method that can satisfy both the convex optimization condition and monotonic mapping can also be used for calculating the weight value, for example, a linear mapping method.

S640: Train the first recommendation model based on the n first training samples and the weights corresponding to the n first training samples, to obtain a target recommendation model.

For example, step S640 may be performed by the model training module 520 in FIG. 5.

Training samples including the n first training samples and the weights corresponding to the n first training samples are n first training samples with a weight.

As shown in FIG. 5, a first training set with a weight is obtained based on the first training set and the weight corresponding to the first training sample, and the first training set with a weight includes n first training samples with a weight.

For a specific training method, refer to the descriptions in step S610.

The recommendation model includes a loss function, and the loss function is used to indicate the difference between the prediction label of the first training sample and the sample label of the first training sample.

For example, the training process in step S640 may be to continuously reduce a sum of values of a loss function corresponding to all the first training samples with a weight until a convergence, to obtain a model parameter of the target recommendation model. In other words, a proportion of a value of the loss function of the first training sample in the sum of all values of the loss function is adjusted by using the weight corresponding to the first training sample.

The target recommendation model may satisfy the following formula:

$$\min_{w} \lambda R(w) + \sum_{i=1}^{n} \pi_i l(y_i, \hat{y}_i),$$

where w represents a model parameter, R(w) represents a regularization term, $\lambda$ represents a hyperparameter that determines the regularization term, $y_i$ represents a sample label of the $i^{th}$ first training sample, $\hat{y}_i$ represents a prediction label of the $i^{th}$ first training sample, n represents a quantity of first training samples, $l(y_i, \hat{y}_i)$ represents a difference between the sample label of the $i^{th}$ first training sample and the prediction label of the $i^{th}$ first training sample, and $\pi_i$ represents the weight corresponding to the $i^{th}$ first training sample.

According to the method in this embodiment of this application, the importance of the first training sample to the verification loss is evaluated based on the impact function value. In other words, the importance of the first training sample is determined by measuring impact of data disturbance on the verification loss of the first recommendation model on the second training sample. The weight corresponding to the first training sample is determined based on the importance. A recommendation model obtained through retraining based on the first training sample with a weight can better fit data distribution of the second training sample, to improve accuracy of predicting the second training sample by the recommendation model. In this way, user experience can be improved, user stickiness can be enhanced, more suppliers can be attracted to join, and a profit from the recommendation system can be increased.

FIG. 7 is a schematic diagram of a recommendation method 700 according to an embodiment of this application. The method shown in FIG. 7 may be performed by a recommendation apparatus. The apparatus may be a cloud service device, may be a terminal device, for example, an apparatus such as a computer or a server whose computing capability is sufficient to perform the recommendation method, or may be a system including a cloud service device and a terminal device. For example, the method 700 may be performed by the execution device 110 in FIG. 3, the execution device 210 in FIG. 4, or a local device.

For example, the method 700 may be specifically executed by the execution device 110 shown in FIG. 3, and a target user and a candidate recommended object in the method 700 may be data input by the I/O interface 112 shown in FIG. 3.

The method 700 includes step S710 to step S720. The following describes step S710 and step S720 in detail.

S710: Obtain information about a target user and information about a candidate recommended object.

For example, when a user enters a recommendation system, a recommendation request is triggered. A user that triggers the recommendation request may be used as a target user in the recommendation system, and a recommended object that may be presented to the user in the recommendation system is used as a candidate recommended object.

For example, the information about the target user may include an identifier of the user, for example, an ID of the target user, and the information about the target user may further include some personalized attribute information of the user, for example, a gender of the target user, an age of the target user, an occupation of the target user, an income of the target user, a hobby of the target user, or education of the target user.

For example, the information about the candidate recommended object may include an identifier of the candidate recommended object, for example, an ID of the candidate recommended object. The information about the candidate recommended object may further include some attribute information of the candidate recommended object, for example, a name of the candidate recommended object or a type of the candidate recommended object.

S720: Input the information about the target user and the information about the candidate recommended object into a recommendation model, and predict a probability that the target user performs an operation action on the candidate recommended object.

For example, candidate recommended objects in the candidate recommendation set may be ranked based on predicted probabilities that the target user performs an operation action on the candidate recommended objects, to obtain a recommendation result of the candidate recommended objects. For example, a candidate recommended object with a highest probability is selected and displayed to the user. For example, the candidate recommended object may be a candidate recommended application.

Figures 8, 9:
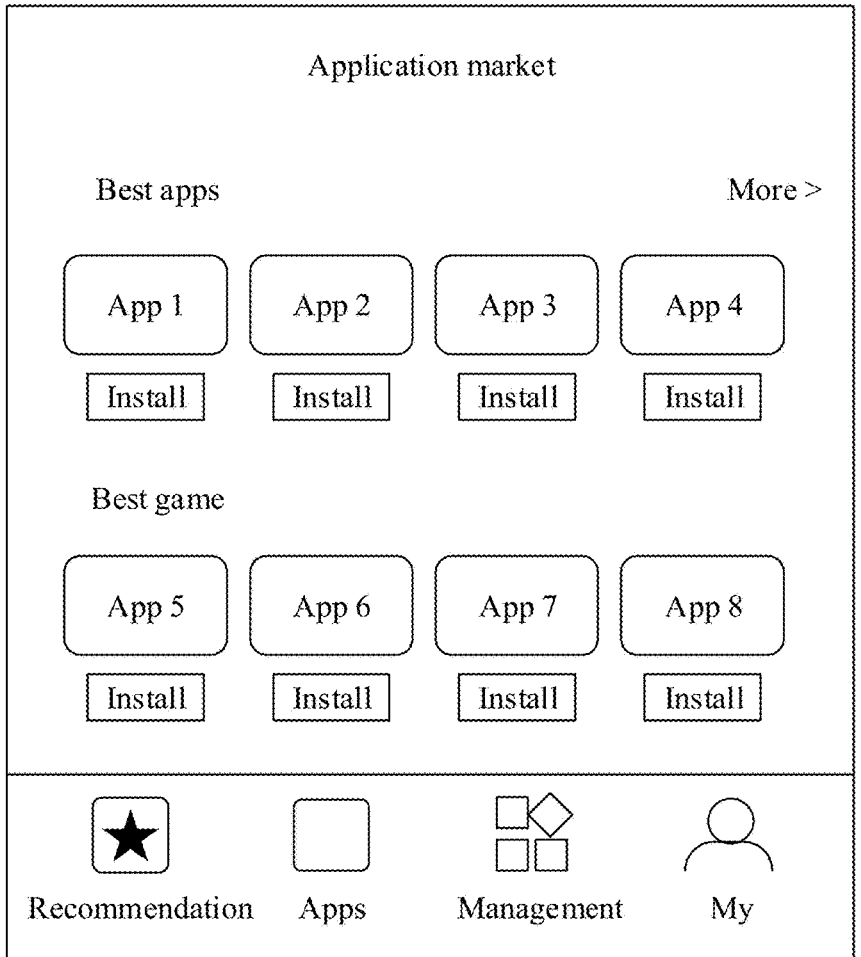
FIG. 8 is a schematic diagram of an application market according to an embodiment of this application.
FIG. 9 is a schematic flowchart of a recommendation process.

FIG. 8 shows a "recommendation" page in an application market. There may be a plurality of ranking lists on the page. For example, the ranking lists may include a ranking list of high-quality applications and a ranking list of featured games. The featured games are used as an example. A recommendation system of the application market predicts, based on information about a user and information about candidate recommended applications, probabilities that the user downloads (installs) the candidate recommended applications, ranks the candidate recommended applications in descending order of the probabilities, and places, in the first place, an application that is most likely to be downloaded.

For example, a recommendation result of the high-quality applications may be that an app 5 is located at a recommendation location 1 in the featured games, an app 6 is located at a recommendation location 2 in the featured games, an app 7 is located at a recommendation location 3 in the featured games, and an app 8 is located at a recommendation location 4 in the featured games. After the user sees the recommendation result in the application market, the user may perform an operation action on the recommendation result based on interests of the user. After being performed, the operation action of the user is stored in a user behavior log.

The application market shown in FIG. 8 may train a recommendation model based on training data obtained from a user behavior log.

It should be understood that the foregoing example descriptions are intended to help a person skilled in the art understand the embodiments of this application, but are not intended to limit embodiments of this application to a specific value or a specific scenario in the examples. A person skilled in the art definitely can make various equivalent modifications or changes according to the examples described above, and such modifications or changes also fall within the scope of the embodiments of this application.

The recommendation model may be a target recommendation model obtained through training by using the method 600. Details are not described herein again.

A model parameter of the recommendation model is obtained by training a first recommendation model based on n first training samples and weights corresponding to the n first training samples, and the first recommendation model is obtained through training based on the n first training samples. A weight corresponding to each first training sample is determined based on an impact function value of each first training sample with respect to a verification loss of m second training samples in the first recommendation model.

The first training sample includes information about a first user, information about a first recommended object, and a sample label of the first training sample, the sample label of the first training sample is used to indicate whether the first user performs an operation action on the first recommended object, and n is an integer greater than 1.

The second training sample includes information about a second user, information about a second recommended object, and a sample label of the second training sample, the sample label of the second training sample is used to indicate whether the second user performs an operation action on the second recommended object, and m is an integer greater than 1.

Optionally, that a weight corresponding to each first training sample is determined based on an impact function value of each first training sample with respect to a verification loss of m second training samples in the first recommendation model includes:

the weight corresponding to each first training sample has a negative correlation with the impact function value of each first training sample with respect to the verification loss of the m second training samples in the first recommendation model.

Optionally, the impact function value of each first training sample with respect to the verification loss of the m second training samples in the first recommendation model satisfies the following formula:

$$\phi(z_i) = \sum_j \phi(z_i, z_j) = -\left[\sum_j \nabla_\theta l(z_j, \hat{\theta})\right]^T H_{\hat{\theta}}^{-1} \nabla_\theta l(z_i, \hat{\theta}),$$

where $z_i$ represents the $i^{th}$ first training sample, $\phi(z_i)$ represents an impact function value of the $i^{th}$ first training sample with respect to the prediction loss of the m second training samples in the first recommendation model, $z_j$ represents the $j^{th}$ second training sample, $\phi(z_i, z_j)$ represents an impact function value of the $i^{th}$ first training sample with respect to a verification loss of the $j^{th}$ second training sample in the first recommendation model, $\nabla_\theta l(z_j, \hat{\theta})$ represents a gradient of $z_i$ on the first recommendation model $\hat{\theta}$, $\sum_j \nabla_\theta l(z_j, \hat{\theta})$ represents a sum of gradients of the m second training samples in the first recommendation model $\hat{\theta}$, and $$H_{\hat{\theta}}^{-1}$$

represents an inverse matrix of a Hessian matrix of all first training samples.

Optionally, that a weight corresponding to each first training sample is determined based on an impact function value of each first training sample with respect to a verification loss of m second training samples in the first recommendation model includes: the weight corresponding to each first training sample satisfies the following formula:

$$\pi_i = \frac{1}{1 + e^{\frac{\alpha\phi(z_i)}{max(\{\phi(z_i)\})-min(\{\phi(z_i)\})}}},$$

where $\pi_i$ represents a weight corresponding to the $i^{th}$ first training sample, a represents a weight adjustment coefficient, and $\{\phi(z_i)\}$ represents a set of impact function values of the n first training samples with respect to the verification loss of the m second training samples in the first recommendation model.

Optionally, the m second training samples are obtained when there is a same probability that candidate recommended objects in a candidate recommended object set are presented, and the second recommended object is a candidate recommended object in the candidate recommended object set.

Optionally, that the m second training samples are obtained when there is a same probability that candidate recommended objects in a candidate recommended object set are presented includes:

the m second training samples are obtained when the candidate recommended objects in the candidate recommended object set are randomly presented to the second user; or the m second training samples are obtained when the second user searches for the second recommended object.

Optionally, the m second training samples belong to data in a source domain, and the n first training samples belong to data in a target domain.

It may be understood that the method 600 is a training phase of the recommendation model (a phase performed by the training device 120 in FIG. 3), and specific training is performed by using the recommendation model provided in the method 600. The method 700 may be understood as an application phase of the recommendation model (a phase executed by execution device 110 in FIG. 3) Specifically, the recommendation model obtained through training in the method 600 may be used, and an output result, namely, a probability that the target user performs an operation on the candidate recommended object is obtained based on information about a target user and information about a candidate recommended object.

That the solutions in the embodiments of this application are applied to different scenarios is described below by using three examples (an example 1, an example 2, and an example 3). It should be understood that a recommendation model training method described below may be considered as a specific implementation of the method 600. A recommendation method described below may be considered as a specific implementation of the method 700. To avoid unnecessary repetition, repeated descriptions are appropriately omitted when the three examples in the embodiments of this application are described below.

Example 1

As shown in FIG. 9, for each recommendation request, a recommendation system usually needs to perform, based on a user profile, a plurality of processes such as recall, ranking, or a manual rule on all items in an entire database, to generate a final recommendation result, and then present the final recommendation result to a user. A quantity of items recommended to the user is far smaller than a total quantity of items, and various bias problems such as a location bias and a selection bias are introduced in this process.

The user profile is a label set of personalized preferences of the user. For example, the user profile may be generated based on an interaction history of the user.

The selection bias means that collected data has bias due to an item display probability difference. Ideal training data is obtained when items are displayed to the user at a same display probability. Actually, because a quantity of presentation locations is limited, all items cannot be presented. The recommendation system usually makes a recommendation to the user based on a predicted rate of selecting an item by the user. The user can interact with only a presented item, and an item that does not have an opportunity to be presented cannot be selected, in other words, cannot participate in interaction. Consequently, opportunities of presenting the items are different. In an entire recommendation process, for example, a plurality of processes such as recall and ranking, a truncation operation occurs. In other words, some recommended objects are selected from a candidate recommended object for presentation.

The location bias means that collected data has bias due to an item display location difference. The recommendation system usually presents recommendation results in a top-to-bottom sequence or a left-to-right sequence. Based on a browsing habit of a person, items in the first place are more likely to be seen and a selection rate of the user is higher. For example, in a ranking list in an application market, a same application (app) may be displayed in the first place, or may be displayed in the last place. According to a random launch policy, it can be verified that a download rate of the app displayed in the first place is far higher than a download rate of the app displayed in the last place. As shown in FIG. 9, a ranking process is performed, thereby causing a difference in the presentation location of the item is caused, and introducing a location bias.

Due to existence of the bias problem, there is a higher probability that the user selects an item with more presentation opportunities, and the item is more likely to be recommended to the user in a subsequent recommendation, thereby obtaining more presentation opportunities, and being easily tapped by another user, aggravating impact of the bias problem, causing a Matthew effect, and aggravating a long tail problem. Most personalized requirements of a small crowd cannot be met due to the long tail problem, thereby affecting user experience. In addition, many items in the recommendation system cannot generate an actual commercial value because there is no exposure opportunity.

Therefore, storage resources and computing resources are consumed for nothing, thereby causing a waste of resources.

Embodiments of this application provide a recommendation model training method and a recommendation method, to reduce impact of a bias problem on a recommendation result, and improve accuracy of a recommendation model.

The training method 900 may be considered as a specific implementation of the method 600. To avoid unnecessary repetition, repeated descriptions are appropriately omitted in the following descriptions of the training method 900. The training method 900 includes step S910 to step S950. Step S910 to step S950 are described below.

S910: Obtain n first training samples and m second training samples.

The first training sample includes information about a first user, information about a first recommended object, and a sample label of the first training sample. The sample label of the first training sample is used to indicate whether the first user performs an operation action on the first recommended object. n is an integer greater than 1.

The second training sample includes information about a second user, information about a second recommended object, and a sample label of the second training sample. The sample label of the second training sample is used to indicate whether the second user performs an operation action on the second recommended object. m is an integer greater than 1.

Further, the first training sample may further include first context information. The second training sample may further include second context information.

The second training sample is a training sample without bias.

Specifically, the second training sample may be obtained when there is a same probability that candidate recommended objects in a candidate recommended object set are presented to the second user.

For example, the second training sample may be obtained when a random delivery policy is used.

The random delivery policy is a delivery policy in which the candidate recommended objects in the candidate recommended object set are presented to a user in a random presentation manner. In this case, there is a same probability that the recommended objects are recommended to the user, and a training sample obtained based on the random delivery policy is a training sample without a bias.

For another example, the second training sample may be obtained when the user actively searches for a recommended object.

When the user actively initiates a search, regardless of whether the candidate recommended objects in the candidate recommended object set are presented to the user, there is a same probability that the candidate recommended objects are presented to the user. In other words, it may be understood that there is a same probability that the candidate recommended objects are presented to the user.

It should be noted that step S910 is an optional step. For specific descriptions of this step, refer to step S610 in the method 600. Details are not described herein again.

An implementation of obtaining the training sample in step S910 is described below by using an advertisement recommendation scenario as an example.

Table 1 shows data obtained based on an interaction history (for example, a user behavior log) of a user in an advertisement recommendation scenario.

TABLE 1

| Label | User ID | Advertisement ID | Exhibition type | Advertisement provider | Advertisement content category | Ad click-through rate |
|---|---|---|---|---|---|---|
| | | | | 1. | | |
| 1 | 25c83c98 | 68fd1e64 | Image | Provider 1 | News | 0.032 |
| 0 | efea433b | 0b153874 | Video | Provider 2 | Entertainment | 0.017 |
| . . . | . . . | . . . | . . . | . . . | . . . | . . . |

A row in Table 1 represents a training sample. For example, the training sample is a first training sample, and the first training sample includes the information about the first user and the information about the first recommended object. The information about the first user includes an ID of the first user, the first recommended object is an advertisement, and the information about the first recommended object includes an ID of the first recommended object, a presentation category of the first recommended object, an advertisement provider of the first recommended object, an advertisement content category of the first recommended object, and an advertisement click-through rate of the first recommended object. In other words, the first training sample includes a total of six types of features.

It should be understood that Table 1 is merely an example, and information about a user and information about a recommended object may further include information about more or fewer items than those in Table 1, or more or fewer types of feature information.

As described above, the second training sample is a training sample without a bias. For example, if the second training sample is obtained based on the user behavior log, the user behavior log may be obtained based on the random delivery policy or when the user actively searches for a recommended object.

For example, a specific process of obtaining the training sample includes step S911 to step S912. Both the first training sample and the second training sample may be obtained in this manner.

Original data is formatted, so that data in a unified format is obtained and used as a training sample.

S911: Perform discretization processing on a continuous feature.

For example, feature discretization may be performed through bucket discretization.

The advertisement click-through rate in Table 1 is used as an example. The advertisement click-through rate is a continuous feature, and bucket discretization is performed on the continuous feature, to obtain a discrete feature, as shown in Table 2.

TABLE 2

| 2. |
| --- |
| Ad click-through rate |
| 18 |
| 7 |
| . . . |

S912: Allocate a feature ID to each feature.

For example, the feature ID may be allocated by generating a hash value (hash) or in an auto-increment manner.

For example, the feature ID that is of an advertisement presentation category and that is allocated in the auto-increment manner may be as follows: A feature ID of the advertisement presentation category in the $1^{st}$ training sample in Table 1 is 10, and a feature ID of the advertisement presentation category in the $2^{nd}$ training sample is 20.

Allocating the feature ID by generating a hash value means that each feature is mapped to a hash value, as shown in Table 3.

TABLE 3

| Label | User ID | Advertisement ID | Exhibition type | Advertisement provider | Advertisement content category | Ad click-through rate |
|---|---|---|---|---|---|---|
| | | | | 3. | | |
| 1 | 91687 | 6150 | 60736 | 19822 | 70404 | 93221 |
| 0 | 71431 | 57276 | 31344 | 32068 | 34632 | 47800 |
| . . . | . . . | . . . | . . . | . . . | . . . | . . . |

Further, data obtained in step S912 may be stored in a uniform format.

For example, the data obtained in step S912 is stored in a libSVM format. In this way, a field obtained after the feature ID is encoded may be stored in a more compact manner.

For example, the field may be stored in the following form:

1 91687:1 6150:1 60736:1 19822:1 70404:1 93221:1
0 71431:1 57276:1 31344:1 32068:1 34632:1 47800:1

. . .

Herein, 1 following the feature ID indicates that the value exists, or this feature value is determined based on an interaction history of the user. If 0 follows the feature ID, it indicates that this feature value is missing. For example, in a data collection process, a problem that some feature values are missing may occur. In this case, the feature ID may be a default value.

The data is divided into two parts: a feature part and a label part, to obtain a training sample.

For example, refer to Table 4. The feature part is used to represent the information about the user and the information about the recommended object. The label part is a sample label of the training sample.

TABLE 4

| | 4. | | | | |
|---|---|---|---|---|---|
| Label | Feature | | | | |
| 1 | 91687:1 | 6150:1 | 60736:1 | 19822:1 | 70404:1 | 93221:1 |
| 0 | 71431:1 | 57276:1 | 31344:1 | 32068:1 | 34632:1 | 47800:1 |

For example, data used for the n first training samples may be obtained by sampling some data in the data obtained in step S911. In other words, an amount of data obtained in step S911 is greater than n.

Alternatively, all data obtained in step S911 may be used as data used to obtain the n first training samples. In other words, the amount of data obtained in step S911 is n.

It should be understood that the foregoing training sample representation manner is merely an example. In a specific application scenario, a training sample represented in another form may alternatively be used, or the training sample may be further processed and then input into a recommendation model. This is not limited in this application.

S920: Perform training based on the n first training samples, to obtain a first recommendation model.

Specifically, first feature information is used as an input into the first recommendation model, and the sample label of the first training sample is used as a target output value of the first recommendation model for training, to obtain a model parameter of the first recommendation model.

It should be noted that step S920 is an optional step. For specific descriptions, refer to step S610 in the method 600. Details are not described herein again.

An implementation of step S920 is described below by using an advertisement recommendation scenario as an example.

The first feature information is a feature part in the advertisement recommendation scenario, and the sample label of the first training sample is a label part in the advertisement recommendation scenario.

For example, a specific process of step S920 includes step S921 to step S923.

S921: Input the first feature information into the first recommendation model, to perform forward derivation to obtain a prediction label.

For example, the first recommendation model is a logistic regression model, and the prediction label obtained through forward derivation satisfies the following formula:

$$P_{ctr} = w_{91687} + w_{6150} + w_{60736} + w_{19822} + w_{70404} + w_{93221} + b,$$

where $P_{ctr}$ represents a prediction label, for example, $P_{ctr}$ represents a click-through rate predicted by the logistic regression model, $w_x$ represents a weight corresponding to a feature x, for example, $w_{91687}$ represents a weight corresponding to a feature whose feature ID is 91687, and b represents a bias term of the logistic regression model.

S922: Calculate a value of a loss function between a prediction label of the first training sample and the sample label of the first training sample, and update a parameter of the recommendation model based on a reverse gradient of the value of the loss function.

For example, the loss function may be log loss.

For example, the first recommendation model is a logistic regression model, and the value of loss function loss satisfies the following formula:

$$loss = \log P_{ctr} + \log(1 - P_{ctr})$$

S923: Verify prediction accuracy of the updated recommendation model by using the verification set, and repeat step S921 to step S923 until a first iteration termination condition is met.

For example, the first iteration termination condition may be that an improvement rate of the prediction accuracy of the recommendation model is less than a specified threshold. In other words, step 921 to step 923 are repeated until the accuracy of the recommendation model is no longer improved or no longer significantly improved, to obtain the model parameter of the first recommendation model.

For example, the prediction accuracy may be evaluated by using an indicator, namely, an area under the receiver operating characteristic (ROC) curve (area under the ROC curve, AUC).

For example, the verification set may include the m second training samples. In other words, the prediction accuracy of the recommendation model may be evaluated based on the m second training samples.

In this case, the n first training samples may be understood as data in a training set, and the m second training samples may be understood as data in the verification set.

S930: Determine an impact function value of each first training sample with respect to a verification loss of the m second training samples in the first recommendation model. The verification loss of the m second training samples in the first recommendation model is a difference between prediction labels of the m second training samples obtained by processing the m second training samples by using the first recommendation model and sample labels of the m second training samples.

Step S930 corresponds to step S620 in the foregoing method 600. For specific descriptions, refer to step S620. Details are not described herein again.

S940: Determine, based on the impact function value of each first training sample with respect to the verification loss, a weight corresponding to each first training sample.

Step S940 corresponds to step S630 in the foregoing method 600. For specific descriptions, refer to step S630. Details are not described herein again.

For example, weights corresponding to the n first training samples are determined based on a sigmoid function. The foregoing advertisement recommendation scenario is used as an example. The weight of the first training sample and the first training sample may be concatenated, to obtain a first training sample with a weight. Weights corresponding to the two training samples in Table 4 are shown in Table 5.

TABLE 5

| Label | Weight | Feature | | | | | |
|---|---|---|---|---|---|---|---|
| | | 5. | | | | | |
| 1 | 0.49 | 91687:1 | 6150:1 | 60736:1 | 19822:1 | 70404:1 | 93221:1 |
| 0 | 0.67 | 71431:1 | 57276:1 | 31344:1 | 32068:1 | 34632:1 | 47800:1 |

S950: Train the first recommendation model based on the n first training samples and the weights corresponding to the n first training samples, to obtain a model parameter of a target recommendation model.

In other words, the first recommendation model is trained based on the first training sample with a weight, to obtain the model parameter of the target recommendation model.

Step S950 corresponds to step S640 in the foregoing method 600. For specific descriptions, refer to step S640. Details are not described herein again.

The foregoing advertisement recommendation scenario is used as an example. A training sample in Table 5 is used to train the first recommendation model. For example, the first recommendation model is a logistic regression model, and a loss function of the first recommendation model is a loss function with a weight.

For the 1st training sample in Table 5, a value of a loss function loss satisfies the following formula:

$$\text{loss} = 0.49 * (\log P_{ctr} + \log(1 - P_{ctr})).$$

A parameter of the recommendation model is updated based on a reverse gradient of the value of the loss function, until a second iteration termination condition is met. For example, the second iteration termination condition may be that the improvement rate of the prediction accuracy of the recommendation model is less than a specified threshold. For a specific training method, refer to step S920.

According to the solution in this embodiment of this application, importance of the first training sample to the verification loss is evaluated based on the impact function value. In other words, the importance of the first training sample is determined by measuring impact of data disturbance on a verification loss of the first recommendation model on the second training sample. The weight corresponding to the first training sample is determined based on the importance. A recommendation model obtained through retraining based on the first training sample with a weight can better fit data distribution of the second training sample. Because the second training sample is a training sample without a bias, the weight of the first training sample is adjusted based on the second training sample, so that the recommendation model can more accurately fit data distribution without a bias, thereby reducing impact that is caused by avoiding a bias problem and that is exerted on training, lessening a Matthew effect, and improving accuracy of the recommendation model. In the solution in this embodiment of this application, data distribution of an observed sample is corrected in a counterfactual method, to enhance diversity of recommendation results, eliminate a cocooning effect, improve user experience, enhance user stickiness, enable the user to be immersed in the recommendation system for a longer period of time, promote a virtuous circle of the recommendation system, increase a profit of a supplier, attract more suppliers to join, and ensure long-term stable development of the recommendation system.

In addition, in a training process, only a small quantity of second training samples are required to alleviate impact caused by the bias problem, to improve accuracy of the recommendation model, avoid a case in which an overall profit of the system decreases when a large quantity of second training samples are collected and randomly presented to the recommended object, and further avoid a case in which training efficiency is reduced when a large quantity of features needs to be used for training.

The target recommendation model obtained in the method 600 may be used to predict a probability that the user performs an operation action on a recommended object, in other words, predict a probability that the user selects the recommended object. The recommendation system may determine a recommendation result based on an output of the target recommendation model, and present the recommendation result to the user.

An embodiment of this application provides a recommendation method. A recommendation model used in the recommendation method may be a target recommendation model obtained through training in the method 900.

The recommendation method includes the following steps.

Step S1: Obtain information about a target user and information about a candidate recommended object.

This step corresponds to step S710 in the foregoing method 700. For specific descriptions, refer to step S710. Details are not described herein again.

The foregoing advertisement recommendation scenario is used as an example. Original data may be processed in a manner in step S910, to obtain a feature that may be input into a recommendation model, to be specific, the information about the target user and the information about the candidate recommended object.

For example, a feature ID is obtained by searching a feature table:

24387:1 3215:1 9736:1 38274:1 28304:1 92472:1.

Step S2: Input the information about the target user and the information about the candidate recommended object into the recommendation model for processing, and predict a probability that the target user selects the candidate recommended object.

This step corresponds to step S720 in the foregoing method 700. For specific descriptions, refer to step S720. Details are not described herein again.

The foregoing advertisement recommendation scenario is used as an example, and a feature ID may be input into the recommendation model for forward inference, to obtain the prediction probability. For example, the recommendation model is the target recommendation model obtained in step S950. The prediction probability $P_{ctr}$ satisfies the following formula:

$$P_{ctr} = w_{24387} + w_{3215} + w_{9376} + w_{38274} + w_{28304} + w_{92472} + b.$$

A recommendation model obtained through training in the conventional technology and the recommendation model provided in this application are tested by using a public data set and an original advertisement data set and two indicators, namely, a negative logarithmic loss (NLL) and an area under the receiver operating characteristic (ROC) curve (area under the ROC curve, AUC). Accuracy of the recommendation model in this embodiment of this application is more than 3‰ higher than that in the conventional technology in terms of the AUC. Based on actual experience, a click-through rate/conversion rate may be improved by more than 10% because of such improvement.

Example 2

A recommendation model can learn of a preference of a user from an interaction history of the user, predict a probability that the user selects a recommended object, and then recommend related content to the user. To improve prediction accuracy, a large amount of historical interaction data of the user is required to train the recommendation model. However, a habit of a person may change over time, previous historical interaction data of the user has a bias relative to current historical interaction data of the user. In other words, a drift of data distribution occurs. A recommendation model obtained through training based on previous historical interaction data of the user cannot learn of a current preference of the user, resulting in low prediction accuracy. However, there is a small quantity of historical interaction data of the user currently, and consequently, a training requirement of the recommendation model cannot be met. For example, the recommendation model is obtained through training based on a large amount of offline data, and online prediction is performed after the recommendation model is launched. Offline data has a bias relative to online data. Therefore, the recommendation model also has a bias, and an online prediction result is poor.

Therefore, how to improve prediction accuracy of the recommendation model becomes an urgent problem to be resolved.

An embodiment of this application provides a recommendation model training method, to reduce impact of a drift of data distribution on a recommendation model training result, and improve accuracy of a recommendation model.

A training method 1000 may be considered as a specific implementation of the method 600. To avoid unnecessary repetition, repeated descriptions are appropriately omitted in the following descriptions of the training method 1000. The training method 1000 includes step S1010 to step S1050. Step S1010 to Step S1050 are described below.

It should be understood that, for a specific implementation process of the method 1000, refer to the foregoing method 900. A difference between the method 1000 and the method 900 lies in that a first training sample is different from a second training sample. In the method 1000, an obtaining time point of the first training sample is earlier than an obtaining time point of the second training sample. For example, the first training sample is determined based on a historical interaction data of a first user, and the second training sample is determined based on a historical interaction data of a second user. A collection time point of the historical interaction data of the first user is earlier than a collection time point of the historical interaction data of the second user.

S1010: Obtain a first recommendation model.

A model parameter of the first recommendation model is obtained through training based on n first training samples. The first training sample includes information about a first user, information about a first recommended object, and a sample label of a first recommendation sample. The sample label of the first training sample is used to indicate whether the first user performs an operation action on the first recommended object. n is an integer greater than 1.

Step S1010 corresponds to step S610 in the foregoing method 600. For specific descriptions, refer to step S610. Details are not described herein again.

For example, a recommendation model may usually be trained based on a large amount of offline data, so that the recommendation model learns of a preference of a user, and then the trained recommendation model is used for online prediction.

For example, the n first training samples may be obtained based on a large amount of offline data. The offline data may be a user behavior log.

S1020: Obtain m second training samples.

The second training sample includes second feature information and a sample label of the second training sample. The second feature information includes information about a second user and information about a second recommended object. The sample label of the second training sample is used to indicate whether the second user performs an operation action on the second recommended object. m is an integer greater than 1.

For example, the second training sample may be obtained based on recently obtained data. In other words, a collection time point of data used to determine the second training sample is later than a collection time point of data used to determine the first training sample.

For another example, the trained recommendation model may be used for online prediction, and the second training sample may be obtained based on a user behavior log in a most recent period of time before a moment at which the recommendation model is launched for testing.

For specific descriptions of step S1020, refer to descriptions in step S620. Details are not described herein again.

S1030: Determine an impact function value of each first training sample with respect to a verification loss of the m second training samples in the first recommendation model.

Step S1030 corresponds to step S620 in the foregoing method 600. For specific descriptions, refer to step S620. Details are not described herein again.

S1040: Determine, based on the impact function value of each first training sample with respect to the verification loss, a weight corresponding to each first training sample.

Step S1040 corresponds to step S630 in the foregoing method 600. For specific descriptions, refer to step S630. Details are not described herein again.

For example, the weight corresponding to each first training sample is determined based on a sigmoid function.

S1050: Train the first recommendation model based on the n first training samples and the weights corresponding to the n first training samples, to obtain a model parameter of a target recommendation model.

Step S1050 corresponds to step S640 in the foregoing method 600. For specific descriptions, refer to step S640. Details are not described herein again.

According to the solution in this embodiment of this application, importance of the first training sample to the verification loss is evaluated based on the impact function value. In other words, the importance of the first training sample is determined by measuring impact of data disturbance on a verification loss of the first recommendation model on the second training sample. The weight corresponding to the first training sample is determined based on the importance. A recommendation model obtained through retraining based on a first training sample with a weight can better fit data distribution of the second training sample. Because the obtaining time point of the second training sample is later than the obtaining time point of the first training sample, a recent preference of a user can be better reflected. The weight of the first training sample is adjusted based on the second training sample, so that the recommendation model learns of a current preference of the user more accurately, to reduce impact that is caused by avoiding a data drift caused by a change in the preference of the user and that is exerted on training and improves the accuracy of the recommendation model. The solution in this embodiment of this application is used to enhance diversity of recommendation results, eliminate a cocooning effect, adapt to interests and hobbies of the user at different stages, improve user experience, enhance user stickiness, enable the user to be immersed in the recommendation system for a longer period of time, promote a virtuous circle of the recommendation system, increase a profit of a supplier, attract more suppliers to join, and ensure long-term stable development of the recommendation system.

In addition, in a training process, only a small quantity of second training samples are required to alleviate impact caused by a bias problem, and the recommendation model can be continuously adjusted, thereby improving accuracy of the recommendation model.

Example 3

A lifelong learning project is a project in which a cognitive brain is constructed based on historical data of a user in a plurality of fields such as video, music, and news by using various models and algorithms and by simulating a human brain mechanism, to realize a goal of lifelong learning.

FIG. 10 is a schematic diagram of a lifelong learning framework. The framework includes a plurality of recommendation scenarios such as a video app, a reading app, and a browser app. In a conventional recommendation learning solution, a hidden rule of historical behavior of a user in each recommendation scenario or domain is learned of, and then a recommendation is made based on the learned rule. In an entire learning and implementation process, knowledge transfer and sharing between domains are not considered at all.

However, in an initial launching phase of a new recommendation scenario, an interaction history of the user is lacked. If a recommendation model is obtained through learning based on only an interaction history in a local domain, it is difficult to find a hidden rule of the historical behavior of the user, and consequently, a prediction result is inaccurate. In other words, a cold start problem exists in the new recommendation scenario.

A cross-domain recommendation is a recommendation method in which a preference of the user in a source domain is learned of and applied to a target domain. Through the cross-domain recommendation, the rule learned of in the source domain can be used to guide a recommendation result in the target domain, to implement knowledge transfer and sharing between domains, and resolve the cold start problem.

For example, a preference of the user for music and a video is predicted based on a reading preference of the user in the recommendation scenario of the reading app, to resolve the cold start problem of the user in the recommendation scenario of the music app.

Figure 11:
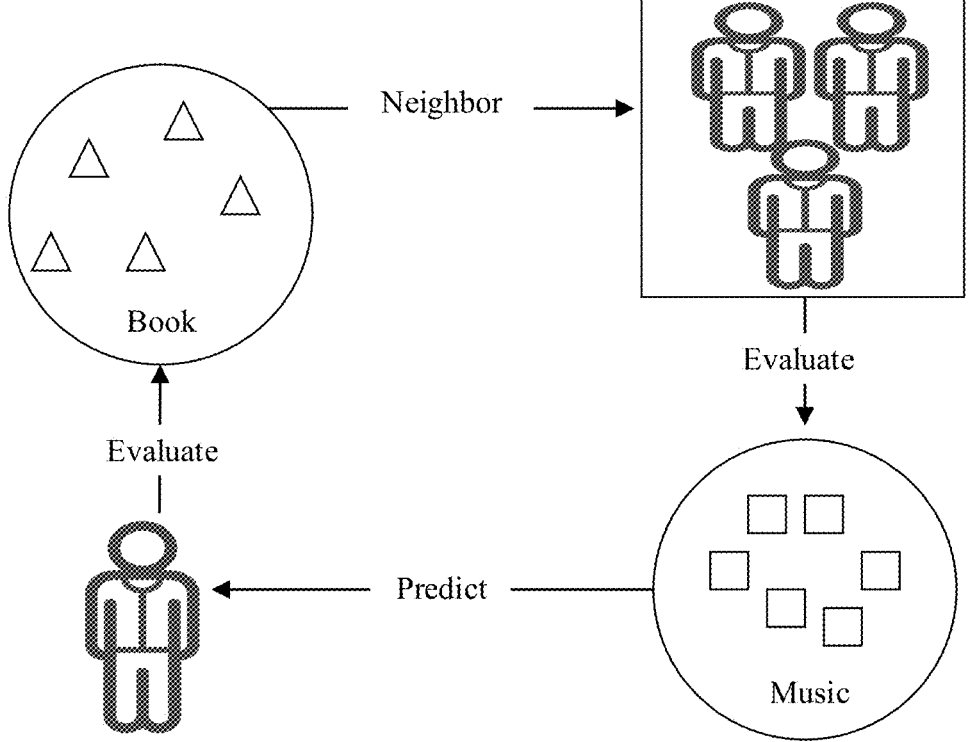
FIG. 11 is a schematic flowchart of a cross-domain recommendation.

As shown in FIG. 11, in the recommendation scenario of the reading app, a book is recommended to a user A, and an interest and a preference of the user A in the recommendation scenario of the reading app may be learned of based on historical interaction data of the user A. A neighboring user having a same interest as the user A may be determined based on the interest and preference of the user A in the recommendation scenario of the reading app. In the recommendation scenario of the music app, music is recommended to a user, and an interest and a preference of a neighboring user in the recommendation scenario of the music app is learned of based on historical interaction data of the neighboring user in the recommendation scenario of the music app. Then, the learned interest and preference is used for a guide to provide the user A with a recommendation result in the recommendation scenario of the music app. The recommendation scenario of the reading app is the source domain, and the recommendation scenario of the music app is the target domain. However, data distribution in the source domain is usually inconsistent with data distribution in the target domain, and therefore, the data distribution in the source domain has a bias relative to the data distribution in the target domain. In this case, if the cross-domain recommendation is directly made by using the foregoing association rule, a bias is introduced in a learning process. The model makes a recommendation by giving more considerations to the interest and preference of the user in the source domain. In other words, the trained model has a bias. Consequently, a model obtained through learning based on data in source domain cannot be generalized effectively in the target domain, and the model is at a risk of being distorted.

An embodiment of this application provides a recommendation model training method 1100, to reduce impact of inconsistency between data distribution in a source domain and data distribution in a target domain on a recommendation model training result, and improve accuracy of a recommendation model.

The method 1100 may be considered as a specific implementation of the method 600. To avoid unnecessary repetition, repeated descriptions are appropriately omitted in the following descriptions of the method 1100. The method 1100 includes step S1110 to step S1150. Step S1110 to Step S1150 are described below.

It should be understood that, for a specific implementation process of the method 1100, refer to the foregoing method 900. A difference between the method 1100 and the method 900 lies in that a first training sample is different from a second training sample. In the method 1100, the first training sample is determined based on user interaction data in a target domain, and the second training sample is determined based on user interaction data in a source domain.

S1110: Obtain n first training samples and m second training samples.

The first training sample includes information about a first user, information about a first recommended object, and a sample label of the first training sample. The sample label of the first training sample is used to indicate whether the first user performs an operation action on the first recommended object. n is an integer greater than 1.

The second training sample includes information about a second user, information about a second recommended object, and a sample label of the second training sample. The sample label of the second training sample is used to indicate whether the second user performs an operation action on the second recommended object. m is an integer greater than 1.

Further, the first training sample may further include first context information. The second training sample may further include second context information.

The first training sample belongs to data in the target domain, and the second training sample belongs to data in the source domain.

It should be noted that step S1110 is an optional step. For specific descriptions of this step, refer to step S610 in the method 600. Details are not described herein again.

An implementation of step S1110 is described below by using an example in which a recommendation scenario of a reading app is used as the source domain and a recommendation scenario of a video app is used as the target domain.

The recommendation scenario of the reading app is a recommendation scenario in which a book is recommended to a user, and the recommendation scenario of the video app is a recommendation scenario in which a video is recommended to the user.

Figure 12:
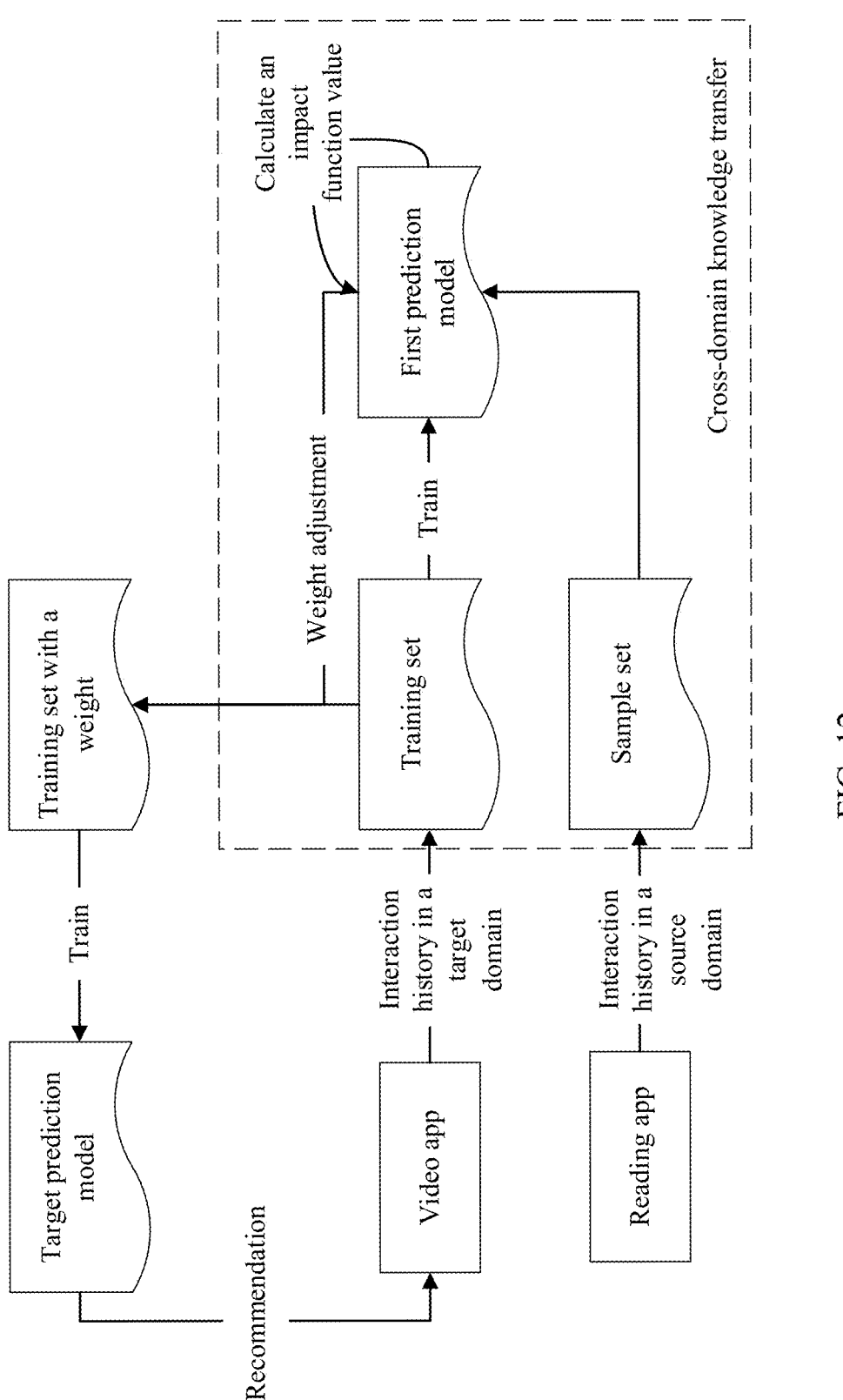
FIG. 12 is a schematic flowchart of a cross-domain recommendation according to an embodiment of this application.

As shown in FIG. 12, the first training sample is obtained based on an interaction history of the user in the recommendation scenario of the video app (the target domain). The first training sample is used to train a first recommendation model, to obtain a model parameter of the first recommendation model. Therefore, the first training sample may also be understood as data in a training set of the first recommendation model.

Table 6 shows data obtained based on the interaction history (for example, a user behavior log) of the user in the recommendation scenario of the video app.

TABLE 6

| | | | | | | 6. |
| --- | --- | --- | --- | --- | --- | --- |
| Label | User ID | Video ID. | Label | Filmmaker | Actor | Score |
| 1 | 13718bbd | 5316a17f | Thriller | Filmmaker 1 | Zhang San | 6.8 |
| 0 | 0b153874 | 93bad2c0 | Literary film | Filmmaker 2 | Li Si | 7.1 |
| . . . | . . . | . . . | . . . | . . . | . . . | . . . |

A row in Table 6 represents a training sample. For example, the training sample is a first training sample, and the first training sample includes the information about the first user and the information about the first recommended object. The information about the first user includes an ID of the first user, the first recommended object is a video, and the information about the first recommended object includes an ID of the first recommended object, a label of the first recommended object, a filmmaker of the first recommended object, an actor of the first recommended object, and a score of the first recommended object. In other words, the first training sample includes a total of six types of features.

It should be understood that Table 6 is merely an example, and information about a user and information about a recommended object may further include information about more or fewer items than those in Table 6, or more or fewer types of feature information.

Further, data may be processed in the method in step S910, and the processed data is stored in a libSVM format. For example, data in Table 6 may be stored in the following form:

1 25173:1 38553:1 50053:1 50216:1 59109:1 98079:1
0 19468:1 19850:1 79800:1 81901:1 85533:1 13010:1
. . .

The n first training samples may be obtained based on the foregoing data.

As shown in FIG. 12, the second training sample is obtained based on an interaction history of the user in the recommendation scenario of the reading app (the source domain). It should be noted that FIG. 12 is merely an example. Data in the source domain may further include data in another recommendation scenario, or may include data in a plurality of recommendation scenarios. For example, the data in the source domain may include historical data of the user in the recommendation scenario of the reading app and historical data of the user in the recommendation scenario of the music app.

The second training sample may be used to verify a prediction effect of the first recommendation model. Therefore, the second training sample may also be used as data in a verification set of the first recommendation model. It should be understood that FIG. 12 is merely an example, and the second training sample may alternatively not be used as data in the verification set.

Table 7 shows data obtained based on the interaction history (for example, a user behavior log) of the user in the recommendation scenario of the reading app.

TABLE 7

| | | | | | | 7. |
| --- | --- | --- | --- | --- | --- | --- |
| Label | User ID | Book ID | Label | Publisher | Author | Score |
| 1 | 25c83c98 | 68fd1e64 | Suspense | Publisher 1 | Zhang San | 6.8 |
| 0 | efea433b | 0b153874 | Arts | Publisher 2 | Li Si | 7.1 |
| . . . | . . . | . . . | . . . | . . . | . . . | . . . |

A row in Table 7 represents a training sample. For example, the training sample is a second training sample, and the second training sample includes the information about the second user and the information about the second recommended object. The information about the second user includes an ID of the second user, the second recommended object is a book, and the information about the second recommended object includes an ID of the second recommended object, a label of the second recommended object, a publisher of the second recommended object, an author of the second recommended object, and a score of the second recommended object. In other words, the second training sample includes a total of six types of features.

It should be understood that Table 7 is merely an example, and information about a user and information about a recommended object may further include information about more or fewer items than those in Table 7, or more or fewer types of feature information.

Further, data may be processed in the method in step S910, and the processed data is stored in a libSVM format. For example, data in Table 7 may be stored in the following form:

1 77891:1 81901:1 82101:1 83267:1 83896:1 91899:1
0 55060:1 59115:1 60857:1 75847:1 97576:1 42803:1
. . .

The m second training samples may be obtained based on the foregoing data.

S1120: Perform training based on the n first training samples, to obtain the first recommendation model.

Specifically, first feature information is used as an input into the first recommendation model, and the sample label of the first training sample is used as a target output value of the first recommendation model for training, to obtain a model parameter of the first recommendation model.

It should be noted that step S1120 is an optional step. For specific descriptions, refer to step S610 in the method 600. Details are not described herein again.

For example, as shown in FIG. 12, data in the target domain is used as the training set to perform training, to obtain the first recommendation model, and data in the source domain is used as the verification set to verify the prediction effect of the first recommendation model.

S1130: Determine an impact function value of each first training sample with respect to a verification loss of the m second training samples in the first recommendation model. The verification loss of the m second training samples in the first recommendation model is a difference between prediction labels of the m second training samples obtained by processing the m second training samples by using the first recommendation model and sample labels of the m second training samples.

Step S1130 corresponds to step S620 in the foregoing method 600. For specific descriptions, refer to step S620. Details are not described herein again.

S1140: Determine, based on the impact function value of each first training sample with respect to the verification loss, a weight corresponding to each first training sample.

Step S1140 corresponds to step S630 in the foregoing method 600. For specific descriptions, refer to step S630. Details are not described herein again.

For example, weights corresponding to the n first training samples are determined based on a sigmoid function. The weight of the first training sample and the first training sample may be concatenated, to obtain a first training sample with a weight. For example, the first training sample that has a weight and that is obtained based on the weight corresponding to the first training sample in step S1110 is as follows:

1  0.83  25173:1  38553:1  50053:1  50216:1  59109:1
   98079:1
0  0.45  19468:1  19850:1  79800:1  81901:1  85533:1
   13010:1
. . .

S1150: Train the first recommendation model based on the n first training samples and the weights corresponding to the n first training samples, to obtain a model parameter of a target recommendation model.

In other words, the first recommendation model is trained based on the first training sample with a weight, to obtain the model parameter of the target recommendation model.

Step S1150 corresponds to step S640 in the foregoing method 600. For specific descriptions, refer to step S640. Details are not described herein again.

As shown in FIG. 12, a training set with a weight may be obtained based on the training set and a weight of a training sample. The target recommendation model can be obtained through training based on the training set with a weight.

The target recommendation model may be applied to the target domain, for example, the recommendation scenario of the video app in FIG. 12.

Interaction data of the user in the recommendation scenario of the reading app is more abundant than that in the recommendation scenario of the video app, and data distribution can more accurately reflect a preference of the user. Based on intuitive inference and interoperability between an interest of the user in a reading scenario and an interest of the user in a video scenario and according to the solution in this embodiment of this application, the recommendation model can better grasp a personalized preference of the user in the reading scenario, to further guide a recommendation result in the video scenario, thereby improving accuracy of the recommendation result.

According to the solution in this embodiment of this application, importance of the first training sample to the verification loss is evaluated based on the impact function value. In other words, the importance of the first training sample is determined by measuring impact of data disturbance on a verification loss of the first recommendation model on the second training sample. The weight corresponding to the first training sample is determined based on the importance. A recommendation model obtained through retraining based on a first training sample with a weight can better fit data distribution of the second training sample. The first training sample is data in the target domain, and the second training sample is data in the source domain. The weight of the first training sample is adjusted based on the second training sample, so that the recommendation model can more accurately fit data distribution in the source domain, learn of a more accurate preference of the user, and improve accuracy of the recommendation model in the target domain.

Knowledge (for example, an interest and a preference of the user) is migrated and shared between different domains, and an interaction history record of the user in the source domain (for example, the recommendation scenario of the reading app) and the target domain (for example, the recommendation scenario of the video app) are incorporated into learning. The data in the target domain is disturbed, to determine impact of the data in the target domain on a verification effect of the data in the source domain. A weight of the data in the target domain is adjusted based on the impact, and then training is performed based on data with an adjusted weight, so that a model obtained through training in this case has a better evaluation effect in the source domain. In this case, the model obtained through training well captures the interest and preference of the user in the source domain. However, in an approximate recommendation scenario, the interest preference of the user is also similar. Therefore, the recommendation model can also fit the interest and preference of the user well in the target domain, to recommend, to the user, a recommendation result that matches the interest of the user. Therefore, a cross-domain recommendation implemented, and a cold start problem is alleviated.

The target recommendation model obtained in the method 1100 may predict a probability that the user performs an operation action on a recommended object in the target domain, in other words, predict a probability that the user selects the recommended object. The target recommendation model is deployed in the target domain (for example, in the recommendation scenario of the video app), and a recommendation system may determine the recommendation result based on an output of the target recommendation model, and present the recommendation result to the user.

As described above, in a conventional recommendation learning solution, a hidden rule of historical behavior of the user in each recommendation scenario or domain is learned of, and then a recommendation is made based on the learned rule. In an entire learning and implementation process, knowledge transfer and sharing between domains are not considered at all.

Currently, many electronic devices such as a mobile phone and a tablet computer have a plurality of applications, and each application may be considered as an application scenario. When an application makes a recommendation to the user, the application usually learns of the preference of the user based on only interaction data of the user in the application, and then makes a recommendation to the user, without considering interaction data of the user in another application.

However, in an application that is just downloaded by the user, interaction data of the user is lacked. If a recommendation model is obtained through learning based on only an interaction history in a local domain, it is difficult to find a hidden rule of the historical behavior of the user, and consequently, a prediction result is inaccurate, and user experience is affected. In other words, a cold start problem exists in a new recommendation scenario.

An embodiment of this application provides a recommendation method and an electronic device, so that a preference of a user in another domain can be learned of, to make a recommendation to the user, thereby improving accuracy of a prediction result, and improving user experience.

It should be understood that, in this embodiment of this application, "user behavior data", "user interaction data", "interaction data", "behavior data", and the like may be considered to express a same meaning, and each may be understood as data related to operation behavior of the user when a recommended object is presented to the user.

For ease of understanding, in this application, a mobile phone is used as an electronic device. Some human-computer interaction embodiments of this application are first described. FIG. 13(a) to FIG. 13(d) are a schematic diagram of a group of graphical user interfaces (GUI) according to an embodiment of this application.

A user may perform a tap operation on a setting application on the mobile phone. In response to the tap/click operation, the mobile phone enters a home screen 301 of the setting application. The home screen of the setting application may display content shown in FIG. 13(a). The home screen 301 may include a bulk management control, a cross-domain recommendation management control of each application, a sidebar alphabetical ranking index control, and the like. The home screen 301 may further display whether a cross-domain recommendation function of each application (for example, a music app, a reading app, a browser app, a news app, a video app, or a shopping app) is "Enabled" or "Disabled". In some embodiments, the cross-domain recommendation management control that is of each application and that is displayed on the home screen 301 may be displayed in an order of application name initials from "A" to "Z". Each application corresponds to a respective cross-domain recommendation management control. It should be understood that the home screen 301 may alternatively include more, less, or similar display content. This is not limited in this application.

When the user taps a cross-domain recommendation management control of an application, the mobile phone may display a cross-domain recommendation management interface corresponding to the application. For example, the user performs a tap operation on a cross-domain recommendation management control of the browser app shown in FIG. 13(a). In response to the tap operation, the mobile phone enters a cross-domain recommendation management interface 302 of the browser app. The cross-domain recommendation management interface 302 may display content shown in FIG. 13(b). The cross-domain recommendation management interface 302 may include a cross-domain recommendation allowing control. It should be understood that the cross-domain recommendation management interface 302 may further include more or less other similar display content, and the cross-domain recommendation management interface 302 may alternatively include different display content based on different applications. This is not limited in this embodiment of this application.

Optionally, a default state of the cross-domain recommendation management control may be an off state.

Figure 13A:
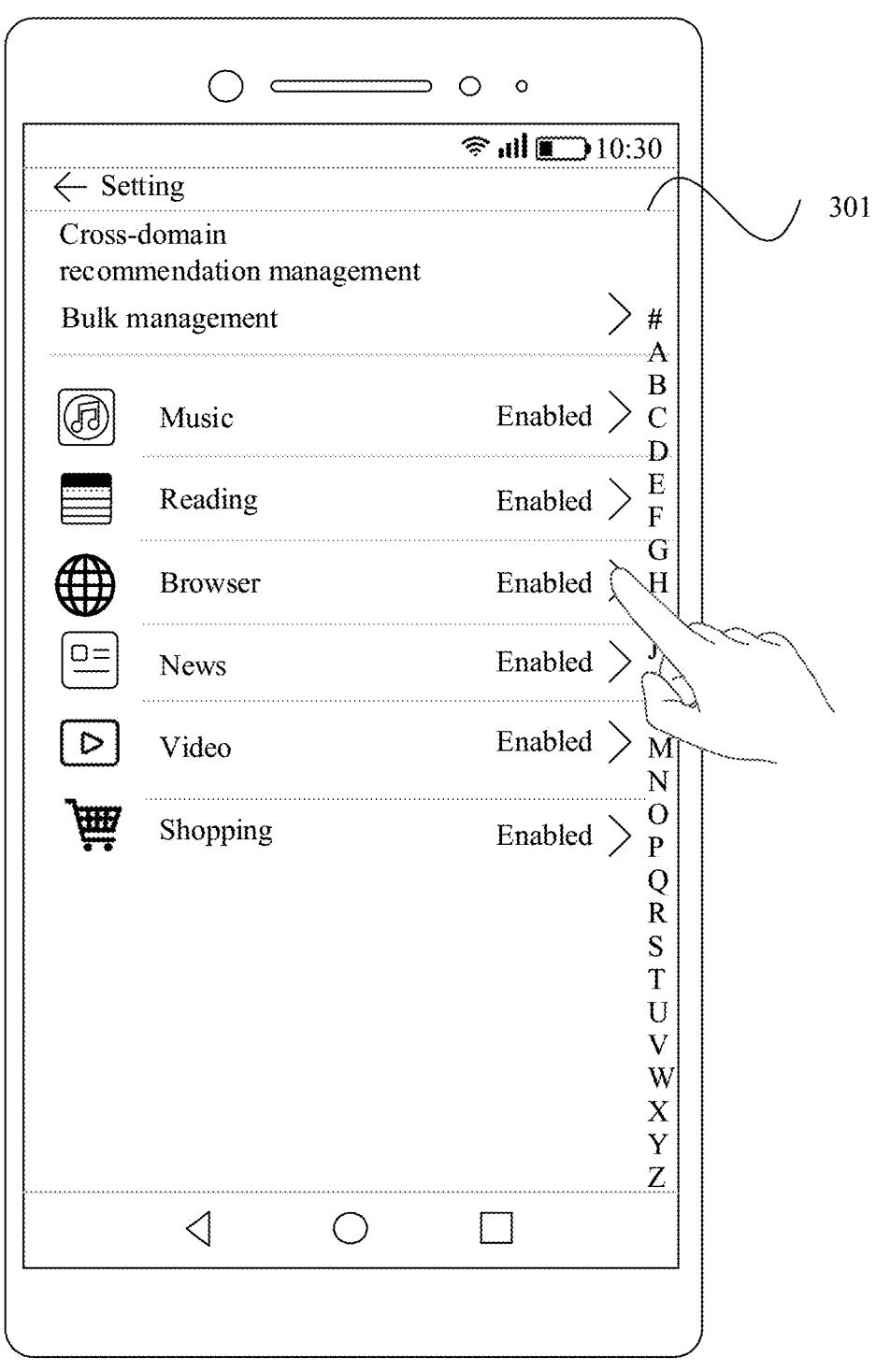
FIG. 13(a) to FIG. 13(d) are a schematic diagram of a group of graphical user interfaces according to an embodiment of this application.
Figure 13B:
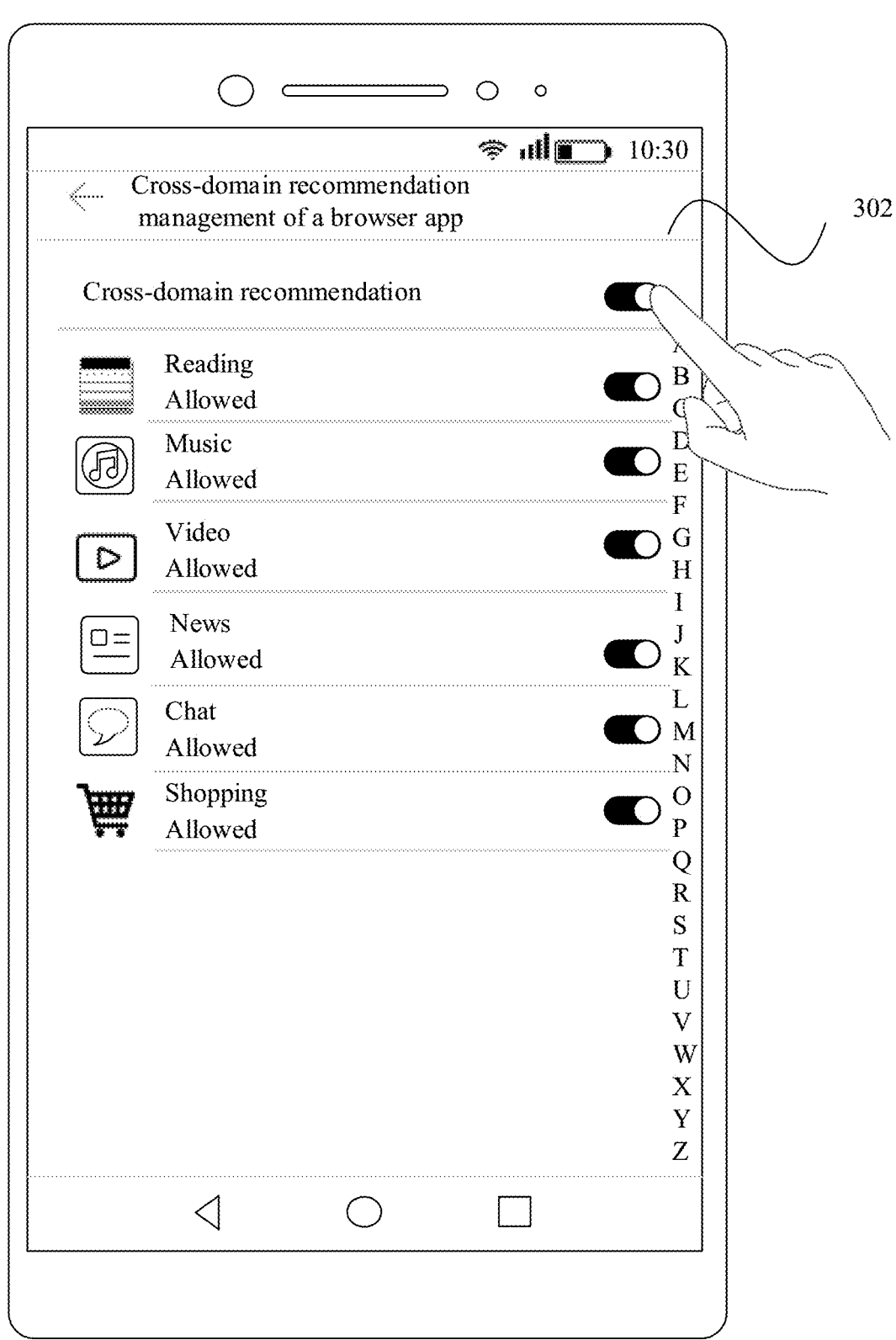

For example, as shown in FIG. 13(b), the cross-domain recommendation allowing control is in an enabled state, and a cross-domain recommendation function of the browser app is enabled. Correspondingly, the browser app may obtain user interaction data from a plurality of apps and perform learning, to recommend a related video to the user. Further, when the cross-domain recommendation allowing control is in the enabled state, the cross-domain recommendation management interface 302 may further present a learning list of the browser app, and the learning list includes a plurality of options. An option in the cross-domain recommendation management interface 302 may be understood as a name of an application and a switch control corresponding to the application. Therefore, in other words, the cross-domain recommendation management interface 302 includes a cross-domain recommendation allowing control and a plurality of options, each of the plurality of options is associated with an application, and an option associated with the application is used to control enabling and disabling of permission of the browser app to obtain user behavior data from the application. It may also be understood that an option associated with an application is used to control the browser app to perform a cross-domain recommendation function based on user behavior data in the application. For ease of understanding, the switch control is still used to illustrate a meaning of an option in the following embodiments.

As described above, the learning list includes a plurality of options. In other words, names of a plurality of applications and switch controls corresponding to the applications are presented in the cross-domain recommendation management interface 302. As shown in FIG. 13(b), when a switch control corresponding to an application is in an enabled state, the video app may obtain user behavior data from the app and perform learning, to make a recommendation to the user. The cross-domain recommendation management interface 302 may further display an application whose cross-domain recommendation function is "allowed" or "denied" and that obtains user data in each application (for example, the music app, the reading app, the browser app, the news app, the video app, or the shopping app). As shown in FIG. 13(b), when the cross-domain recommendation allowing control is in an enabled state, a plurality of switch controls are presented in a first interface, and the plurality of switch controls respectively correspond to applications such as the music app, the reading app, the shopping app, the video app, the news app, and a chat app. A control corresponding to the music app is used as an example. When the control corresponding to the music app is in an enabled state, in other words, there is an "Allowed" state under the music app, the browser app may obtain user behavior data from the music app and perform learning, to make a recommendation to the user.

Figure 13C:
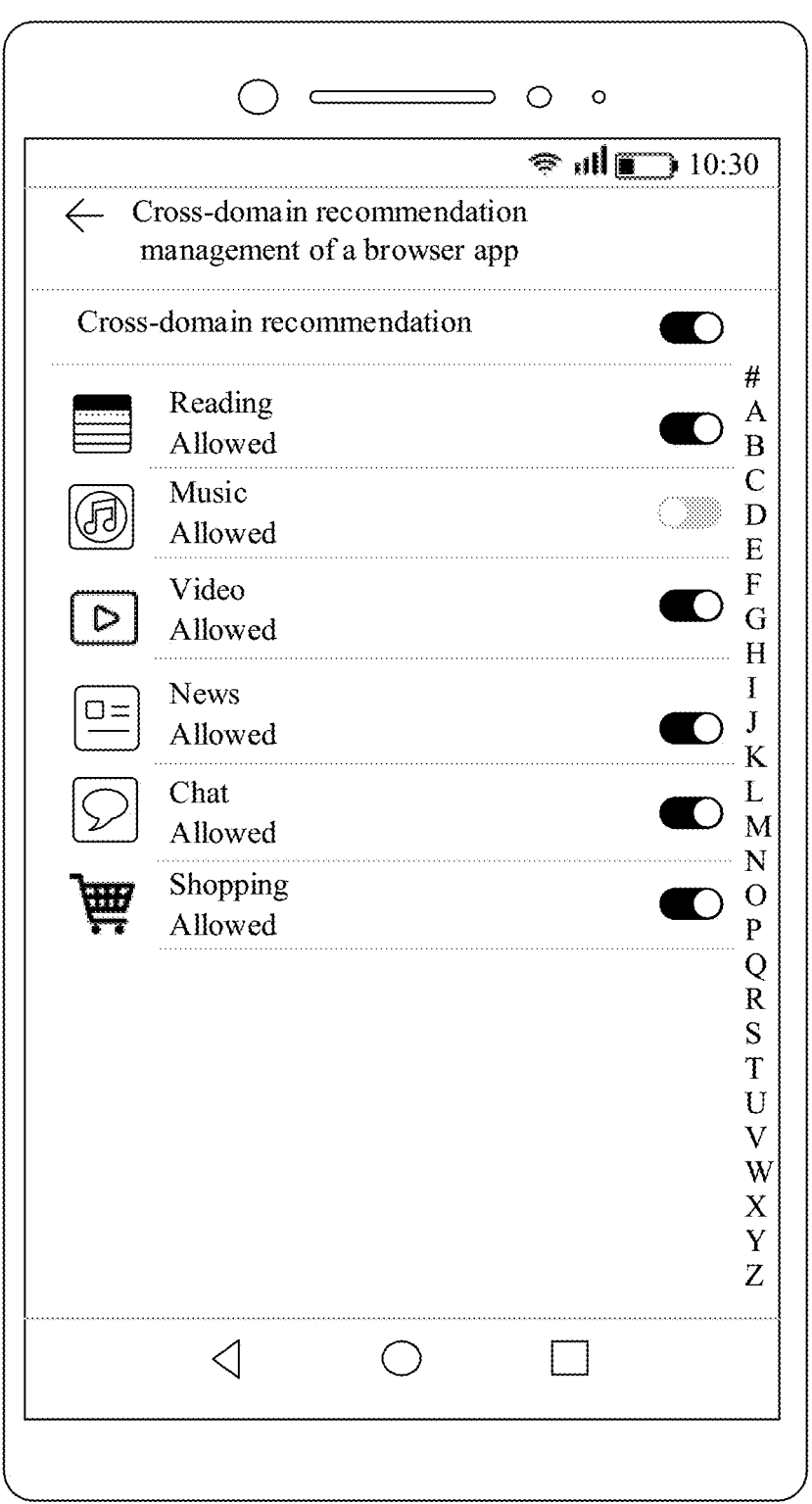
Figure 13D:
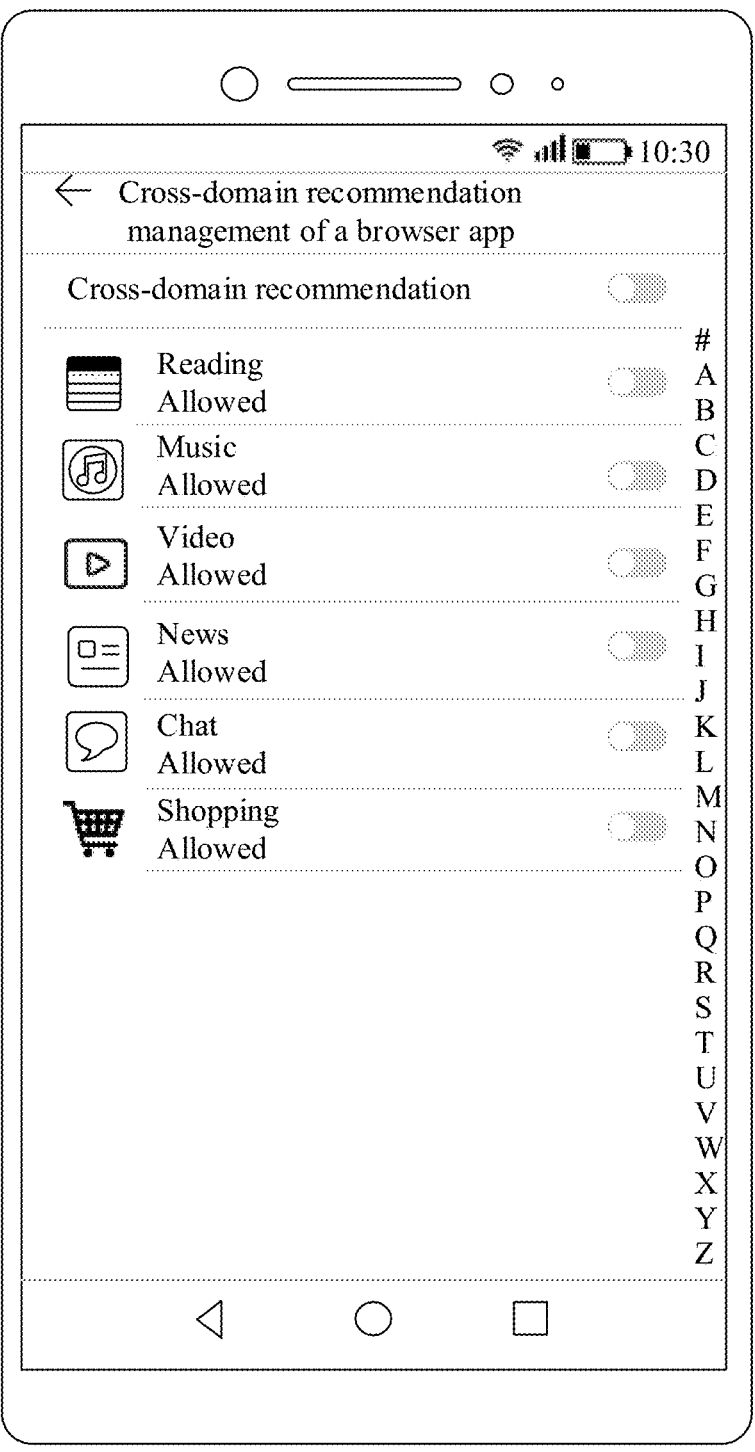

If the user performs a disabling operation on the control corresponding to the music app, in response to the disabling operation, the mobile phone presents content shown in FIG. 13(c), and the browser app no longer obtains the user behavior data from the music app. In other words, the browser app is not allowed to obtain the user behavior data from the music app. If the user performs a disabling operation on the cross-domain recommendation allowing control, in response to the disabling operation, the browser app disables the cross-domain recommendation function. In other words, the browser app is not allowed to obtain user interaction data from another app. For example, the user performs a tap operation on the cross-domain recommendation allowing control as shown in FIG. 13(b), and in response to the tap operation, the mobile phone disables the cross-domain recommendation function of the browser app. The cross-domain recommendation management interface may display content shown in FIG. 13(d), and a cross-domain recommendation function of the browser app in all applications in the learning list is disabled. In this way, management efficiency can be improved, and user experience can be improved.

Content recommended by an application to the user is a recommended object, and the recommended object may be displayed in the application. When the user enters the application, a recommendation request may be triggered, and a recommendation model recommends related content to the user in response to the recommendation request.

For example, an information flow recommended by the browser app to the user may be displayed on a home screen of the browser app.

For example, when the user performs a tap operation on the browser app, in response to the tap operation, the mobile phone displays a home screen 303 of the browser app shown in FIG. 14(*a*), and the home screen 303 of the browser app may display a recommendation list of one or more pieces of recommended content. The one or more pieces of recommended content is a recommended object in the browser app. It should be understood that the home screen 303 of the browser app may further include more or less other display content. This is not limited in this application.

The user may perform a specific operation on content presented in the recommendation list on the home screen 303 of the browser app, to view recommended content, delete (or ignore) the recommended content, view related information of the recommended content, or the like. For example, the user taps specific recommended content, and in response to the tap operation, the mobile phone may open the recommended content. For another example, the user quickly slides specific recommended content to the left (or to the right), and in response to this operation, the mobile phone may delete the recommended content from the recommendation list. For still another example, if the user presses and holds specific recommended content, in response to the press-and-hold operation, the mobile phone may display related information of the recommended content. As shown in FIG. 14(*a*), the user performs the press-and-hold operation shown in FIG. 14(*a*), and in response to the press-and-hold operation, the mobile phone may display a prompt box shown in the figure. Prompt information is displayed in a selection box, and the prompt information is used to prompt the user that the recommended content is recommended based on user interaction data in another application. As shown in FIG. 14(*a*), the prompt information is used to prompt the user that the recommended content is content recommended to the user based on data of the user in the video app.

It should be understood that, in some other embodiments, the user may open a video or delete the recommended content in another manner, or may invoke the related information of the recommended content in another manner, for example, a manner of slowly sliding to the left or the right. This is not limited in this embodiment of this application.

For example, when the user performs a tap operation on the browser app, in response to the tap operation, the mobile phone may further display a home screen 304 of the browser app shown in FIG. 14(*b*). The home screen 304 may display a recommendation list of one or more pieces of recommended content and prompt information corresponding to the one or more pieces of recommended content. The one or more pieces of recommended content is a recommended object in the browser app. It should be understood that the home screen 304 may alternatively include more or less display content. This is not limited in this application. The prompt information is used to prompt the user that the recommended content is recommended based on user interaction data in another application.

The user may perform a specific operation on a video presented in the recommendation list on the home screen 304, to view the recommended content, delete (or ignore) the recommended content, or the like. For example, the user taps specific recommended content, and in response to the tap operation, the mobile phone may open the recommended content. For another example, the user quickly slides specific recommended content to the left (or to the right), and in response to this operation, the mobile phone may delete the recommended content from the recommendation list. It should be understood that, in some other embodiments, the user may open the recommended content or delete the recommended content in another manner, or may delete related information of the recommended content in another manner, for example, a manner of slowly sliding to the left or the right. This is not limited in this embodiment of this application.

It should be understood that the prompt information mainly provides reference information for the user, so that the user learns that a current recommended object is obtained based on the cross-domain recommendation function. Content of the prompt information may alternatively be in another form. This is not limited in this embodiment of this application.

It should be noted that, in this embodiment of this application, that the user deletes the recommended content from the home screen may be understood as follows: The user only deletes specific recommended content from the recommendation list on the home screen, in other words, the user is not interested in the recommended content. This behavior may be recorded in a user behavior log and used as training data of the recommendation model, for example, used as the first training sample in the foregoing methods.

When there are a large quantity of applications on the mobile phone, a cross-domain recommendation function of an application that needs to make a cross-domain recommendation may be enabled. For example, the cross-domain recommendation function of the application may be enabled or disabled in the following two manners.

In one manner, a cross-domain recommendation function of an application is disabled or enabled at a single point. For example, as shown in FIG. 13(*a*) to FIG. 13(*d*), in a cross-domain recommendation management interface corresponding to an application, a cross-domain recommendation allowing control is enabled or disabled, to enable or disable of the cross-domain recommendation function of the application at a single point.

Figure 15A:
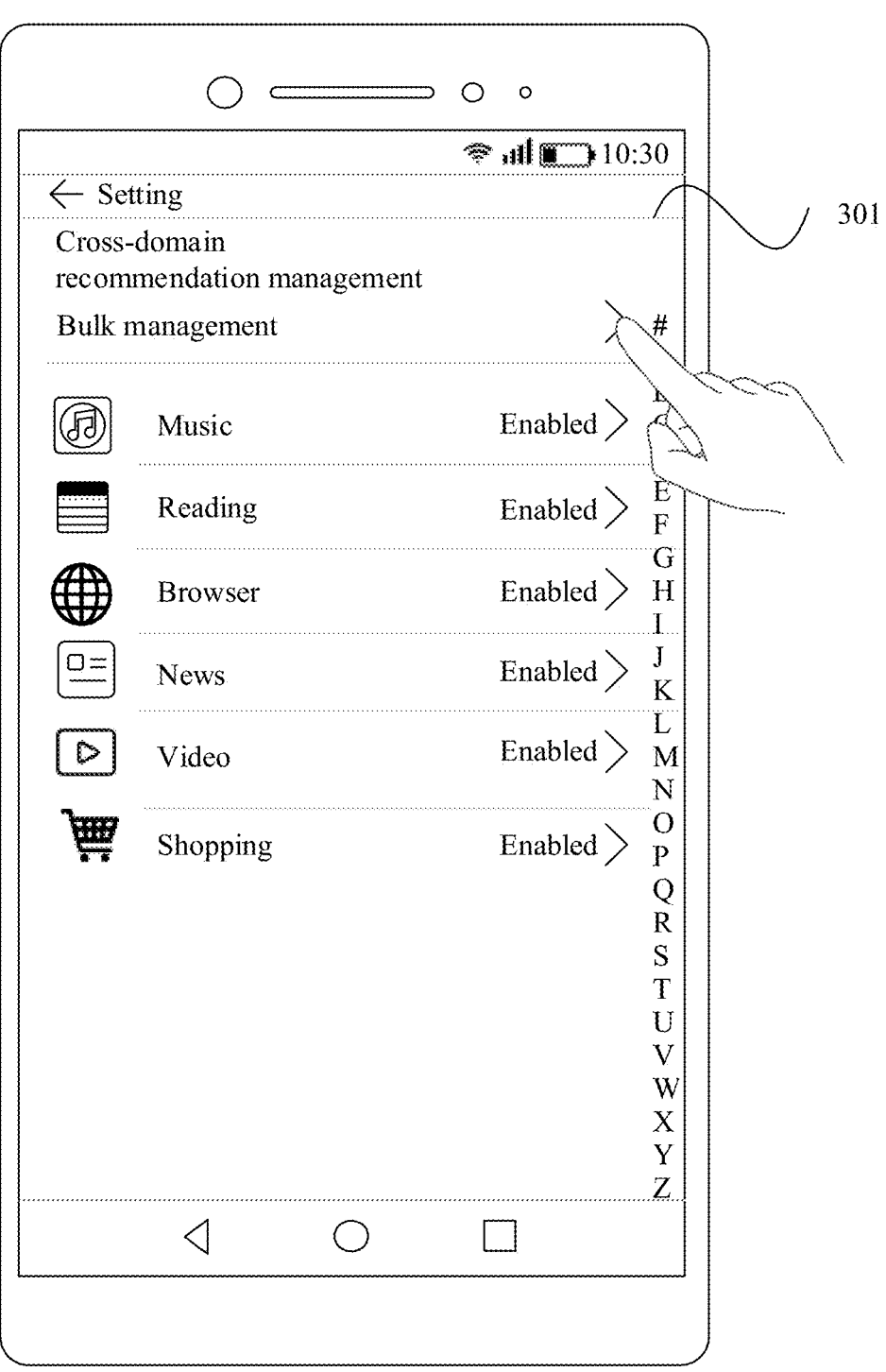
FIG. 15(a) and FIG. 15(b) are a schematic diagram of still another group of graphical user interfaces according to an embodiment of this application.
Figure 15B:
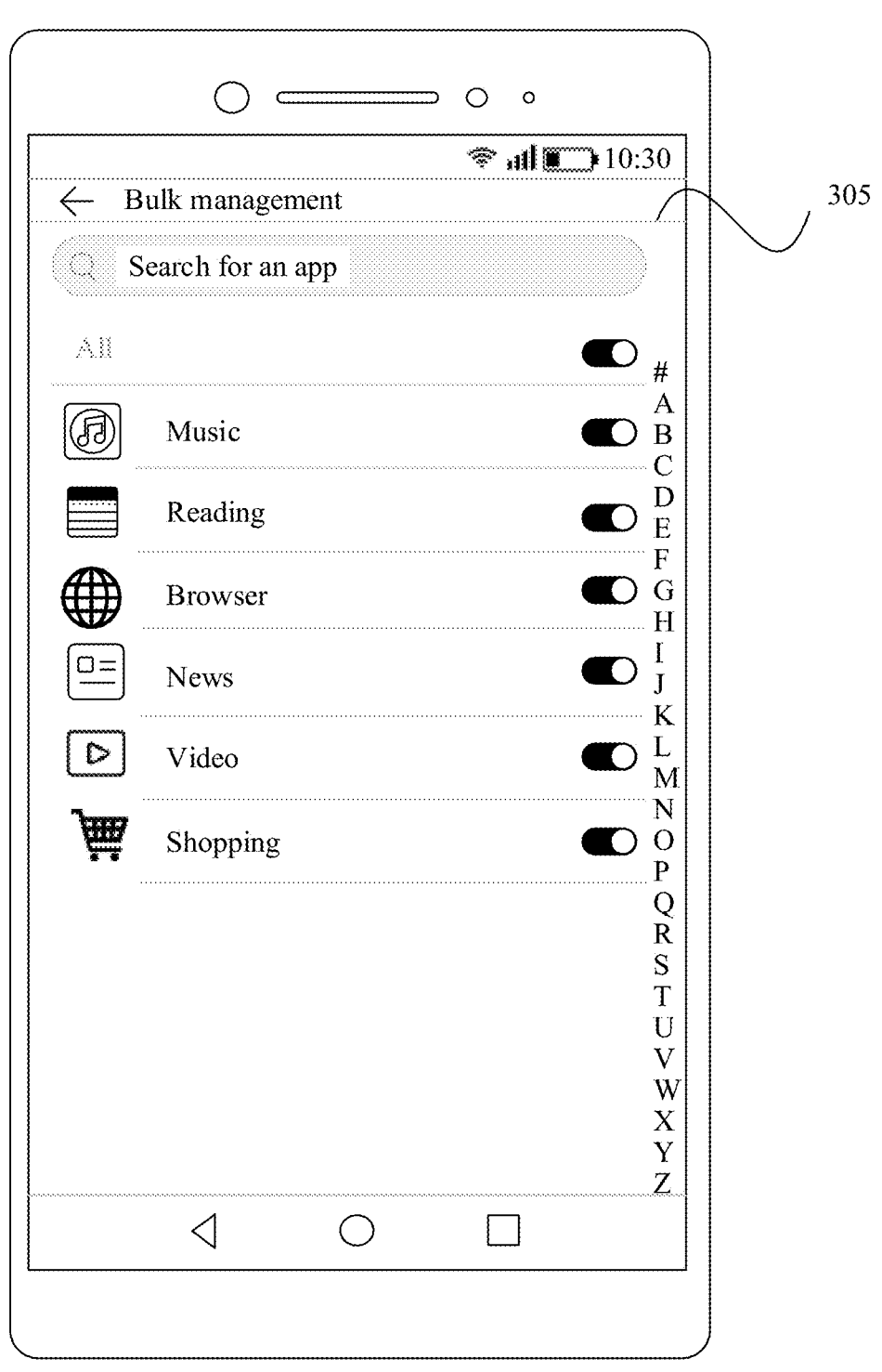

In the other manner, cross-domain recommendation functions of all applications are disabled or enabled in bulk. For example, FIG. 15(*a*) shows a same interface as FIG. 13(*a*). The user performs a tap operation on the bulk management control shown in FIG. 15(*a*), and in response to the tap operation, the user enters a bulk management interface 305. The bulk management interface 305 may include a search application control, a cross-domain recommendation master switch control, a cross-domain recommendation switch control of each application, a sidebar alphabetical ranking index control, and the like. The user may control enabling or disabling of the cross-domain recommendation master switch control (namely, a switch after "All" in the figure), to enable the cross-domain recommendation functions of all the applications as a whole or disable the cross-domain recommendation functions of all the applications as a whole. The bulk management interface 305 further includes a cross-domain recommendation switch control of each application. The user may alternatively control enabling and disabling of a cross-domain recommendation switch control of an application, to implement enabling and disabling of a cross-domain recommendation function of a single application. In some embodiments, the cross-domain recommendation switch control that is of each application and that is displayed in the bulk management interface 305 may be displayed in an order of application name initials from "A" to "Z", and a cross-domain recommendation function of each application is controlled by a cross-domain recommendation switch control of the application.

It should be understood that, in this embodiment of this application, "disabling cross-domain recommendation", "disabling cross-domain recommendation of an application", "disabling a cross-domain recommendation function", and "disabling a cross-domain recommendation function of an application" may be considered to express a same meaning, and each may be understood as follows: The cross-domain recommendation function of the application is disabled, and the application does not perform cross-domain recommendation. Similarly, "enabling cross-domain recommendation", "enabling cross-domain recommendation of an application", "enabling a cross-domain recommendation function", and "enabling a cross-domain recommendation function of an application" may be considered to express a same meaning, and each may be understood as follows: The cross-domain recommendation function of the application is enabled, and the application may perform cross-domain recommendation.

With reference to the foregoing embodiments and related accompanying drawings, an embodiment of this application provides a recommendation method. The method may be implemented in an electronic device (for example, a mobile phone or a tablet computer). FIG. 16 is a schematic flowchart of a recommendation method according to an embodiment of this application. As shown in FIG. 16, the method 1200 may include the following steps.

S1210: Display a first interface.

The first interface may include a learning list of at least one application, a learning list of a first application in the learning list of the at least one application includes at least one option, and each of the at least one option is associated with one application.

For example, as shown in FIG. 13(b), the first interface may be a cross-domain recommendation management interface 302 of a browser app. The cross-domain recommendation management interface 302 is used to control enabling and disabling of a cross-domain recommendation function of the browser app.

For example, as shown in FIG. 13(b), the learning list of the first application may be a learning list of the browser app.

For example, as shown in FIG. 13(b), the at least one option may have a same name as an application, for example, a "shopping" option, a "map" option, a "health" option, or a "video" option. Each of the at least one option is associated with one application, and an option associated with an application is used to control enabling and disabling of a function of learning user behavior in the application. In other words, the option associated with the application is used to control whether the first application is allowed to obtain data of the application to make a cross-domain recommendation.

S1220: Sense a first operation performed by the user on the first interface.

The first operation may be a tap operation, a double-tap operation, a press-and-hold operation, a slide operation, or the like.

S1230: Enable or disable, in response to the first operation, a cross-domain recommendation function of the first application in an application associated with some or all options in the learning list of the first application.

In other words, the first application is allowed to obtain user behavior data in the application associated with the some or all options, and learn of a preference of the user in the application, to make a recommendation to the user in the first application.

After the first operation is performed, the user may learn from the interface whether a cross-domain recommendation function of the first application is in an enabled state or a disabled state.

In an embodiment, the first operation is performed on a first option, and in response to the first operation performed by the user on the first option, a cross-domain recommendation function of the first application in an application associated with the first option is enabled or disabled. The first option is located in the learning list of the first application.

For example, as shown in FIG. 13(c), the first option may be a "music" option in the first interface. It should be understood that the first option may be any option that is associated with an application and that is in the learning list of the first application in the first interface, for example, a "music" option, a "shopping" option, or a "browser" option.

For example, as shown in FIG. 13(c), the first operation may be an enabling operation or a disabling operation performed on a switch control corresponding to the first option. For example, when the switch control corresponding to the first option is in the enabled state, the first operation may be used to disable the switch control corresponding to the first option, and correspondingly, the cross-domain recommendation function of the first application in the application associated with the first option is disabled. For example, when the switch control corresponding to the first option is in the disabled state, the first operation may be used to enable the switch control corresponding to the first option, and correspondingly, the cross-domain recommendation function of the first application in the application associated with the first option is enabled. In this way, the user may separately control enabling and disabling of a cross-domain recommendation function of the first application in each other application.

In an embodiment, the first operation is performed on a switch control corresponding to the learning list of the first application, and in response to the first operation performed by the user on the switch control, a cross-domain recommendation function of the first application in an application associated with all options in the learning list of the first application is enabled or disabled.

For example, as shown in FIG. 13(b), the first operation may be a disabling operation performed on the cross-domain recommendation allowing control. Optionally, if the cross-domain recommendation allowing control is in a disabled state before the first operation is performed, the first operation may be an enabling operation performed on the cross-domain recommendation allowing control. In this way, the user may control the cross-domain recommendation function of the first application as a whole, thereby improving management efficiency and improving user experience.

In an embodiment, the method 1200 further includes: displaying a second interface, where the second interface is configured to present one or more recommended objects and prompt information of the one or more recommended objects, and the prompt information of the one or more recommended objects is used to indicate that the one or more recommended objects are determined based on user behavior data in an application in the at least one application.

Figure 14A:
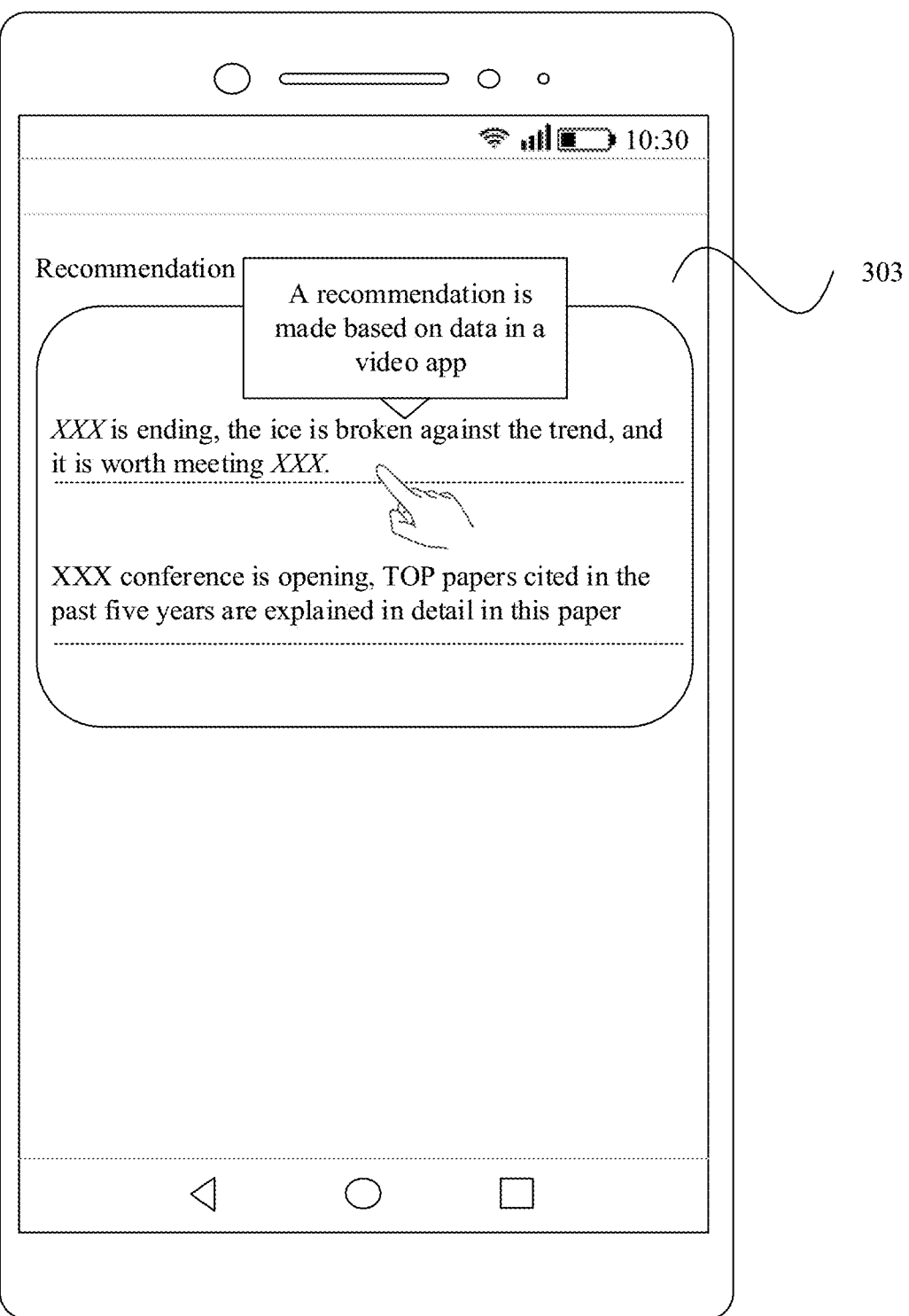
FIG. 14(a) and FIG. 14(b) are a schematic diagram of another group of graphical user interfaces according to an embodiment of this application.

For example, as shown in FIG. 14(a), the second interface may be the home screen 303 of the browser app.

Figure 14B:
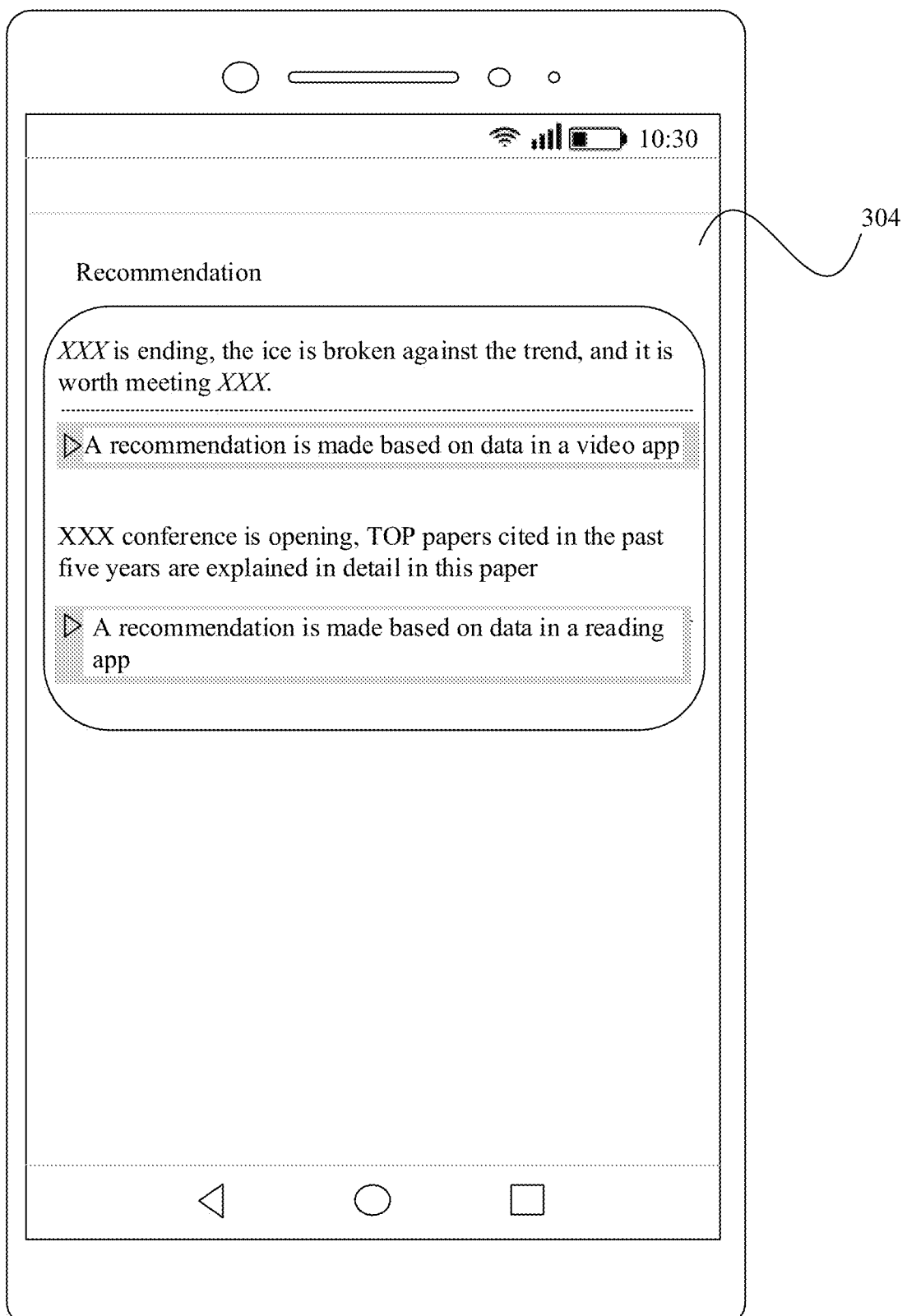

For example, as shown in FIG. 14(b), the second interface may be the home screen 304 of the browser app.

For example, as shown in FIG. 14(*a*) and FIG. 14(*b*), the prompt information may be used to prompt the user that currently recommended content is obtained based on data in the video app.

In an embodiment, the one or more recommended objects are determined by inputting information about the user and information about a candidate recommended object into a recommendation model, to predict a probability that the user performs an operation action on the candidate recommended object.

For example, user behavior data in the video app is used as data in a source domain, and user behavior data in the browser app is used as data in a target domain, and the recommendation model may be obtained by performing the foregoing method 1100. The recommendation model may be used to predict the probability that the user performs an operation action on the candidate recommended object. Recommended content is determined based on a value of the probability, and then content shown in FIG. 14(*a*) and FIG. 14(*b*) is displayed.

In an embodiment, a model parameter of the recommendation model is obtained by training a first recommendation model based on n first training samples and weights corresponding to the n first training samples, the first recommendation model is obtained through training based on the n first training samples, a weight corresponding to each first training sample is determined based on an impact function value of each first training sample with respect to a verification loss of m second training samples in the first recommendation model, the first training sample includes information about a first user, information about a first recommended object, and a sample label of the first training sample, the sample label of the first training sample is used to indicate whether the first user performs an operation action on the first recommended object, n is an integer greater than 1, the second training sample includes information about a second user, information about a second recommended object, and a sample label of the second training sample, the sample label of the second training sample is used to indicate whether the second user performs an operation action on the second recommended object, m is an integer greater than 1, the m second training samples are determined based on user behavior data in an application in an application associated with the at least one option, and the n first training samples are determined based on user behavior data in the first application.

For example, when the user allows the first application to enable the cross-domain recommendation function, the first application may obtain the user behavior data from the application associated with the first option, and use the user behavior data in the application associated with the first option as the data in the source domain. It should be understood that the data in the source domain may further include user behavior data in another application. For example, when the user allows the first application to perform cross-domain learning in the application associated with all options in the learning list of the first application, the first application may obtain user behavior data from the application associated with all the options, and use the obtained user behavior data as the data in the source domain.

For example, the recommendation model may be trained in the foregoing method 1100. For specific descriptions, refer to the foregoing method 1100. Details are not described herein again.

In an embodiment, before the first interface is displayed, the method 1200 further includes: displaying a third interface, where the third interface includes a switch control corresponding to at least one application; detecting, in the third interface, a third operation performed by the user on a switch control of the first application in the switch control corresponding to the at least one application; and displaying the first interface in response to the third operation.

For example, as shown in FIG. 13(*a*), the third interface may be the home screen 301 of the setting app.

For example, as shown in FIG. 13(*a*), the switch control of the first application may be the cross-domain recommendation management control of the browser app.

For example, as shown in FIG. 13(*a*), the third operation may be a tap operation performed on the switch control corresponding to the first application, and an interface shown in FIG. 13(*b*) is displayed in response to the tap operation.

According to the solution in this embodiment of this application, knowledge (for example, an interest and a preference of a user) is migrated and shared between different domains, and all historical records of user interaction in both the source domain and the target domain are incorporated into learning, so that the recommendation model can better learn of the preference of the user. Therefore, the recommendation model can also fit the interest and preference of the user well in the target domain, and recommend, to the user, a recommendation result that matches the interest of the user, to realize a cross-domain recommendation and alleviate a cold start problem.

The following describes a training apparatus and a recommendation apparatus in the embodiments of this application in detail with reference to the accompanying drawings. It should be understood that the recommendation apparatus described below can perform the recommendation model training method in the foregoing embodiments of this application, and the recommendation apparatus can perform the recommendation method in the foregoing embodiments of this application. To avoid unnecessary repetition, repeated descriptions are properly omitted below when the recommendation apparatus in embodiments of this application is described.

FIG. 17 is a schematic block diagram of a recommendation model training apparatus according to an embodiment of this application. The recommendation model training apparatus 3000 shown in FIG. 17 includes an obtaining unit 3010 and a processing unit 3020.

The obtaining unit 3010 and the processing unit 3020 may be configured to perform the recommendation model training method in the embodiments of this application, and specifically, may be configured to perform the method 600, the method 900, the method 1000, or the method 1100.

The obtaining unit 3010 is configured to obtain a first recommendation model, where a model parameter of the first recommendation model is obtained through training based on n first training samples, the first training sample includes information about a first user, information about a first recommended object, and a sample label of the first training sample, the sample label of the first training sample is used to indicate whether the first user performs an operation action on the first recommended object, and n is an integer greater than 1. The processing unit 3020 is configured to: determine an impact function value of each first training sample with respect to a verification loss of m second training samples in the first recommendation model, where the second training sample includes information about a second user, information about a second recommended object, and a sample label of the second training sample, the sample label of the second training sample is used to indicate whether the second user performs an operation action on the second recommended object, and m is an integer greater than 1; determine, based on the impact function value of each first training sample with respect to the verification loss of the m second training samples in the first recommendation model, a weight corresponding to each first training sample; and train the first recommendation model based on the n first training samples and the weights corresponding to the n first training samples, to obtain a target recommendation model.

Optionally, in an embodiment, the determining, based on the impact function value of each first training sample with respect to the verification loss of the m second training samples in the first recommendation model, a weight corresponding to each first training sample includes:

the weight corresponding to each first training sample has a negative correlation with the impact function value of each first training sample with respect to the verification loss of the m second training samples.

Optionally, in an embodiment, an impact function value of each first training sample with respect to a prediction loss of the m second training samples in the first recommendation model satisfies the following formula:

$$\phi(z_i) = \sum_j \phi(z_i, z_j) = -\left[\sum_j \nabla_\theta l(z_j, \hat{\theta})\right]^T H_{\hat{\theta}}^{-1} \nabla_\theta l(z_i, \hat{\theta}),$$

where $z_i$ represents the $i^{th}$ first training sample, $\phi(z_i)$ represents an impact function value of the $i^{th}$ first training sample with respect to the prediction loss of the m second training samples in the first recommendation model, $z_j$ represents the $j^{th}$ second training sample, $\phi(z_i, z_j)$ represents an impact function value of the $i^{th}$ first training sample with respect to a verification loss of the $j^{th}$ second training sample in the first recommendation model, $\nabla_\theta l(z_j, \hat{\theta})$ represents a gradient of $z_i$ on the first recommendation model $\hat{\theta}$, $\Sigma_j \nabla_\theta l(z_j, \hat{\theta})$ represents a sum of gradients of the m second training samples in the first recommendation model $\hat{\theta}$, and $$H_{\hat{\theta}}^{-1}$$

represents an inverse matrix of a Hessian matrix of all first training samples.

Optionally, in an embodiment, the processing unit 3020 is specifically configured to:

the weight corresponding to each first training sample satisfies the following formula:

$$\pi_i = \frac{1}{1 + e^{\frac{\alpha\phi(z_i)}{max(\{\phi(z_i)\}) - min(\{\phi(z_i)\})}}},$$

where $\pi_i$ represents a weight corresponding to the $i^{th}$ first training sample, a represents a weight adjustment coefficient, and $\{\phi(z_i)\}$ represents a set of impact function values of the n first training samples with respect to the verification loss of the m second training samples in the first recommendation model.

Optionally, in an embodiment, the m second training samples are obtained when there is a same probability that candidate recommended objects in a candidate recommended object set are presented, and the second recommended object is a candidate recommended object in the candidate recommended object set.

Optionally, in an embodiment, that the m second training samples are obtained when there is a same probability that candidate recommended objects in a candidate recommended object set are presented includes: the m second training samples are obtained when the candidate recommended objects in the candidate recommended object set are randomly presented to the second user; or the m second training samples are obtained when the second user searches for the second recommended object.

Optionally, in an embodiment, the m second training samples belong to data in a source domain, and the n first training samples belong to data in a target domain.

Figure 18:
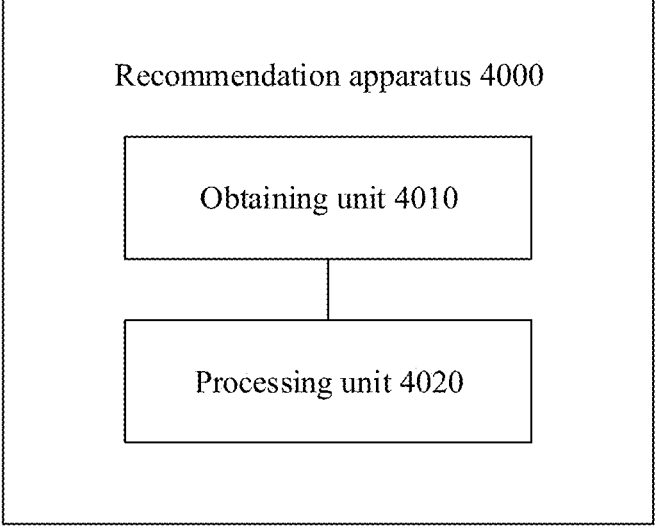
FIG. 18 is a schematic block diagram of a recommendation apparatus according to an embodiment of this application.

FIG. 18 is a schematic block diagram of a recommendation apparatus 4000 according to an embodiment of this application. The recommendation apparatus 4000 shown in FIG. 18 includes an obtaining unit 4010 and a processing unit 4020.

The obtaining unit 4010 and the processing unit 4020 may be configured to perform the recommendation method in this embodiment of this application, for example, may be configured to perform the method 700.

The obtaining unit 4010 is configured to obtain information about a target user and information about a candidate recommended object. The processing unit 4020 is configured to input the information about the target user and the information about the candidate recommended object into a recommendation model, to predict a probability that the target user performs an operation action on the candidate recommended object, where a model parameter of the recommendation model is obtained by training a first recommendation model based on n first training samples and weights corresponding to the n first training samples, the first recommendation model is obtained through training based on the n first training samples, a weight corresponding to each first training sample is determined based on an impact function value of each first training sample with respect to a verification loss of m second training samples in the first recommendation model, the first training sample includes information about a first user, information about a first recommended object, and a sample label of the first training sample, the sample label of the first training sample is used to indicate whether the first user performs an operation action on the first recommended object, n is an integer greater than 1, the second training sample includes information about a second user, information about a second recommended object, and a sample label of the second training sample, the sample label of the second training sample is used to indicate whether the second user performs an operation action on the second recommended object, and m is an integer greater than 1.

Optionally, in an embodiment, that a weight corresponding to each first training sample is determined based on an impact function value of each first training sample with respect to a verification loss of m second training samples in the first recommendation model includes: the weight corresponding to each first training sample has a negative correlation with the impact function value of each first training sample with respect to the verification loss of the m second training samples in the first recommendation model.

Optionally, in an embodiment, the impact function value of each first training sample with respect to the verification loss of the m second training samples in the first recommendation model satisfies the following formula:

$$\phi(z_i) = \sum_j \phi(z_i, z_j) = -\left[\sum_j \nabla_\theta l(z_j, \hat{\theta})\right]^T H_{\hat{\theta}}^{-1} \nabla_\theta l(z_i, \hat{\theta}),$$

where $z_i$ represents the $i^{th}$ first training sample, $\phi(z_i)$ represents an impact function value of the $i^{th}$ first training sample with respect to a prediction loss of the m second training samples in the first recommendation model, $z_j$ represents the $j^{th}$ second training sample, $\phi(z_i, z_j)$ represents an impact function value of the $i^{th}$ first training sample with respect to a verification loss of the $j^{th}$ second training sample in the first recommendation model, $\nabla_0 l(z_j, \hat{\theta})$ represents a gradient of $z_i$ on the first recommendation model $\hat{\theta}$, $\Sigma_j \nabla_\theta l(z_j, \hat{\theta})$ represents a sum of gradients of the m second training samples in the first recommendation model $\hat{\theta}$, and $$H_{\hat{\theta}}^{-1}$$

represents an inverse matrix of a Hessian matrix of all first training samples.

Optionally, in an embodiment, that a weight corresponding to each first training sample is determined based on an impact function value of each first training sample with respect to a verification loss of m second training samples in the first recommendation model includes: the weight corresponding to each first training sample satisfies the following formula:

$$\pi_i = \frac{1}{1 + e^{\frac{\alpha \phi(z_i)}{\max((\phi(z_i)))-\min((\phi(z_i)))}}},$$

where $\pi_i$ represents a weight corresponding to the $i^{th}$ first training sample, a represents a weight adjustment coefficient, and $\{\phi(z_i)\}$ represents a set of impact function values of the n first training samples with respect to the verification loss of the m second training samples in the first recommendation model.

Optionally, in an embodiment, the m second training samples are obtained when there is a same probability that candidate recommended objects in a candidate recommended object set are presented, and the second recommended object is a candidate recommended object in the candidate recommended object set.

Optionally, in an embodiment, that the m second training samples are obtained when there is a same probability that candidate recommended objects in a candidate recommended object set are presented includes: the m second training samples are obtained when the candidate recommended objects in the candidate recommended object set are randomly presented to the second user; or the m second training samples are obtained when the second user searches for the second recommended object.

Optionally, in an embodiment, the m second training samples belong to data in a source domain, and the n first training samples belong to data in a target domain.

It should be noted that the training apparatus 3000 and the apparatus 4000 are embodied in a form of function units. The term "unit" herein may be implemented in a form of software and/or hardware. This is not specifically limited.

For example, "unit" may be a software program, a hardware circuit, or a combination thereof that implements the foregoing functions. The hardware circuit may include an application-specific integrated circuit (ASIC), an electronic circuit, a processor (for example, a shared processor, a dedicated processor, or a group processor) and a memory that are configured to execute one or more software or firmware programs, a merged logic circuit, and/or another suitable component that supports the described functions.

Therefore, the units in the examples described in the embodiments of this application can be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

Figure 19:
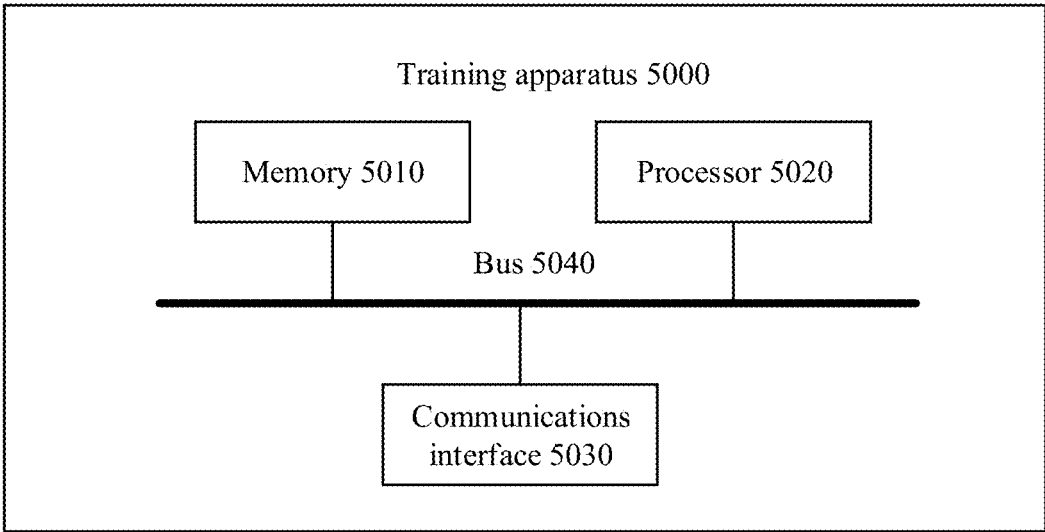
FIG. 19 is a schematic block diagram of a recommendation model training apparatus according to an embodiment of this application.

FIG. 19 is a schematic diagram of a hardware structure of a recommendation model training apparatus according to an embodiment of this application. A training apparatus 5000 (the apparatus 5000 may be specifically a computer device) shown in FIG. 19 includes a memory 5010, a processor 5020, a communications interface 5030, and a bus 5040. A communication connection is implemented between the memory 5010, the processor 5020, and the communications interface 5030 through the bus 5040.

The memory 5010 may be a read-only memory (ROM), a static storage device, a dynamic storage device, or a random access memory (RAM). The memory 5010 may store a program. When the program stored in the memory 5010 is executed by the processor 5020, the processor 5020 is configured to perform the steps of the recommendation model training method in embodiments of this application, for example, perform the steps shown in FIG. 6.

It should be understood that the training apparatus shown in this embodiment of this application may be a server, for example, may be a server in the cloud, or may be a chip configured in the server in the cloud.

The processor 5020 may be a general-purpose central processing unit (CPU), a microprocessor, an application-specific integrated circuit (ASIC), a graphics processing unit (GPU), or one or more integrated circuits, and is configured to execute a related program, to implement the recommendation model training method in the method embodiments of this application.

Alternatively, the processor 5020 may be an integrated circuit chip and has a signal processing capability. In an implementation process, steps of the recommendation model training method in this application may be completed by using a hardware integrated logic circuit or an instruction in a form of software in the processor 5020.

The processor 5020 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logic block diagrams that are disclosed in the embodiments of this application may be implemented or performed. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 5010. The processor 5020 reads information in the memory 5010, and completes, in combination with hardware of the processor 5020, functions that need to be performed by the units included in the training apparatus shown in FIG. 17 in the embodiments of this application, or performs the recommendation model training method shown in FIG. 6 in the method embodiments of this application.

The communications interface 5030 uses a transceiver apparatus, for example but not for limitation, a transceiver, to implement communication between the training apparatus 5000 and another device or a communications network.

The bus 5040 may include a path for transmitting information between the components (for example, the memory 5010, the processor 5020, and the communications interface 5030) of the training apparatus 5000.

Figure 20:
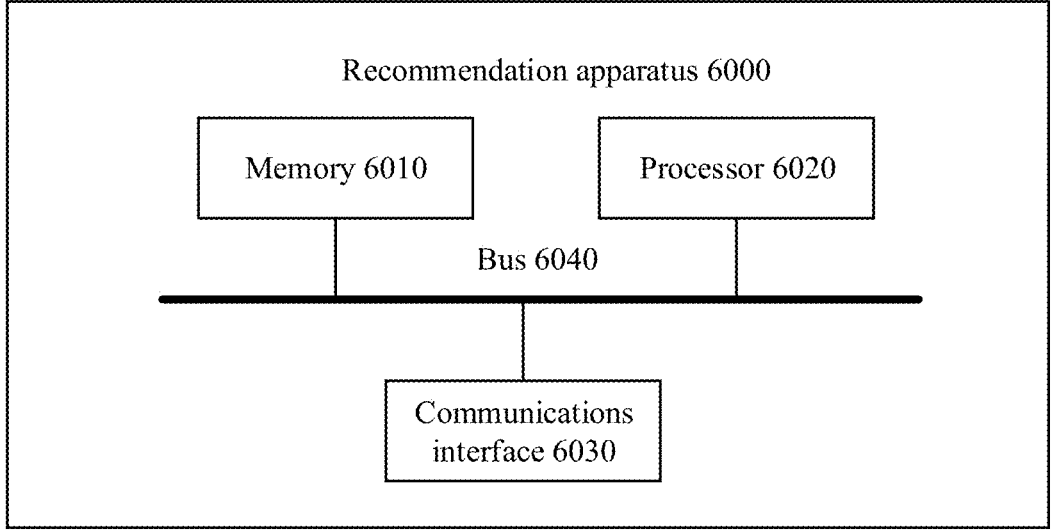
FIG. 20 is a schematic block diagram of a recommendation apparatus according to an embodiment of this application.

FIG. 20 is a schematic diagram of a hardware structure of a recommendation apparatus according to an embodiment of this application. A recommendation apparatus 6000 (the apparatus 6000 may be specifically a computer device) shown in FIG. 20 includes a memory 6010, a processor 6020, a communications interface 6030, and a bus 6040. A communication connection is implemented between the memory 6010, the processor 6020, and the communications interface 6030 through the bus 6040.

The memory 6010 may be a read-only memory (ROM), a static storage device, a dynamic storage device, or a random access memory (RAM). The memory 6010 may store a program. When the program stored in the memory 6010 is executed by the processor 6020, the processor 6020 is configured to perform the steps of the recommendation method in embodiments of this application, for example, perform the steps shown in FIG. 7.

It should be understood that the apparatus shown in this embodiment of this application may be an intelligent terminal, or may be a chip configured in the intelligent terminal.

The processor 6020 may be a general-purpose central processing unit (CPU), a microprocessor, an application-specific integrated circuit (ASIC), a graphics processing unit (GPU), or one or more integrated circuits, and is configured to execute a related program, to implement the selection probability prediction method in the method embodiments of this application.

Alternatively, the processor 6020 may be an integrated circuit chip and has a signal processing capability. In an implementation process, the steps of the selection probability prediction method in this application may be completed by using a hardware integrated logic circuit or an instruction in a form of software in the processor 6020.

The processor 6020 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logic block diagrams that are disclosed in the embodiments of this application may be implemented or performed.

The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 6010. The processor 6020 reads information in the memory 6010, and completes, in combination with hardware of the processor 6020, functions that need to be performed by the units included in the apparatus shown in FIG. 18 in the embodiments of this application, or performs the recommendation method shown in FIG. 7 in the method embodiments of this application.

The communications interface 6030 uses a transceiver apparatus, for example, but not limited to, a transceiver, to implement communication between the apparatus 6000 and another device or a communications network.

The bus 6040 may include a path for transmitting information between components (for example, the memory 6010, the processor 6020, and the communications interface 6030) of the apparatus 6000.

It should be noted that, although only the memory, the processor, and the communications interface are shown in each of the training apparatus 5000 and the apparatus 6000, in a specific implementation process, a person skilled in the art should understand that the training apparatus 5000 and the apparatus 6000 each may further include another component necessary for normal running. In addition, based on a specific requirement, a person skilled in the art should understand that the training apparatus 5000 and the apparatus 6000 each may further include a hardware component for implementing another additional function. In addition, a person skilled in the art should understand that the training apparatus 5000 and the apparatus 6000 each may include only components necessary for implementing the embodiments of this application, but not necessarily include all the components shown in FIG. 19 or FIG. 20.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that, in the embodiments, division into modules is an example, and is merely logical function division. During actual implementation, there may be another division manner.

Figure 21:
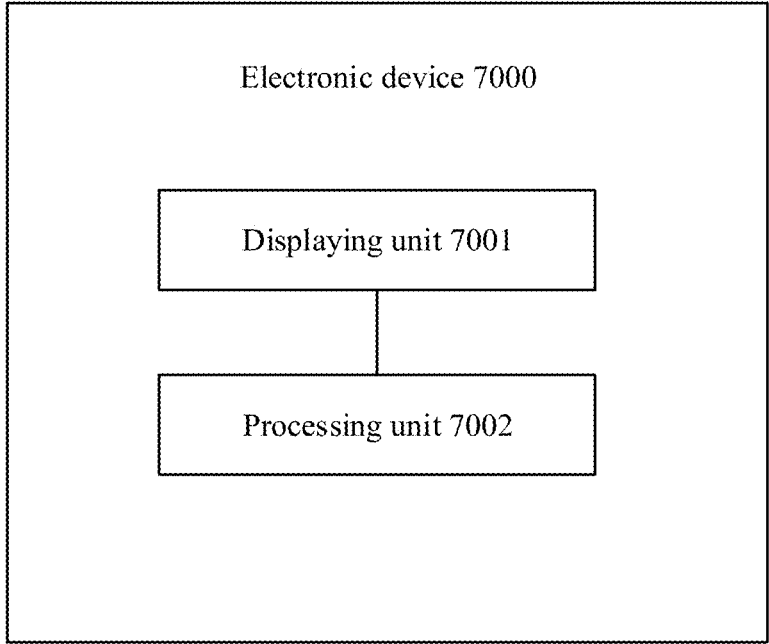
FIG. 21 is a schematic block diagram of an electronic device according to an embodiment of this application.

When each function module is obtained through division based on each corresponding function, FIG. 21 is a possible schematic diagram of composition of an electronic device 7000 in the foregoing embodiment. As shown in FIG. 21, the electronic device 7000 may include a displaying unit 7001 and a processing unit 7002.

The displaying unit 7001 may be configured to support the electronic device 7000 in performing the foregoing step S1210, and/or is configured in another process of the technology described in this specification.

The processing unit 7002 may be configured to support the electronic device 7000 to perform step S1220 and/or another process of the technology described in this specification.

The displaying unit 7001 may be configured to support the electronic device 7000 in performing the foregoing step S1230, and/or is configured in another process of the technology described in this specification.

It should be noted that all related content of the steps in the foregoing method embodiments may be cited in function descriptions of corresponding functional modules. Details are not described herein again.

The electronic device provided in this embodiment is configured to perform the recommendation method. Effects that are the same as those of the foregoing implementation method can be achieved.

When an integrated unit is used, the electronic device may include a processing module, a storage module, and a communications module. The processing module may be configured to control and manage actions of the electronic device, for example, may be configured to support the electronic device in performing the operations performed by the displaying unit 7001 and the processing unit 7002. The storage module may be configured to support the electronic device in storing program code, data, and the like. The communications module may be configured to support communication between the electronic device and another device.

The processing module may be a processor or a controller. The processor may implement or execute various example logical blocks, modules, and circuits described with reference to content disclosed in this application. The processor may alternatively be a combination of processors implementing a calculation function, for example, a combination of one or more microprocessors or a combination of a digital signal processor (DSP) and a microprocessor. The storage module may be a memory. The communications module may be specifically a device, for example, a radio frequency circuit, a Bluetooth chip, or a Wi-Fi chip, that interacts with another electronic device.

An embodiment further provides a computer storage medium. The computer storage medium stores computer instructions; and when the computer instructions are run, an electronic device is enabled to perform the foregoing related method steps, to implement the recommendation method in the foregoing embodiments.

An embodiment further provides a computer program product. When the computer program product runs on a computer, the computer is enabled to perform the foregoing related steps, to implement the recommendation method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the recommendation method in the foregoing method embodiments.

The electronic device, the computer storage medium, the computer program product, or the chip provided in the embodiments is configured to perform the corresponding method provided above. Therefore, for beneficial effects that can be achieved, refer to the beneficial effects in the corresponding method provided above. Details are not described herein again.

It should be further understood that, in the embodiments of this application, the memory may include a read-only memory and a random access memory, and provide an instruction and data for the processor. A part of the processor may further include a non-volatile random access memory. For example, the processor may further store information of a device type.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The foregoing storage medium includes any medium that can store program code, such as a universal serial bus flash disk (USB flash disk, UFD), a removable hard disk, a read-only memory (ROM), a random access memory (RAM), a magnetic disk, or a compact disc. The UFD may also be briefly referred to as a USB flash drive or a USB flash drive.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A recommendation model training method, comprising:

obtaining a first recommendation model, wherein a model parameter of the first recommendation model is obtained through training based on n first training samples, the first training sample comprises information about a first user, information about a first recommended object, and a sample label of the first training sample, the sample label of the first training sample indicates whether the first user performs an operation action on the first recommended object, and n is an integer greater than 1;

determining an impact function value of each first training sample with respect to a verification loss of m second training samples in the first recommendation model by calculating an inverse matrix of a Hessian matrix of the first training samples and using the inverse matrix in determining the impact function value, wherein the second training sample comprises information about a second user, information about a second recommended object, and a sample label of the second training sample, the sample label of the second training sample indicates whether the second user performs an operation action on the second recommended object, and m is an integer greater than 1, wherein m second training samples are data in a verification set and the n first training samples are data in a training set;

determining, based on the impact function value of each first training sample with respect to the verification loss of the m second training samples in the first recommendation model, a weight corresponding to each first training sample; and training the first recommendation model based on the n first training samples and the weights corresponding to the n first training samples, to obtain a target recommendation model.

2. The method according to claim 1, wherein the weight corresponding to each first training sample has a negative correlation with the impact function value of each first training sample with respect to the verification loss of the m second training samples.

3. The method according to claim 1, wherein an impact function value of each first training sample with respect to a verification loss of the m second training samples in the first recommendation model satisfies the following formula:

$$\phi(z_i) = \sum_j \phi(z_i, z_j) = -\left[\sum_j \nabla_\theta l(z_j, \hat\theta)\right]^T H_{\hat\theta}^{-1} \nabla_\theta l(z_i, \hat\theta),$$

wherein $z_i$ represents a $i^{th}$ first training sample, $\phi(2)$ represents an impact function value of the $i^{th}$ first training sample with respect to the verification loss of the m second training samples in the first recommendation model, $z_j$ represents a $j^{th}$ second training sample, $\phi(z_i, z_j)$ represents an impact function value of the $i^{th}$ first training sample with respect to a verification loss of the $j^{th}$ second training sample in the first recommendation model, $\nabla_\theta l(z_j, \hat\theta)$ represents a gradient of $z_i$ on the first recommendation model $\hat\theta$, $\sum_j \nabla_\theta l(z_j, \hat\theta)$ represents a sum of gradients of the m second training samples in the first recommendation model $\hat\theta$, and $$H_{\hat\theta}^{-1}$$

represents the inverse matrix of the Hessian matrix of first training samples.

4. The method according to claim 3, wherein the determining, based on the impact function value of each first training sample with respect to the verification loss of the m second training samples in the first recommendation model, a weight corresponding to each first training sample comprises: determining that the weight corresponding to each first training sample satisfies the following formula:

$$\pi_i = \frac{1}{1 + e^{\frac{\alpha\phi(z_i)}{max(\{\phi(z_i)\}) - min(\{\phi(z_i)\})}}},$$

wherein $\pi_i$ represents a weight corresponding to the $i^{th}$ first training sample, a represents a weight adjustment coefficient, and $\{\phi(z_i)\}$ represents a set of impact function values of the n first training samples with respect to the verification loss of the m second training samples in the first recommendation model.

5. The method according to claim 1, wherein the m second training samples are obtained when there is a same probability that candidate recommended objects in a candidate recommended object set are presented, and the second recommended object is a candidate recommended object in the candidate recommended object set.

6. The method according to claim 5, wherein that the m second training samples are obtained when there is a same probability that candidate recommended objects in a candidate recommended object set are presented comprises:

the m second training samples are obtained when the candidate recommended objects in the candidate recommended object set are randomly presented to the second user; or the m second training samples are obtained when the second user searches for the second recommended object.

7. The method according to claim 1, wherein the m second training samples belong to data in a source domain, and the n first training samples belong to data in a target domain.

8. A recommendation method, comprising:

obtaining information about a target user and information about a candidate recommended object; and inputting the information about the target user and the information about the candidate recommended object into a recommendation model, to predict a probability that the target user performs an operation action on the candidate recommended object, wherein a model parameter of the recommendation model is obtained by training a first recommendation model based on n first training samples and weights corresponding to the n first training samples, the first recommendation model is obtained through training based on the n first training samples, a weight corresponding to each first training sample is determined based on an impact function value of each first training sample with respect to a verification loss of m second training samples in the first recommendation model, wherein the impact function value of each first training sample with respect to the verification loss of m second training samples in the first recommendation model is determined by calculating an inverse matrix of a Hessian matrix of the first training samples and using the inverse matrix in determining the impact function value, the first training sample comprises information about a first user, information about a first recommended object, and a sample label of the first training sample, the sample label of the first training sample indicates whether the first user performs an operation action on the first recommended object, n is an integer greater than 1, the second training sample comprises information about a second user, information about a second recommended object, and a sample label of the second training sample, the sample label of the second training sample indicates whether the second user performs an operation action on the second recommended object, and m is an integer greater than 1, wherein m second training samples are data in a verification set and the n first training samples are data in a training set.

9. The method according to claim 8, wherein the weight corresponding to each first training sample has a negative correlation with the impact function value of each first training sample with respect to the verification loss of the m second training samples in the first recommendation model.

10. The method according to claim 8, wherein the m second training samples are obtained when there is a same probability that candidate recommended objects in a candidate recommended object set are presented, and the second recommended object is a candidate recommended object in the candidate recommended object set.

11. The method according to claim 10, wherein that the m second training samples are obtained when there is a same probability that candidate recommended objects in a candidate recommended object set are presented comprises:

the m second training samples are obtained when the candidate recommended objects in the candidate recommended object set are randomly presented to the second user; or the m second training samples are obtained when the second user searches for the second recommended object.

12. The method according to claim 8, wherein the m second training samples belong to data in a source domain, and the n first training samples belong to data in a target domain.

13. A recommendation model training apparatus, comprising at least one processor; and one or more memories coupled to the at least one processor and storing programming instructions for execution by the at least one processor to cause the apparatus to performing operations comprising:

obtaining a first recommendation model, wherein a model parameter of the first recommendation model is obtained through training based on n first training samples, the first training sample comprises information about a first user, information about a first recommended object, and a sample label of the first training sample, the sample label of the first training sample indicates whether the first user performs an operation action on the first recommended object, and n is an integer greater than 1;

determining an impact function value of each first training sample with respect to a verification loss of m second training samples in the first recommendation model by calculating an inverse matrix of a Hessian matrix of the first training samples and using the inverse matrix in determining the impact function value, wherein the second training sample comprises information about a second user, information about a second recommended object, and a sample label of the second training sample, the sample label of the second training sample indicates whether the second user performs an operation action on the second recommended object, and m is an integer greater than 1, wherein m second training samples are data in a verification set and the n first training samples are data in a training set;

determining, based on the impact function value of each first training sample with respect to the verification loss of the m second training samples in the first recommendation model, a weight corresponding to each first training sample; and training the first recommendation model based on the n first training samples and the weights corresponding to the n first training samples, to obtain a target recommendation model.

14. The apparatus according to claim 13, wherein the weight corresponding to each first training sample has a negative correlation with the impact function value of each first training sample with respect to the verification loss of the m second training samples.

15. The apparatus according to claim 13, wherein the m second training samples are obtained when there is a same probability that candidate recommended objects in a candidate recommended object set are presented, and the second recommended object is a candidate recommended object in the candidate recommended object set.

16. The apparatus according to claim 15, wherein the m second training samples are obtained when there is a same probability that candidate recommended objects in a candidate recommended object set are presented comprises:

the m second training samples are obtained when the candidate recommended objects in the candidate recommended object set are randomly presented to the second user; or the m second training samples are obtained when the second user searches for the second recommended object.

17. The apparatus according to claim 15, wherein the m second training samples belong to data in a source domain, and the n first training samples belong to data in a target domain.

18. A recommendation apparatus, comprising:

at least one processor; and one or more memories coupled to the at least one processor and storing programming instructions for execution by the at least one processor to cause the apparatus to performing operations comprising:

obtaining information about a target user and information about a candidate recommended object; and inputting the information about the target user and the information about the candidate recommended object into a recommendation model, to predict a probability that the target user performs an operation action on the candidate recommended object, wherein a model parameter of the recommendation model is obtained by training a first recommendation model based on n first training samples and weights corresponding to the n first training samples, the first recommendation model is obtained through training based on the n first training samples, a weight corresponding to each first training sample is determined based on an impact function value of each first training sample with respect to a verification loss of m second training samples in the first recommendation model, wherein the impact function value of each first training sample with respect to the verification loss of m second training samples in the first recommendation model is determined by calculating an inverse matrix of a Hessian matrix of the first training samples and using the inverse matrix in determining the impact function value, the first training sample comprises information about a first user, information about a first recommended object, and a sample label of the first training sample, the sample label of the first training sample indicates whether the first user performs an operation action on the first recommended object, n is an integer greater than 1, the second training sample comprises information about a second user, information about a second recommended object, and a sample label of the second training sample, the sample label of the second training sample indicates whether the second user performs an operation action on the second recommended object, and m is an integer greater than 1, wherein m second training samples are data in a verification set and the n first training samples are data in a training set.

19. The apparatus according to claim 18, wherein the weight corresponding to each first training sample has a negative correlation with the impact function value of each first training sample with respect to the verification loss of the m second training samples in the first recommendation model.

20. The apparatus according to claim 18, wherein the m second training samples are obtained when there is a same probability that candidate recommended objects in a candidate recommended object set are presented, and the second recommended object is a candidate recommended object in the candidate recommended object set.

* * * * *